US012632449B1

(12) United States Patent
Akintunde

(10) Patent No.: US 12,632,449 B1
(45) Date of Patent: May 19, 2026

(54) SYSTEMS AND METHODS FOR GENERATIVE AI FINE-TUNING FRAMEWORK FOR NATURAL LANGUAGE TO CUSTOM QUERY SYNTAX TRANSLATION

(71) Applicant: SAS Institute Inc., Cary, NC (US)

(72) Inventor: Ruth Oluwadamilola Akintunde, Wake Forest, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/348,956

(22) Filed: Oct. 3, 2025

Related U.S. Application Data

(60) Provisional application No. 63/743,366, filed on Jan. 9, 2025.

(51) Int. Cl.
 *G06F 16/2452* (2019.01)
 *G06N 20/00* (2019.01)
(52) U.S. Cl.
 CPC ....... *G06F 16/24522* (2019.01); *G06N 20/00* (2019.01)
(58) Field of Classification Search
 CPC .......................... G06F 16/24522; G06N 20/00
 USPC ......................................................... 707/759
 See application file for complete search history.

(56) References Cited

U.S. PATENT DOCUMENTS

| | | | | |
|---|---|---|---|---|
| 12,373,425 | B1 * | 7/2025 | Rai | G06F 16/248 |
| 2021/0034621 | A1 * | 2/2021 | Patel | G06F 16/9032 |

| | | | | |
|---|---|---|---|---|
| 2021/0264902 | A1 * | 8/2021 | Larson | G06F 40/35 |
| 2022/0207038 | A1 * | 6/2022 | Cenciotti | G06N 3/0475 |
| 2025/0259005 | A1 * | 8/2025 | Du | G06F 16/24522 |

OTHER PUBLICATIONS

Song et al., "Improved Techniques for Training Consistency Models," arxiv.org, arXiv:2310.14189v1, Oct. 22, 2023, pp. 1-20.
Song et al., "Consistency Models," arxiv.org, arXIv:2303.01469v2, May 31, 2023, pp. 1-42.
Lewis et al., "Retrieval-Augmented Generation for Knowledge-Intensive NLP Tasks," arxiv.org, arXV:2005.11401v4, Apr. 12, 2021, pp. 1-19.
Shern et al., "MLE-Bench: Evaluating Machine Learning Agents on Machine Learning Engineering," arxiv.org arXiv:2410.07095v5, Dec. 20, 2024, pp. 1-29.
Open AI, "GPT-4 Technical Report," arxiv.org, arXiv:2303.08774v6, Mar. 4, 2024, pp. 1-100.

\* cited by examiner

*Primary Examiner* — Cam Linh T Nguyen
(74) *Attorney, Agent, or Firm* — Padowithz Alce; Quintin Scheitlin; Alce PLLC

(57) ABSTRACT

A system, method, and computer-program product includes obtaining a data query schema that provides instructions for constructing computer-executable search queries according to a search syntax permitted by a target data query language, extracting, from the data query schema, one or more sets of query components that define the search syntax of the target data query language, synthetically generating a plurality of natural language-to-search query training data samples based at least in part on the one or more sets of query components, and configuring a natural language-to-search query machine learning model based on training a machine learning text-to-text transformer model using the plurality of natural language-to-search query training data samples.

30 Claims, 33 Drawing Sheets

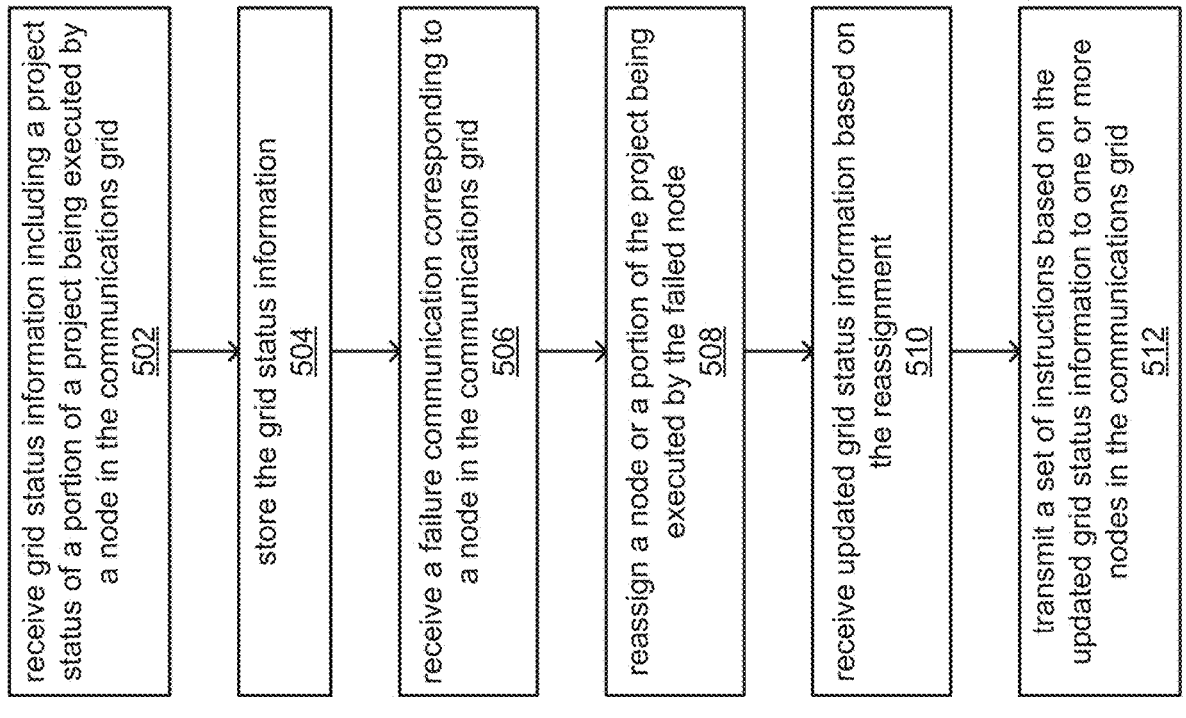

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

900 instantive event stream
processing engine
900 create engine container
902 instantiate continuous queries
904 initialize publish/subscribe
capability
906 start projects
908 receive event block
910 process event block
912 output processed event block
914 stop
processing?
916 yes no stop projects
918 shutdown
920 receive training data 1102 train machine-learning model using training data 1104 evaluate machine-learning model 1106 adequate accuracy? 1108 no yes receive new data 1110 analyze new data using trained machine-learning model 1112 post-processing on result 1114

1100

1300

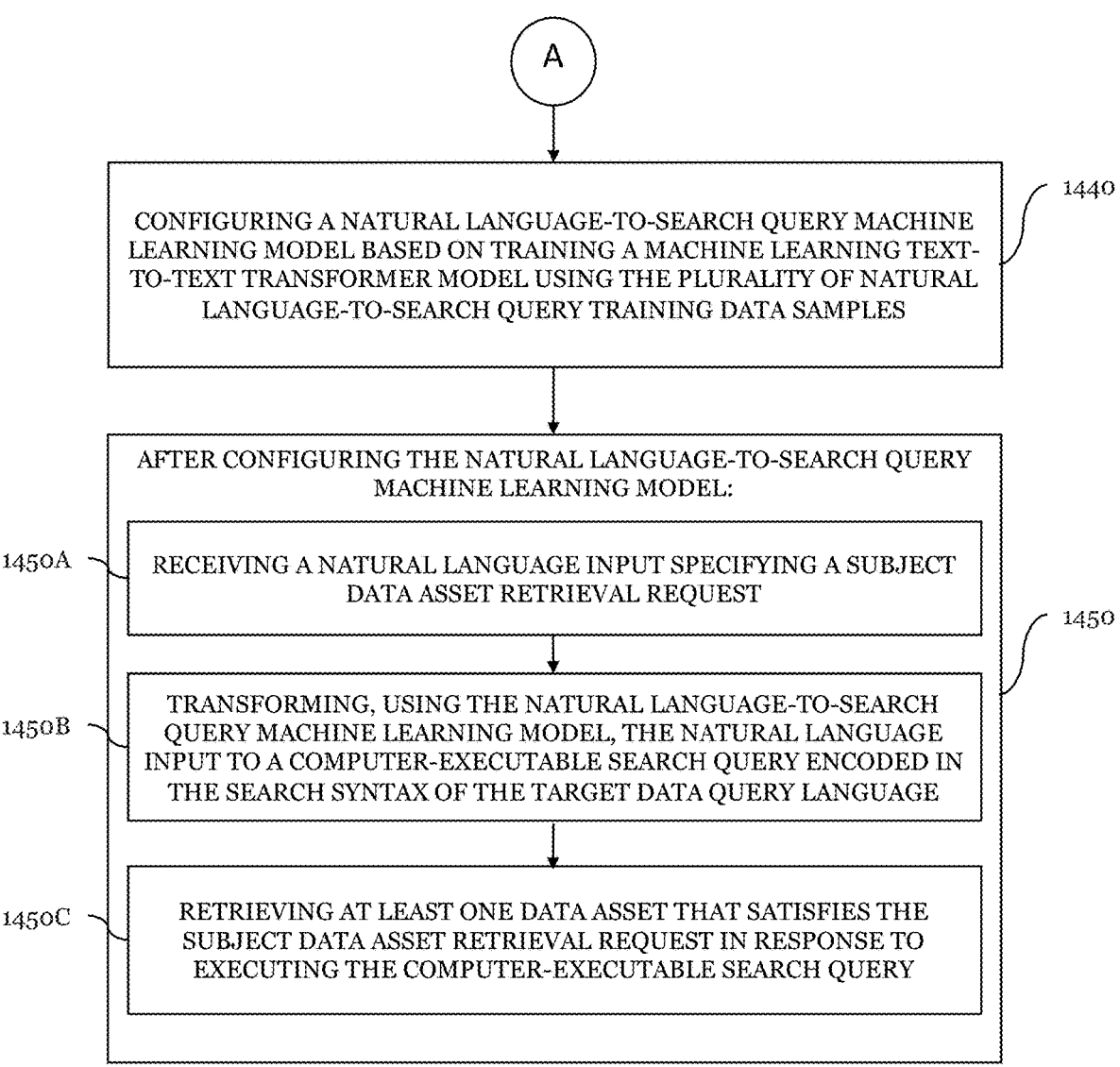

CONFIGURING A NATURAL LANGUAGE-TO-SEARCH QUERY MACHINE LEARNING MODEL BASED ON TRAINING A MACHINE LEARNING TEXT-TO-TEXT TRANSFORMER MODEL USING THE PLURALITY OF NATURAL LANGUAGE-TO-SEARCH QUERY TRAINING DATA SAMPLES

1440

AFTER CONFIGURING THE NATURAL LANGUAGE-TO-SEARCH QUERY MACHINE LEARNING MODEL:

1450A — RECEIVING A NATURAL LANGUAGE INPUT SPECIFYING A SUBJECT DATA ASSET RETRIEVAL REQUEST

1450

1450B — TRANSFORMING, USING THE NATURAL LANGUAGE-TO-SEARCH QUERY MACHINE LEARNING MODEL, THE NATURAL LANGUAGE INPUT TO A COMPUTER-EXECUTABLE SEARCH QUERY ENCODED IN THE SEARCH SYNTAX OF THE TARGET DATA QUERY LANGUAGE

1450C — RETRIEVING AT LEAST ONE DATA ASSET THAT SATISFIES THE SUBJECT DATA ASSET RETRIEVAL REQUEST IN RESPONSE TO EXECUTING THE COMPUTER-EXECUTABLE SEARCH QUERY

Natural Language Input

Data Asset Retrieval
Graphical User Interface
— 1604

Data Asset Retrieval Request 1606
of
Natural Language Input 1602

Natural Language-to-
Search Query Machine
Learning Model
— 1516

Computer-Executable Search Query
1608

Search Query Execution
Service
— 1610

Data Assets 1612
associated with
Data Asset Retrieval Request 1606

1510

Natural Language-to-Search Query Training Data Samples

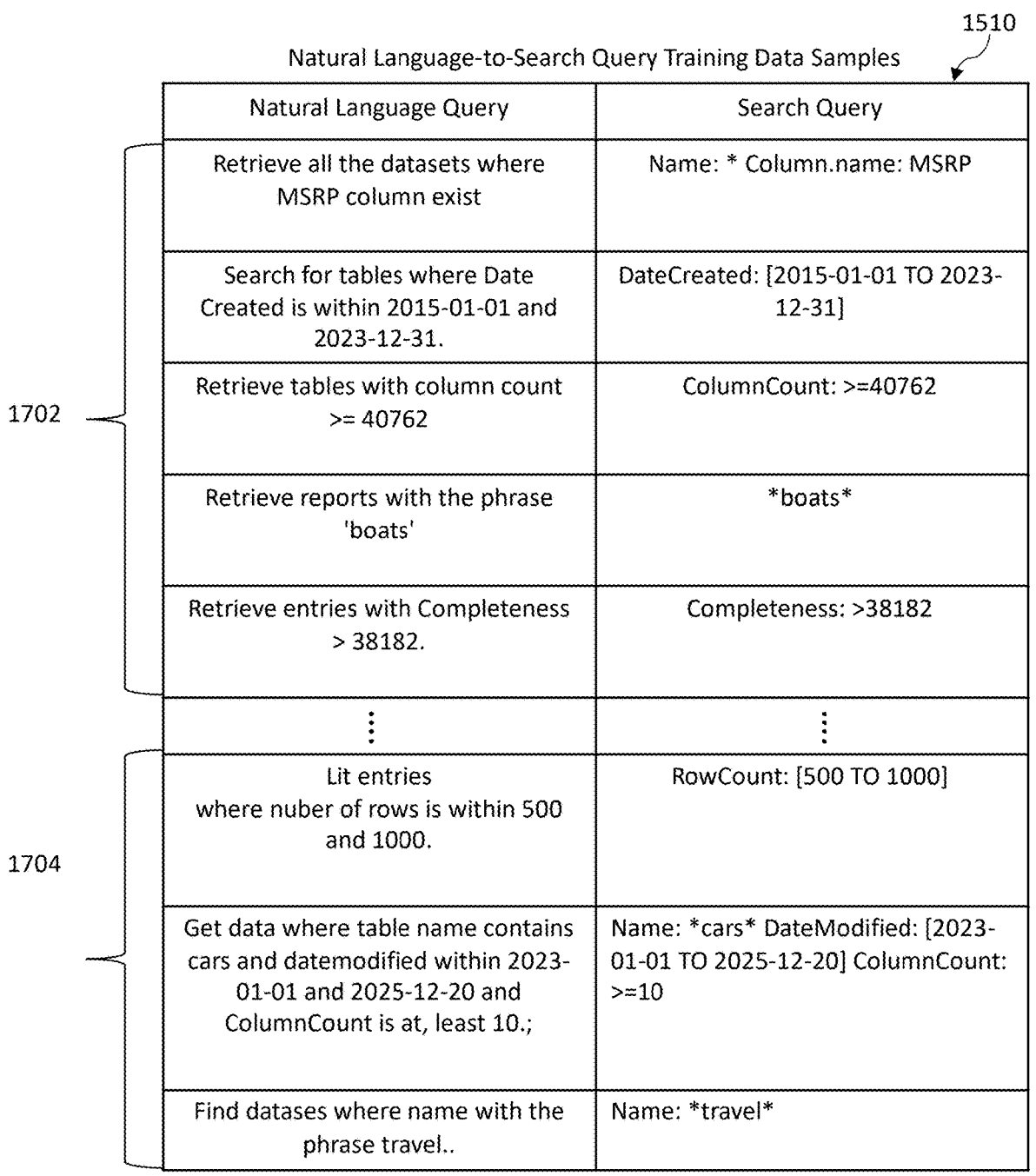

| Natural Language Query | Search Query |
|---|---|
| Retrieve all the datasets where MSRP column exist | Name: * Column.name: MSRP |
| Search for tables where Date Created is within 2015-01-01 and 2023-12-31. | DateCreated: [2015-01-01 TO 2023-12-31] |
| Retrieve tables with column count >= 40762 | ColumnCount: >=40762 |
| Retrieve reports with the phrase 'boats' | *boats* |
| Retrieve entries with Completeness > 38182. | Completeness: >38182 |
| ⋮ | ⋮ |
| Lit entries where nuber of rows is within 500 and 1000. | RowCount: [500 TO 1000] |
| Get data where table name contains cars and datemodified within 2023-01-01 and 2025-12-20 and ColumnCount is at, least 10.; | Name: *cars* DateModified: [2023-01-01 TO 2025-12-20] ColumnCount: >=10 |
| Find datases where name with the phrase travel.. | Name: *travel* |

| Query Component | To find a | Type | Sample query | Sample suggestions (including previous values) |
|---|---|---|---|---|
| AccessedBy: | the principal who most recently accessed the data set. | Text | AccessedBy: "sas.admin-content-loader" | user ID, sas.audit |
| AssetType: | assets of a specified type | Keyword | AssetType: "dataflow" | castable, reference, sastable |
| AssignedAssets | assets assigned to a glossary term | Numeric | AssignedAsseta: 1 | previous serached queries |
| Column.{} | columns with a specified nested attribute | Nested | Column: {name:orders} | orders |
| Column.dataType: | columns of a specified data type | Keyword | Column.dataType: "num" | char, num |
| Column.informationPrivacy: | columns with a specified information privacy value | Keyword | Column.informationPrivacy: private | private, candidate, sensitive |
| Column.keywords: | terms used to search and describe the data set | Text | Column.keywords: address name street | previous queries |
| Column.label: | label associated with a column | Text | Column.label: "cake flovor" | previously searched labels |
| Column.name: | name associated with a column | Text | Column.name: "flovor" | previously searched column names such price and date |
| Column.notes: | columns that contain the specified text found in attached notes | Text | Column.notes: "customer" | suggestions not provided for the Column.notes facet |
| Column.semanticType: | columns with a specified semantic type used in SAS Information Governance | Keyword | Column.semanticType: "AGE" | semantic types such as date, gender, country |
| Column.status: | review status assigned by a data steward | Keyword | Column.status: "review" | none review approved flagged warning |
| Column.term | assets that have column to term relationships | Text | Column.term: "logistics" | glossary terms such as accountability, biometrics, best available techniques |
| ColumnCount. | assets with specified numbers of columns | Numeric | ColumnCount: (10 50 100) | no suggestions |
| Completeness: | assets with specified percentages of completeness | Numeric | Completeness: (94 to 100) | no suggestions |
| Contacts: | contacts associated with an asset | Text | Contacts: "DQ_CONTACTS" | previous queries |
| ContentType: | type of content such as application/pdf, text/plain, or text/xml, | Text | ContentType: "text/plain" | text/csv, application/octet.stream |
| CreatedBy: | assets with specific CreatedBy values | Text | CreatedBy: "sas" | UserID, SAS, sas supplied, sas.dataplans |
| DateAccessed: | date on which the data set was most recently accessed | Date | DateAccessed: [2021-01-01 TO 2021-09-28] | Previous week, Previous quarter |
| DateAnalyzed: | assets analyzed on specified dates | Date | DateAnalyzed: [2021-01-01 TO 2021-09-28] | Previous week, Previous quarter |

| Query Component | To find a | Type | Sample query | Sample suggestions (including previous values) |
|---|---|---|---|---|
| DateCreated: | assets created on specified dates | Date | DateCreated: "Previous day" | Previous month |
| DateModified: | assets modified on specified dates | Date | DateModified: "Previous month" | Previous day, Date Range |
| DatasetSize | data sets of specified sizes (in bytes) | Numeric | DatasetSize:1000 | no suggestions |
| Definition | term assets with specified strings in the Description fields | Text | Definition:storage | Previous queries |
| Description: | assets with specified strings in descriptions | Text | Description:num* | suggestions not provided for the Description facet |
| FileExtension: | assets with specified file extensions | Keyword | FileExtension: "csv" | csv, sas7bdat, sashdat |
| Folder:{} | columns with a specified nested attribute | Nested | Folder: {Name:sasuser} | previous queries |
| Folder.name | names of folder assets | Text | Folder.name: "images" | previous queries |
| InformationPrivacy: | assets that contain specified information privacy value | Keyword | InformationPrivacy: "_private" | private, candidate, sensitive |
| Keywords: | assets that contain specified keywords | Text | Keywords: "coffee" | changed, new, none |
| Label: | label associated with an asset | Text | Label:type | type of order, type of vehicle |
| Languages | languages detected in the dataset | Text | Language: "English" | Spanish, Chinese, French |
| Library:{} | assets from specified libraries | Nested | Library: [name=Public] | Samples, public |
| Library.name | assets from libraries that have the specified name | Text | Library.name: Public | Samples, Census |
| Library.region: | assets from libraries that have the specified region value | Text | Library.region:texas | cas bot region |
| Locale: | assets associated specified locales | Keyword | Locale: "enusa" | dedeu |
| ModifiedBy: | assets modified by specified entities | Text | ModifiedBy: "sas supplied" | sasboot, jmjones |
| Name: | name associated with an asset | Text | Name:cust | customers_us.csv, customers_order_summary.sashdat |
| ParentID | term asset with a parent term that has the specified UUID (universally unique identifier). | Text | ParentID: "1e7b7353-3b04-4d53-9d57-125ca0772ae6" | previous queries |

| Query Component | To find a | Type | Sample query | Sample suggestions (including previous values) |
|---|---|---|---|---|
| ReportData | tables used by a report | Text | ReportData: "CustomerRisk" | previous queries |
| ReportDataItem | report data items such as table columns | Text | ReportDataItem: "status" | previous queries |
| ReportObjectType | report object types such as BarChart, geo, and WordCloud, ... | Text | ReportObjectType: BarChart | previous queries |
| ReportText | text in a report | Text | ReportText:"month" | previous queries |
| RowCount: | assets with a specified row count | Numeric | RowCount (10 50 100) | no suggestions |
| Status: | assets with a specified status | Keyword | Status: "none" | approved, none |
| StepColumn | assets with a specified step column for data flows in SAS Studio | Text | StepColumn: "name" | div, division |
| StepCount: | assets with a specified step count for data flows in SAS Studio | Numeric | StepCount:10 | no suggestions |
| StepName | assets with a specified step name for data flows in SAS Studio | Text | StepName: "query" | import, filter rows, sas program, sort |
| StepType | assets with a specified step type for data flows in SAS Studio | Text | StepType: "filter rows" | import, query, sas program, sort |
| Tags | tags associated with assets | Text | Tags: "account" | previous queries |
| Topic | topic identified in an asset summary | Keyword | Topic: "article" | no suggestions |
| TopicKeywords | topic keyword identified in an asset summary | Text | TopicKeywords: "brand" | presents, flavor, profile |
| TopicParent | topic keyword identified in an asset summary | Keyword | TopicParent: "audience" | place, person, product |

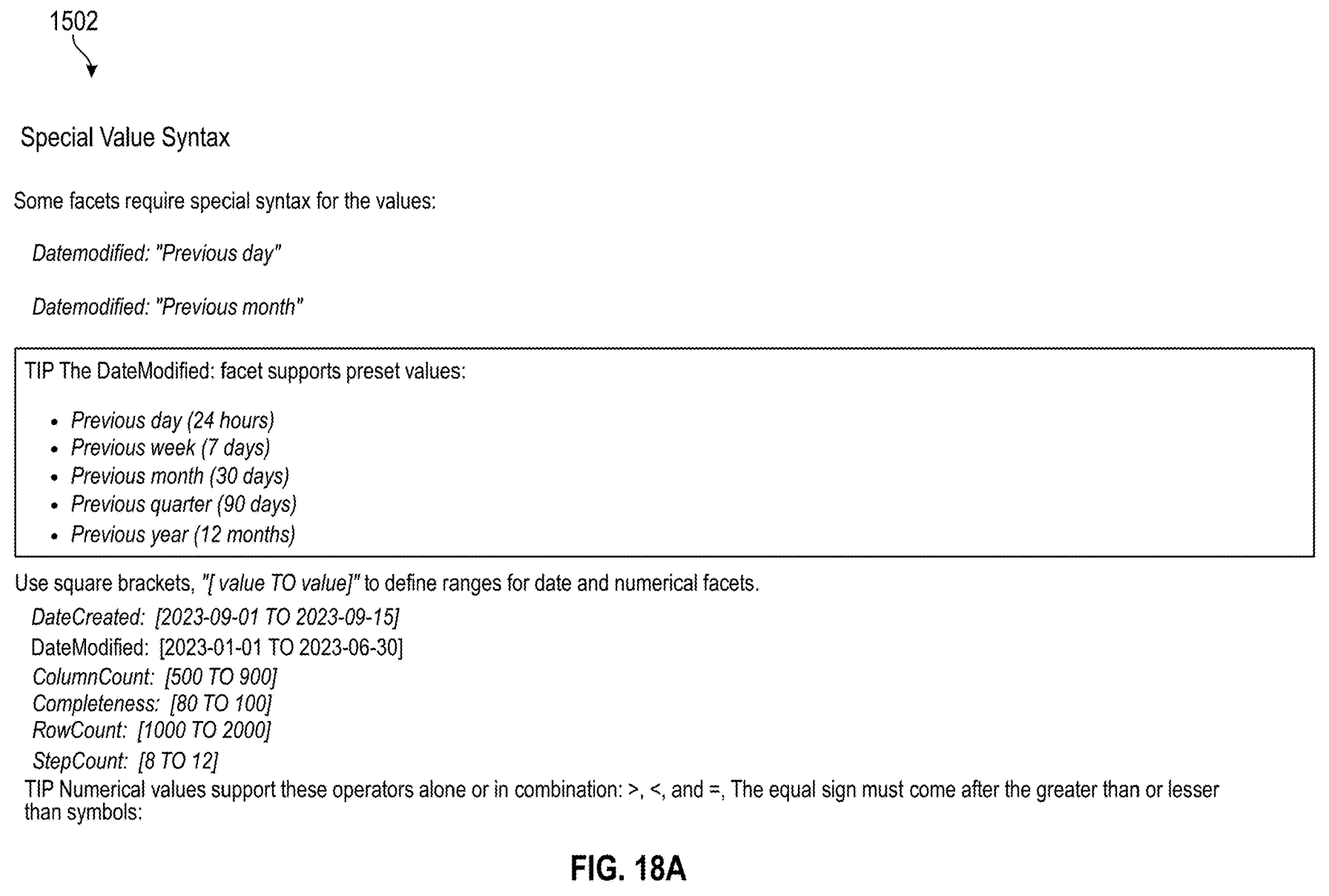

Special Value Syntax

Some facets require special syntax for the values:

*Datemodified: "Previous day"*

*Datemodified: "Previous month"*

TIP The DateModified: facet supports preset values:

- *Previous day (24 hours)*
- *Previous week (7 days)*
- *Previous month (30 days)*
- *Previous quarter (90 days)*
- *Previous year (12 months)*

Use square brackets, "*[value TO value]*" to define ranges for date and numerical facets.

*DateCreated: [2023-09-01 TO 2023-09-15]*
*DateModified: [2023-01-01 TO 2023-06-30]*
*ColumnCount: [500 TO 900]*
*Completeness: [80 TO 100]*
*RowCount: [1000 TO 2000]*
*StepCount: [8 TO 12]*

TIP Numerical values support these operators alone or in combination: >, <, and =. The equal sign must come after the greater than or lesser than symbols:

FIG. 18A

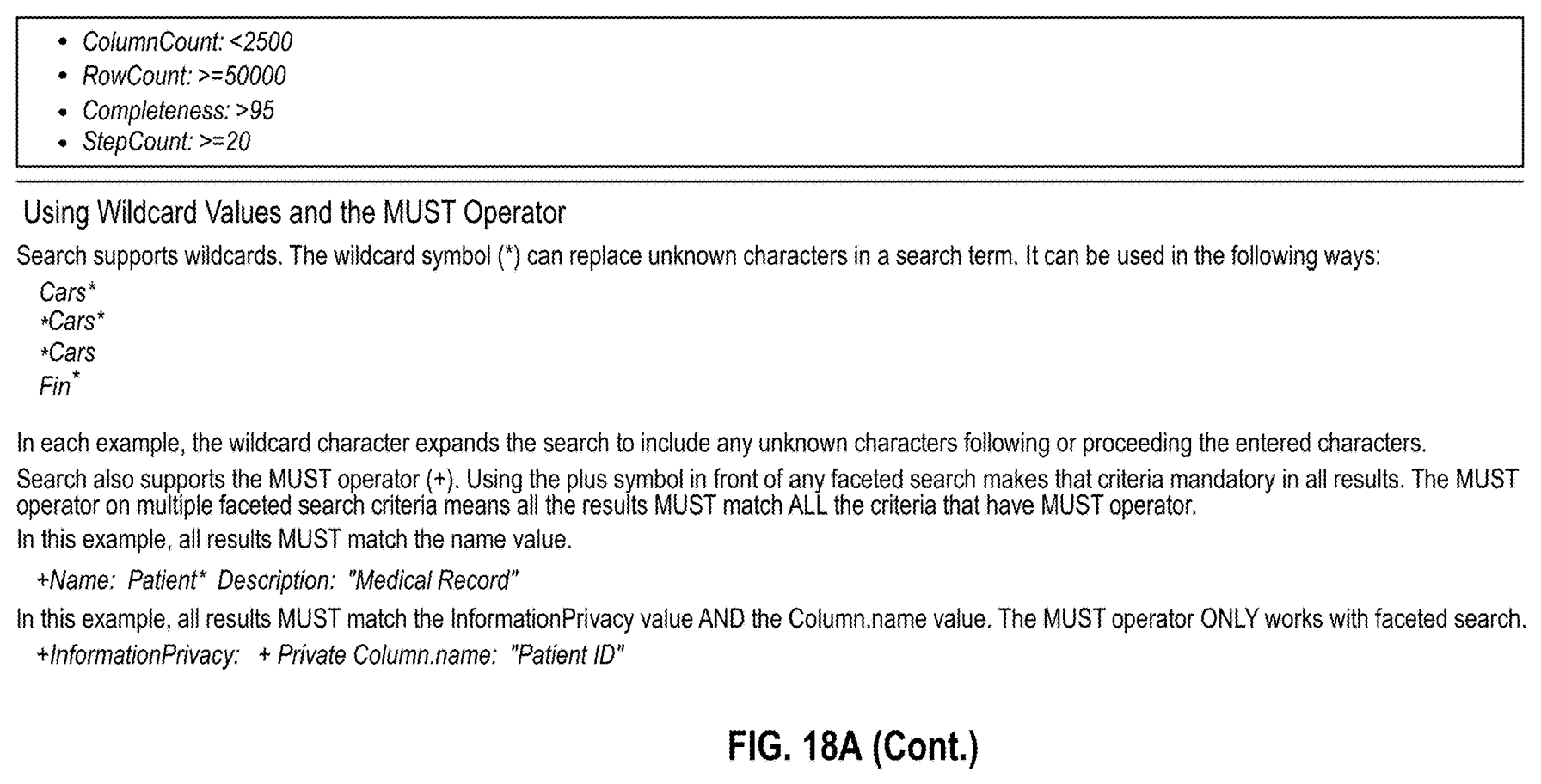

- ColumnCount: <2500
- RowCount: >=50000
- Completeness: >95
- StepCount: >=20

Using Wildcard Values and the MUST Operator

Search supports wildcards. The wildcard symbol (*) can replace unknown characters in a search term. It can be used in the following ways:

Cars*
*Cars*
*Cars
Fin*

In each example, the wildcard character expands the search to include any unknown characters following or proceeding the entered characters.

Search also supports the MUST operator (+). Using the plus symbol in front of any faceted search makes that criteria mandatory in all results. The MUST operator on multiple faceted search criteria means all the results MUST match ALL the criteria that have MUST operator.

In this example, all results MUST match the name value.

+Name: Patient* Description: "Medical Record"

In this example, all results MUST match the InformationPrivacy value AND the Column.name value. The MUST operator ONLY works with faceted search.

+InformationPrivacy: + Private Column.name: "Patient ID"

FIG. 18A (Cont.)

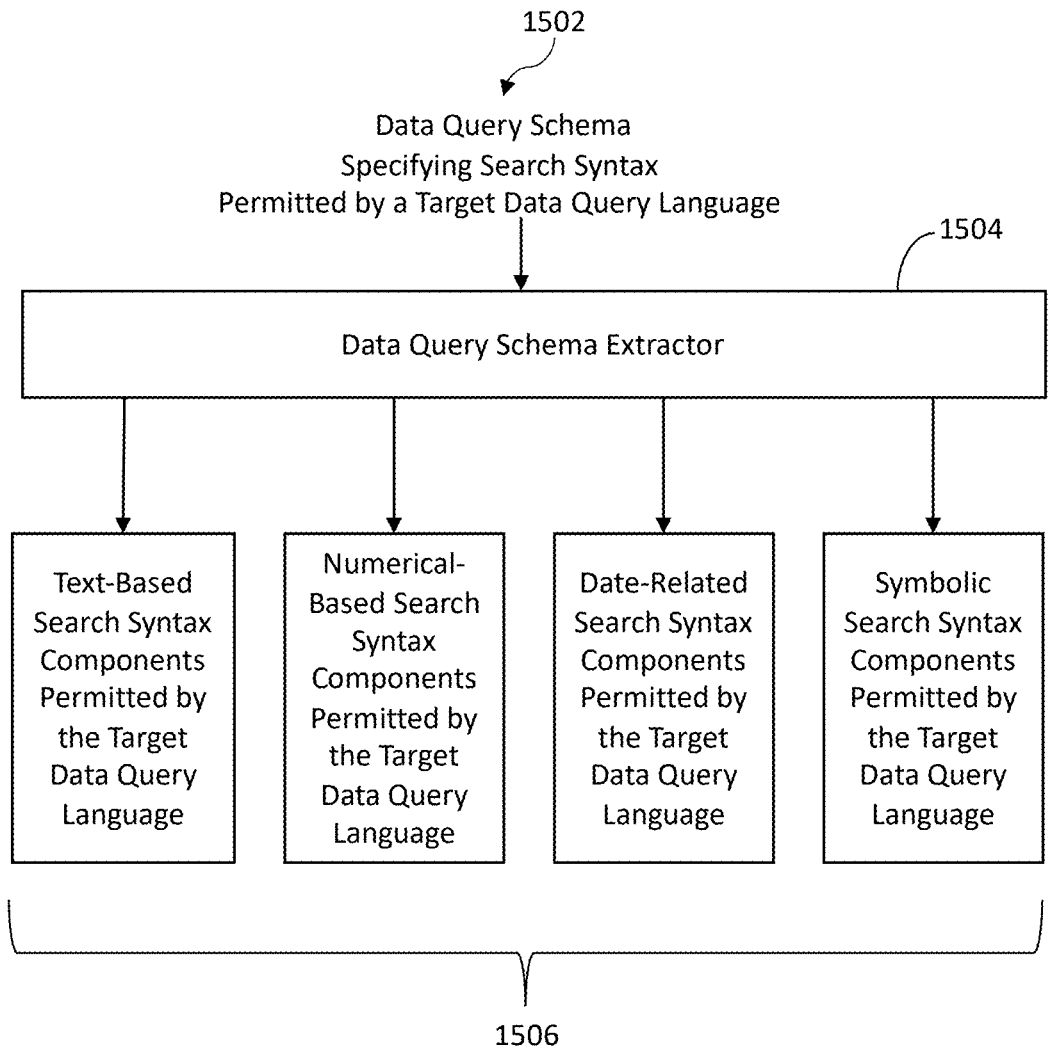

1502

Data Query Schema
Specifying Search Syntax
Permitted by a Target Data Query Language

1504

Data Query Schema Extractor

| Text-Based Search Syntax Components Permitted by the Target Data Query Language | Numerical-Based Search Syntax Components Permitted by the Target Data Query Language | Date-Related Search Syntax Components Permitted by the Target Data Query Language | Symbolic Search Syntax Components Permitted by the Target Data Query Language |

Retrieve datasets where Date Analyzed is in the
'Previous day'

Natural Language-to-
Search Query Machine
Learning Model

1516

1608

DateAnalyzed: "Previous day"

1602

Get data with date modified within 2020-01-01 and
2022-12-20

Natural Language-to-
Search Query Machine
Learning Model

1516

1608

DateModified: [2020-01-01 TO 2022-12-20]

1602 give me datasets with the phrase "Orion Star Sport"

1608

*Orion Star Sport*

1602 retrieve assets with column name "weight"

1608

Column.name: "weight"

1602

Get data where table name contains cars and datemodified within 2023-01-01 and 2025-12-20 and ColumnCount is at least 10

Natural Language-to-Search Query Machine Learning Model    1516

1608

Name: *cars* DateModified: [2023-01-01 TO 2025-12-20] ColumnCount: >=10

1602

Search for datasets with ColumnCount less than 90

Natural Language-to-Search Query Machine Learning Model    1516

1608

ColumnCount: <90

SYSTEMS AND METHODS FOR GENERATIVE AI FINE-TUNING FRAMEWORK FOR NATURAL LANGUAGE TO CUSTOM QUERY SYNTAX TRANSLATION

CROSS-REFERENCE TO RELATED APPLICATIONS

This application claims the benefit of U.S. Provisional Application No. 63/743,366, filed on 9 Jan. 2025, which is incorporated in its entirety by this reference.

TECHNICAL FIELD

This invention relates generally to the machine learning field, and more specifically, to new and useful systems and methods for training and fine-tuning a machine learning model.

BACKGROUND

In traditional data searching platforms, search requests must be expressed in a query syntax that follows the rules of the underlying search system. Consequently, such traditional data searching platforms are unable to process search requests that deviate from the required query syntax. Furthermore, this limitation prevents non-technical users, first-time users, and other users unfamiliar with the required query syntax from using traditional data searching platforms.

Therefore, there is a need in the art for a data searching platform that is operably configured to receive a search request in an unstructured format (e.g., natural language), translate the search request into a search syntax compatible with the data searching platform, and execute the translated search request to retrieve one or more target data assets. The embodiments of the present application provide technical solutions that address, at least, the needs described above, as well as the deficiencies of the state of the art.

BRIEF SUMMARY OF THE EMBODIMENTS

In one embodiment, a computer-program product comprising a non-transitory machine-readable storage medium storing computer instructions that, when executed by one or more processors, perform operations including obtaining a data query schema that provides instructions for constructing computer-executable search queries according to a search syntax permitted by a target data query language; extracting, from the data query schema, one or more sets of query components that define the search syntax of the target data query language, wherein the one or more sets of query components include: a first set of query components comprising text-based search syntax components permitted by the target data query language, a second set of query components comprising numerical-based search syntax components permitted by the target data query language, and a third set of query components comprising date-related search syntax components permitted by the target data query language; synthetically generating a plurality of natural language-to-search query training data samples based at least in part on the one or more sets of query components, wherein each of the plurality of natural language-to-search query training data samples includes: a synthetically generated natural language query specifying a data asset retrieval request, and a synthetically generated search query that represents the data asset retrieval request in the search syntax of the target data query language; and configuring a natural language-to-search query machine learning model based on training a machine learning text-to-text transformer model using the plurality of natural language-to-search query training data samples.

In one embodiment, the computer instructions, when executed by the one or more processors, perform operations further comprising after configuring the natural language-to-search query machine learning model: receiving a natural language input specifying a subject data asset retrieval request; transforming, using the natural language-to-search query machine learning model, the natural language input to a computer-executable search query encoded in the search syntax of the target data query language; and retrieving at least one data asset that satisfies the subject data asset retrieval request in response to executing the computer-executable search query.

In one embodiment synthetically generating the plurality of natural language-to-search query training data samples includes synthetically generating a plurality of erroneous natural language-to-search query training data samples, wherein each of the plurality of erroneous natural language-to-search query training data samples includes: an erroneous natural language query specifying a respective erroneous data asset retrieval request, and a corresponding search query that correctly represents the erroneous natural language query in the search syntax of the target data query language.

In one embodiment, the erroneous natural language query of each of the plurality of erroneous natural language-to-search query training data samples includes at least one of a grammatical error in the respective erroneous data asset retrieval request, a punctuation error in the respective erroneous data asset retrieval request, a spelling error in the respective erroneous data asset retrieval request, a typographical error in the respective erroneous data asset retrieval request, and a language translation error in the respective erroneous data asset retrieval request.

In one embodiment, the plurality of natural language-to-search query training data samples include a first plurality of natural language-to-search query training data samples associated with a first distinct human language, wherein each distinct training data sample of the first plurality of natural language-to-search query training data samples includes: a computer-generated natural language query specifying a data asset retrieval request textually represented in the first distinct human language, and a computer-generated search query that represents the computer-generated natural language query in the search syntax of the target data query language, a second plurality of natural language-to-search query training data samples associated with a second distinct human language, wherein each distinct training data sample of the second plurality of natural language-to-search query training data samples includes: a machine-generated natural language query specifying a data asset retrieval request textually represented in the second distinct human language, and a machine-generated search query that represents the machine-generated natural language query in the search syntax of the target data query language, and a third plurality of natural language-to-search query training data samples associated with a third distinct human language, wherein each distinct training data sample of the third plurality of natural language-to-search query training data samples includes: a system-generated natural language query specifying a data asset retrieval request textually represented in the third distinct human language, and a system-generated search query that represents the system-generated natural language query in the search syntax of the target data query language.

In one embodiment, the computer instructions, when executed by the one or more processors, perform operations further comprising: in response to receiving the natural language input specifying the subject data asset retrieval request: automatically transforming the natural language input to the computer-executable search query using the natural language-to-search query machine learning model when the natural language input is textually expressed in one of the first distinct human language, the second distinct human language, and the third distinct human language.

In one embodiment, the natural language-to-search query machine learning model is trained to handle natural language expressions expressed in any one of a plurality of distinct human languages, and the natural language input is transformed into the computer-executable search query using the natural language-to-search query machine learning model when the natural language input is expressed in at least one of the plurality of distinct human languages.

In one embodiment, the computer instructions, when executed by the one or more processors, perform operations further comprising: instantiating a data asset retrieval graphical user interface that includes an asset retrieval search bar; receiving, at the asset retrieval search bar of the data asset retrieval graphical user interface, the natural language input specifying the subject data asset retrieval request; commencing the execution of the computer-executable search query in response to detecting a user input selecting a search initiation element displayed within the asset retrieval search bar; and displaying, by the data asset retrieval graphical user interface, the at least one data asset that satisfies the subject data asset retrieval request in response to executing the computer-executable search query.

In one embodiment, transforming the natural language input to the computer-executable search query includes detecting, using the natural language-to-search query machine learning model, at least one search constraint included in the natural language input; determining, using the natural language-to-search query machine learning model, the at least one search constraint syntactically corresponds to a search facet included in one of the one or more sets of query components; and extracting, from the natural language input using the natural language-to-search query machine learning model, a parameter value for the search facet, wherein the computer-executable search query includes the search facet and the parameter value.

In one embodiment the search facet corresponds to a query syntax element associated with a target metadata attribute, the parameter value specifies a required value or a range of values for the target metadata attribute, and the at least one data asset is retrieved from a computer database storing a plurality of datasets based on the at least one data asset satisfying a search condition defined by a combination of the search facet and the parameter value.

In one embodiment, the natural language input specifying the subject data asset retrieval request corresponds to a multi-constraint search request provided in unstructured text, and transforming the natural language input to the computer-executable search query includes: detecting, by the natural language-to-search query machine learning model, the multi-constraint search request includes a first search constraint, a second search constraint, and a third search constraint; determining, by the natural language-to-search query machine learning model, (a) the first search constraint of the multi-constraint search request is syntactically translatable to a text-based search facet included in the first set of query components, (b) the second search constraint of the multi-constraint search request is syntactically translatable to a date-based search facet included in the third set of query components, and (c) the third search constraint of the multi-constraint search request is syntactically translatable to a numeric-based search facet included in the second set of query components; and determining, based on the natural language-to-search query machine learning model assessing the multi-constraint search request, (i) a text-based parameter value for the text-based search facet, (ii) a date-based parameter value for the date-based search facet, and (iii) a numeric-based parameter value for the numeric-based search facet.

In one embodiment, the computer-executable search query includes the text-based search facet, the text-based parameter value, the date-based search facet, the date-based parameter value, the numeric-based search facet, and the numeric-based parameter value.

In one embodiment, the natural language input specifying the subject data asset retrieval request includes a string of unstructured text, and transforming the natural language input to the computer-executable search query includes detecting, by the natural language-to-search query machine learning model, a string of alphabetic characters included in the string of unstructured text syntactically corresponds to a query component included in the one or more sets of query components, and converting, by the natural language-to-search query machine learning model, a string of numeric characters included in the string of unstructured text to a parameter value that is in a syntax format compatible with the query component, wherein the string of numeric characters does not conform to the syntax format compatible with the query component, and the computer-executable search query includes the query component and the parameter value.

In one embodiment, the natural language input specifying the subject data asset retrieval request includes a string of text, and transforming the natural language input to the computer-executable search query includes determining, by the natural language-to-search query machine learning model, a set of alphabetic characters included in the string of text syntactically corresponds to a query component included in the one or more sets of query components, and translating, by the natural language-to-search query machine learning model, a set of numeric characters included in the string of text to a range of parameter values that is in a syntax format compatible with the query component, wherein: the string of numeric characters does not conform to the syntax format compatible with the query component, and the computer-executable search query includes the query component and the range of parameter values.

In one embodiment, the natural language input specifying the subject data asset retrieval request includes one or more strings of unstructured text, and transforming the natural language input to the computer-executable search query includes: determining, by the natural language-to-search query machine learning model, the one or more strings of unstructured text syntactically correspond to a plurality of query components included in the one or more sets of query components, and determining, by the natural language-to-search query machine learning model, a respective parameter value for each query component of the plurality of query components based on the natural language-to-search query machine learning model assessing the one or more strings of unstructured text, wherein: the computer-executable search query includes the plurality of query components and the respective parameter value determined for each query component of the plurality of query components.

In one embodiment, the natural language input specifying the subject data asset retrieval request includes one or more strings of unstructured text, and transforming the natural language input to the computer-executable search query includes: determining, by the natural language-to-search query machine learning model, the one or more strings of unstructured text syntactically corresponds to a subject query component included in the one or more sets of query components, and generating, by the natural language-to-search query machine learning model, a respective parameter value for the subject query component based on the natural language-to-search query machine learning model assessing the one or more strings of unstructured text, wherein: the computer-executable search query includes the subject query component and the respective parameter value generated for the subject query component.

In one embodiment, the one or more sets of query components further include a fourth set of query components comprising symbolic search syntax components permitted by the target data query language, the one or more strings of unstructured text of the natural language input specifying the subject data asset retrieval request include one or more alphabetic text strings textually expressing a symbolic search operator, and the natural language-to-search query machine learning model generates the respective parameter value for the subject query component by converting the symbolic search operator textually expressed in one of the one or more alphabetic text strings to one or more corresponding symbolic search syntax components included in the fourth set of query components.

In one embodiment, the computer instructions, when executed by the one or more processors, perform operations further comprising in response to receiving the natural language input specifying the subject data asset retrieval request: automatically routing the natural language input to the natural language-to-search query machine learning model, wherein the natural language input is automatically transformed to the computer-executable search query in response to the natural language input being routed to the natural language-to-search query machine learning model.

In one embodiment, synthetically generating the plurality of natural language-to-search query training data samples includes iteratively generating a new natural language-to-search query training data sample until a predetermined number of training data samples have been generated, wherein a respective iteration includes: synthetically generating a new natural language query that includes a new data asset retrieval request using a predefined natural language query generation template; and synthetically generating a new computer-executable search query that syntactically represents the new natural language query in the search syntax of the target data query language by inserting at least one query component of the one or more sets of query components and an associated parameter value for the at least one query component into a predefined search query generation template.

In one embodiment, the one or more sets of query components further include a fourth set of query components comprising symbolic search syntax components permitted by the target data query language, and synthetically generating a respective natural language-to-search query training data sample of the plurality of natural language-to-search query training data samples includes randomly selecting a numeric value from a predetermined range of numeric values; randomly selecting a symbolic-based search syntax component from the fourth set of query components; randomly selecting a numerical-based search syntax component from the second set of query components; generating a subject search query by inserting the numeric value, the symbolic-based search syntax component, and the numerical-based search syntax component into corresponding slots of a predefined search query generation template; obtaining, from a predetermined set of symbolic search syntax component variants, a natural language variant that textually represents the symbolic-based search syntax component in alphabetic characters; obtaining a textual representation of the numerical-based search syntax component that is in a lexical form different from the numerical-based search syntax component randomly selected from the second set of query components; randomly selecting one or more command tokens from a predetermined set of command tokens; randomly selecting one or more entity tokens from a predetermined set of entity tokens; and generating a subject natural language query by inserting the one or more command tokens, the one or more entity tokens, the textual representation of the numerical-based search syntax component, the natural language variant that textually represents the symbolic-based search syntax component in alphabetic characters, and the numeric value into corresponding slots of a predefined natural language query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, the one or more sets of query components further include a fourth set of query components comprising symbolic search syntax components permitted by the target data query language, and synthetically generating a respective natural language-to-search query training data sample of the plurality of natural language-to-search query training data samples includes randomly selecting a numeric value from a predetermined range of numeric values; randomly selecting a symbolic-based search syntax component from the fourth set of query components; randomly selecting a numerical-based search syntax component from the second set of query components; generating a subject search query by inserting the numeric value, the symbolic-based search syntax component, and the numerical-based search syntax component into corresponding slots of a predefined search query generation template; obtaining a textual representation of the numerical-based search syntax component that is in a lexical form different from the numerical-based search syntax component randomly selected from the second set of query components; randomly selecting one or more command tokens from a predetermined set of command tokens; randomly selecting one or more entity tokens from a predetermined set of entity tokens; and generating a subject natural language query by inserting the one or more command tokens, the one or more entity tokens, the textual representation of the numerical-based search syntax component, the symbolic-based search syntax component randomly selected from the fourth set of query components, and the numeric value into corresponding slots of a predefined natural language query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, synthetically generating a respective natural language-to-search query training data sample of the plurality of natural language-to-search query training data samples includes randomly selecting a search facet from the one or more sets of query components; obtaining a textual representation of the search facet that is in a lexical form different from the search facet randomly selected from the one or more sets of query components; randomly selecting a contextual tag from a predetermined set of contextual tags; randomly selecting one or more command tokens from a predetermined set of command tokens; randomly selecting one or more entity tokens from a predetermined set of entity tokens; generating a subject natural language query by inserting the one or more command tokens, the one or more entity tokens, the textual representation of the search facet, and the contextual tag into corresponding slots of a pre-defined natural language query generation template; and generating a subject search query by inserting the search facet and the contextual tag into corresponding slots of a predefined search query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, synthetically generating a respective natural language-to-search query training data sample of the plurality of natural language-to-search query training data samples includes randomly selecting a search facet included in the one or more sets of query components; obtaining a textual representation of the search facet that is in a lexical form different from the search facet randomly selected from the one or more sets of query components; randomly selecting a term from a predetermined set of terms; randomly selecting one or more command tokens from a predetermined set of command tokens; randomly selecting one or more entity tokens from a predetermined set of entity tokens; generating a subject natural language query by inserting the one or more command tokens, the one or more entity tokens, the textual representation of the search facet, and the term into corresponding slots of a predefined natural language query generation template; and generating a subject search query by inserting the search facet and the term into corresponding slots of a predefined search query generation template, wherein the synthetically generated natural language query of the respective natural language-to-search query training data sample corresponds to the subject natural language query, and the synthetically generated search query of the respective natural language-to-search query training data sample corresponds to the subject search query.

In one embodiment, a computer-implemented method includes obtaining a data query schema that provides instructions for constructing computer-executable search queries according to a search syntax permitted by a target data query language; extracting, from the data query schema, one or more sets of query components that define the search syntax of the target data query language, wherein the one or more sets of query components include: a first set of query components comprising text-based search syntax components permitted by the target data query language, a second set of query components comprising numerical-based search syntax components permitted by the target data query language, and a third set of query components comprising date-related search syntax components permitted by the target data query language; synthetically generating a plurality of natural language-to-search query training data samples based at least in part on the one or more sets of query components, wherein each of the plurality of natural language-to-search query training data samples includes a synthetically generated natural language query specifying a data asset retrieval request, and a synthetically generated search query that represents the data asset retrieval request in the search syntax of the target data query language; and configuring a natural language-to-search query machine learning model based on training a machine learning text-to-text transformer model using the plurality of natural language-to-search query training data samples.

In one embodiment, the computer-implemented method further includes after configuring the natural language-to-search query machine learning model receiving a natural language input specifying a subject data asset retrieval request; transforming, using the natural language-to-search query machine learning model, the natural language input to a computer-executable search query encoded in the search syntax of the target data query language; and retrieving a plurality of distinct datasets that satisfy the subject data asset retrieval request in response to executing the computer-executable search query.

In one embodiment, the natural language input specifying the subject data asset retrieval request includes one or more strings of unstructured text, and transforming the natural language input to the computer-executable search query includes determining, by the natural language-to-search query machine learning model, the one or more strings of unstructured text syntactically corresponds to a subject query component included in the one or more sets of query components, and generating, by the natural language-to-search query machine learning model, a respective parameter value for the subject query component based on the natural language-to-search query machine learning model assessing the one or more strings of unstructured text, wherein the computer-executable search query includes the subject query component and the respective parameter value generated for the subject query component.

In one embodiment, the one or more sets of query components further include a fourth set of query components comprising symbolic search syntax components permitted by the target data query language, the one or more strings of unstructured text of the natural language input specifying the subject data asset retrieval request include one or more alphabetic text strings textually expressing a symbolic search operator, and the natural language-to-search query machine learning model generates the respective parameter value for the subject query component by converting the one or more alphabetic text strings to one or more corresponding symbolic search syntax components included in the fourth set of query components.

In one embodiment, synthetically generating the plurality of natural language-to-search query training data samples includes synthetically generating a plurality of erroneous natural language-to-search query training data samples, wherein each of the plurality of erroneous natural language-to-search query training data samples includes an erroneous natural language query specifying a respective erroneous data asset retrieval request, and a corresponding search query that correctly represents the erroneous natural language query in the search syntax of the target data query language.

In one embodiment, the erroneous natural language query of each of the plurality of erroneous natural language-to-search query training data samples includes a grammatical error in the respective erroneous data asset retrieval request, a punctuation error in the respective erroneous data asset retrieval request, a spelling error in the respective erroneous data asset retrieval request, a typographical error in the respective erroneous data asset retrieval request, and a language translation error in the respective erroneous data asset retrieval request.

In one embodiment, a computer-implemented system including one or more processors; a memory; a computer-readable medium operably coupled to the one or more processors, the computer-readable medium having computer-readable instructions stored thereon that, when executed by the one or more processors, cause a computing device to perform operations comprising obtaining a data query schema that provides instructions for constructing computer-executable search queries according to a search syntax permitted by a target data query language; extracting, from the data query schema, one or more sets of query components that define the search syntax of the target data query language, wherein the one or more sets of query components include: a first set of query components comprising text-based search syntax components permitted by the target data query language, a second set of query components comprising numerical-based search syntax components permitted by the target data query language, and a third set of query components comprising date-related search syntax components permitted by the target data query language; synthetically generating a plurality of natural language-to-search query training data samples based at least in part on the one or more sets of query components, wherein each of the plurality of natural language-to-search query training data samples includes: a synthetically generated natural language query specifying a data asset retrieval request, and a synthetically generated search query that represents the data asset retrieval request in the search syntax of the target data query language; and configuring a natural language-to-search query machine learning model based on training a machine learning text-to-text transformer model using the plurality of natural language-to-search query training data samples.

In one embodiment, a computer-program product including a non-transitory machine-readable storage medium storing computer instructions that, when executed by one or more processors, perform operations including obtaining a data query schema that provides instructions for constructing computer-executable search queries according to a search syntax permitted by a target data query language, extracting, from the data query schema, one or more sets of query components that define the search syntax of the target data query language, wherein the one or more sets of query components include: a first set of query components comprising text-based search syntax components permitted by the target data query language, a second set of query components comprising numerical-based search syntax components permitted by the target data query language, and a third set of query components comprising date-related search syntax components permitted by the target data query language; synthetically generating a plurality of natural language-to-search query training data samples based at least in part on the one or more sets of query components, wherein each of the plurality of natural language-to-search query training data samples includes a synthetically generated natural language query specifying a data asset retrieval request, and a synthetically generated search query that represents the data asset retrieval request in the search syntax of the target data query language; configuring a natural language-to-search query machine learning model based on training a machine learning text-to-text transformer model using the plurality of natural language-to-search query training data samples; and after configuring the natural language-to-search query machine learning model: receiving a natural language input specifying a subject data asset retrieval request; transforming, using the natural language-to-search query machine learning model, the natural language input to a computer-executable search query encoded in the search syntax of the target data query language; and retrieving at least one data asset that satisfies the subject data asset retrieval request in response to executing the computer-executable search query.

In one embodiment, synthetically generating the plurality of natural language-to-search query training data samples includes synthetically generating a plurality of erroneous natural language-to-search query training data samples, wherein each of the plurality of erroneous natural language-to-search query training data samples includes an erroneous natural language query specifying a respective erroneous data asset retrieval request, and a corresponding search query that correctly represents the erroneous natural language query in the search syntax of the target data query language.

In one embodiment, the erroneous natural language query of each of the plurality of erroneous natural language-to-search query training data samples includes at least one of a grammatical error in the respective erroneous data asset retrieval request, a punctuation error in the respective erroneous data asset retrieval request, a spelling error in the respective erroneous data asset retrieval request, a typographical error in the respective erroneous data asset retrieval request, and a language translation error in the respective erroneous data asset retrieval request.

In one embodiment, the plurality of natural language-to-search query training data samples include a first plurality of natural language-to-search query training data samples associated with a first distinct human language, wherein each distinct training data sample of the first plurality of natural language-to-search query training data samples includes: a computer-generated natural language query specifying a data asset retrieval request textually represented in the first distinct human language, and a computer-generated search query that represents the computer-generated natural language query in the search syntax of the target data query language, a second plurality of natural language-to-search query training data samples associated with a second distinct human language, wherein each distinct training data sample of the second plurality of natural language-to-search query training data samples includes: a machine-generated natural language query specifying a data asset retrieval request textually represented in the second distinct human language, and a machine-generated search query that represents the machine-generated natural language query in the search syntax of the target data query language, and a third plurality of natural language-to-search query training data samples associated with a third distinct human language, wherein each distinct training data sample of the third plurality of natural language-to-search query training data samples includes: a system-generated natural language query specifying a data asset retrieval request textually represented in the third distinct human language, and a system-generated search query that represents the system-generated natural language query in the search syntax of the target data query language.

In one embodiment, the computer instructions, when executed by the one or more processors, perform operations further including in response to receiving the natural language input specifying the subject data asset retrieval request: automatically transforming the natural language input to the computer-executable search query using the natural language-to-search query machine learning model when the natural language input is textually expressed in one of the first distinct human language, the second distinct human language, and the third distinct human language.

In one embodiment, the natural language-to-search query machine learning model is trained to handle natural language expressions expressed in any one of a plurality of distinct human languages, and the natural language input is transformed into the computer-executable search query using the natural language-to-search query machine learning model when the natural language input is expressed in at least one of the plurality of distinct human languages.

In one embodiment, the computer instructions, when executed by the one or more processors, perform operations further comprising instantiating a data asset retrieval graphical user interface that includes an asset retrieval search bar; receiving, at the asset retrieval search bar of the data asset retrieval graphical user interface, the natural language input specifying the subject data asset retrieval request; commencing the execution of the computer-executable search query in response to detecting a user input selecting a search initiation element displayed within the asset retrieval search bar; and displaying, by the data asset retrieval graphical user interface, the at least one data asset that satisfies the subject data asset retrieval request in response to executing the computer-executable search query.

In one embodiment, transforming the natural language input to the computer-executable search query includes: detecting, using the natural language-to-search query machine learning model, at least one search constraint included in the natural language input; determining, using the natural language-to-search query machine learning model, the at least one search constraint syntactically corresponds to a search facet included in one of the one or more sets of query components; and extracting, from the natural language input using the natural language-to-search query machine learning model, a parameter value for the search facet, wherein the computer-executable search query includes the search facet and the parameter value.

In one embodiment, the search facet corresponds to a query syntax element associated with a target metadata attribute, the parameter value specifies a required value or a range of values for the target metadata attribute, and the at least one data asset is retrieved from a computer database storing a plurality of datasets based on the at least one data asset satisfying a search condition defined by a combination of the search facet and the parameter value.

In one embodiment, the natural language input specifying the subject data asset retrieval request corresponds to a multi-constraint search request provided in unstructured text, and transforming the natural language input to the computer-executable search query includes: detecting, by the natural language-to-search query machine learning model, the multi-constraint search request includes a first search constraint, a second search constraint, and a third search constraint; determining, by the natural language-to-search query machine learning model, (a) the first search constraint of the multi-constraint search request is syntactically translatable to a text-based search facet included in the first set of query components, (b) the second search constraint of the multi-constraint search request is syntactically translatable to a date-based search facet included in the third set of query components, and (c) the third search constraint of the multi-constraint search request is syntactically translatable to a numeric-based search facet included in the second set of query components; and determining, based on the natural language-to-search query machine learning model assessing the multi-constraint search request, (i) a text-based parameter value for the text-based search facet, (ii) a date-based parameter value for the date-based search facet, and (iii) a numeric-based parameter value for the numeric-based search facet.

In one embodiment, the computer-executable search query includes the text-based search facet, the text-based parameter value, the date-based search facet, the date-based parameter value, the numeric-based search facet, and the numeric-based parameter value.

In one embodiment, the natural language input specifying the subject data asset retrieval request includes a string of unstructured text, and transforming the natural language input to the computer-executable search query includes: detecting, by the natural language-to-search query machine learning model, a string of alphabetic characters included in the string of unstructured text syntactically corresponds to a query component included in the one or more sets of query components, and converting, by the natural language-to-search query machine learning model, a string of numeric characters included in the string of unstructured text to a parameter value that is in a syntax format compatible with the query component, wherein: the string of numeric characters does not conform to the syntax format compatible with the query component, and the computer-executable search query includes the query component and the parameter value.

In one embodiment, the natural language input specifying the subject data asset retrieval request includes a string of text, and transforming the natural language input to the computer-executable search query includes: determining, by the natural language-to-search query machine learning model, a set of alphabetic characters included in the string of text syntactically corresponds to a query component included in the one or more sets of query components, and translating, by the natural language-to-search query machine learning model, a set of numeric characters included in the string of text to a range of parameter values that is in a syntax format compatible with the query component, wherein: the string of numeric characters does not conform to the syntax format compatible with the query component, and the computer-executable search query includes the query component and the range of parameter values.

In one embodiment, the natural language input specifying the subject data asset retrieval request includes one or more strings of unstructured text, and transforming the natural language input to the computer-executable search query includes: determining, by the natural language-to-search query machine learning model, the one or more strings of unstructured text syntactically correspond to a plurality of query components included in the one or more sets of query components, and determining, by the natural language-to-search query machine learning model, a respective parameter value for each query component of the plurality of query components based on the natural language-to-search query machine learning model assessing the one or more strings of unstructured text, wherein: the computer-executable search query includes the plurality of query components and the respective parameter value determined for each query component of the plurality of query components.

In one embodiment, the natural language input specifying the subject data asset retrieval request includes one or more strings of unstructured text, and transforming the natural language input to the computer-executable search query includes: determining, by the natural language-to-search query machine learning model, the one or more strings of unstructured text syntactically corresponds to a subject query component included in the one or more sets of query components, and generating, by the natural language-to-search query machine learning model, a respective parameter value for the subject query component based on the natural language-to-search query machine learning model assessing the one or more strings of unstructured text, wherein: the computer-executable search query includes the subject query component and the respective parameter value generated for the subject query component.

In one embodiment, the one or more sets of query components further include a fourth set of query components comprising symbolic search syntax components permitted by the target data query language, the one or more strings of unstructured text of the natural language input specifying the subject data asset retrieval request include one or more alphabetic text strings textually expressing a symbolic search operator, and the natural language-to-search query machine learning model generates the respective parameter value for the subject query component by converting the symbolic search operator textually expressed in one of the one or more alphabetic text strings to one or more corresponding symbolic search syntax components included in the fourth set of query components.

In one embodiment, the computer instructions, when executed by the one or more processors, perform operations further comprising in response to receiving the natural language input specifying the subject data asset retrieval request: automatically routing the natural language input to the natural language-to-search query machine learning model, wherein the natural language input is automatically transformed to the computer-executable search query in response to the natural language input being routed to the natural language-to-search query machine learning model.

In one embodiment, synthetically generating the plurality of natural language-to-search query training data samples includes iteratively generating a new natural language-to-search query training data sample until a predetermined number of training data samples have been generated, wherein a respective iteration includes: synthetically generating a new natural language query that includes a new data asset retrieval request using a predefined natural language query generation template; and synthetically generating a new computer-executable search query that syntactically represents the new natural language query in the search syntax of the target data query language by inserting at least one query component of the one or more sets of query components and an associated parameter value for the at least one query component into a predefined search query generation template.

In one embodiment, the one or more sets of query components further include a fourth set of query components comprising symbolic search syntax components permitted by the target data query language, and synthetically generating a respective natural language-to-search query training data sample of the plurality of natural language-to-search query training data samples includes: randomly selecting a numeric value from a predetermined range of numeric values; randomly selecting a symbolic-based search syntax component from the fourth set of query components; randomly selecting a numerical-based search syntax component from the second set of query components; generating a subject search query by inserting the numeric value, the symbolic-based search syntax component, and the numerical-based search syntax component into corresponding slots of a predefined search query generation template; obtaining, from a predetermined set of symbolic search syntax component variants, a natural language variant that textually represents the symbolic-based search syntax component in alphabetic characters; obtaining a textual representation of the numerical-based search syntax component that is in a lexical form different from the numerical-based search syntax component randomly selected from the second set of query components; randomly selecting one or more command tokens from a predetermined set of command tokens; randomly selecting one or more entity tokens from a predetermined set of entity tokens; and generating a subject natural language query by inserting the one or more command tokens, the one or more entity tokens, the textual representation of the numerical-based search syntax component, the natural language variant that textually represents the symbolic-based search syntax component in alphabetic characters, and the numeric value into corresponding slots of a predefined natural language query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, the one or more sets of query components further include a fourth set of query components comprising symbolic search syntax components permitted by the target data query language, and synthetically generating a respective natural language-to-search query training data sample of the plurality of natural language-to-search query training data samples includes: randomly selecting a numeric value from a predetermined range of numeric values; randomly selecting a symbolic-based search syntax component from the fourth set of query components; randomly selecting a numerical-based search syntax component from the second set of query components; generating a subject search query by inserting the numeric value, the symbolic-based search syntax component, and the numerical-based search syntax component into corresponding slots of a predefined search query generation template; obtaining a textual representation of the numerical-based search syntax component that is in a lexical form different from the numerical-based search syntax component randomly selected from the second set of query components; randomly selecting one or more command tokens from a predetermined set of command tokens; randomly selecting one or more entity tokens from a predetermined set of entity tokens; and generating a subject natural language query by inserting the one or more command tokens, the one or more entity tokens, the textual representation of the numerical-based search syntax component, the symbolic-based search syntax component randomly selected from the fourth set of query components, and the numeric value into corresponding slots of a predefined natural language query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, synthetically generating a respective natural language-to-search query training data sample of the plurality of natural language-to-search query training data samples includes randomly selecting a search facet from the one or more sets of query components; obtaining a textual representation of the search facet that is in a lexical form different from the search facet randomly selected from the one or more sets of query components; randomly selecting a contextual tag from a predetermined set of contextual tags; randomly selecting one or more command tokens from a predetermined set of command tokens; randomly selecting one or more entity tokens from a predetermined set of entity tokens; generating a subject natural language query by inserting the one or more command tokens, the one or more entity tokens, the textual representation of the search facet, and the contextual tag into corresponding slots of a predefined natural language query generation template; and generating a subject search query by inserting the search facet and the contextual tag into corresponding slots of a predefined search query generation template, wherein: the synthetically generated natural language query of the respective natural language-to-search query training data sample corresponds to the subject natural language query, and the synthetically generated search query of the respective natural language-to-search query training data sample corresponds to the subject search query.

In one embodiment, synthetically generating a respective natural language-to-search query training data sample of the plurality of natural language-to-search query training data samples includes randomly selecting a search facet included in the one or more sets of query components; obtaining a textual representation of the search facet that is in a lexical form different from the search facet randomly selected from the one or more sets of query components; randomly selecting a term from a predetermined set of terms; randomly selecting one or more command tokens from a predetermined set of command tokens; randomly selecting one or more entity tokens from a predetermined set of entity tokens; generating a subject natural language query by inserting the one or more command tokens, the one or more entity tokens, the textual representation of the search facet, and the term into corresponding slots of a predefined natural language query generation template; and generating a subject search query by inserting the search facet and the term into corresponding slots of a predefined search query generation template, wherein: the synthetically generated natural language query of the respective natural language-to-search query training data sample corresponds to the subject natural language query, and the synthetically generated search query of the respective natural language-to-search query training data sample corresponds to the subject search query.

BRIEF DESCRIPTION OF THE FIGURES

FIG. 5 illustrates a flow chart showing an example process for adjusting a communications grid or a work project in a communications grid after a failure of a node, according to some embodiments of the present technology;

FIGS. 14 and 14A illustrate a flow chart showing an example process of translating natural language to custom query syntax using one or more large language models, according to some embodiments of the present technology;

FIG. 17 illustrates example natural language-to-search query training data samples and erroneous natural language-to-search query training data samples, according to some embodiments of the present technology;

FIGS. 18 and 18A illustrate an example data query schema according to some embodiments of the present technology;

FIG. 19 illustrates an example schematic of a data query schema extractor, according to some embodiments of the present technology;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
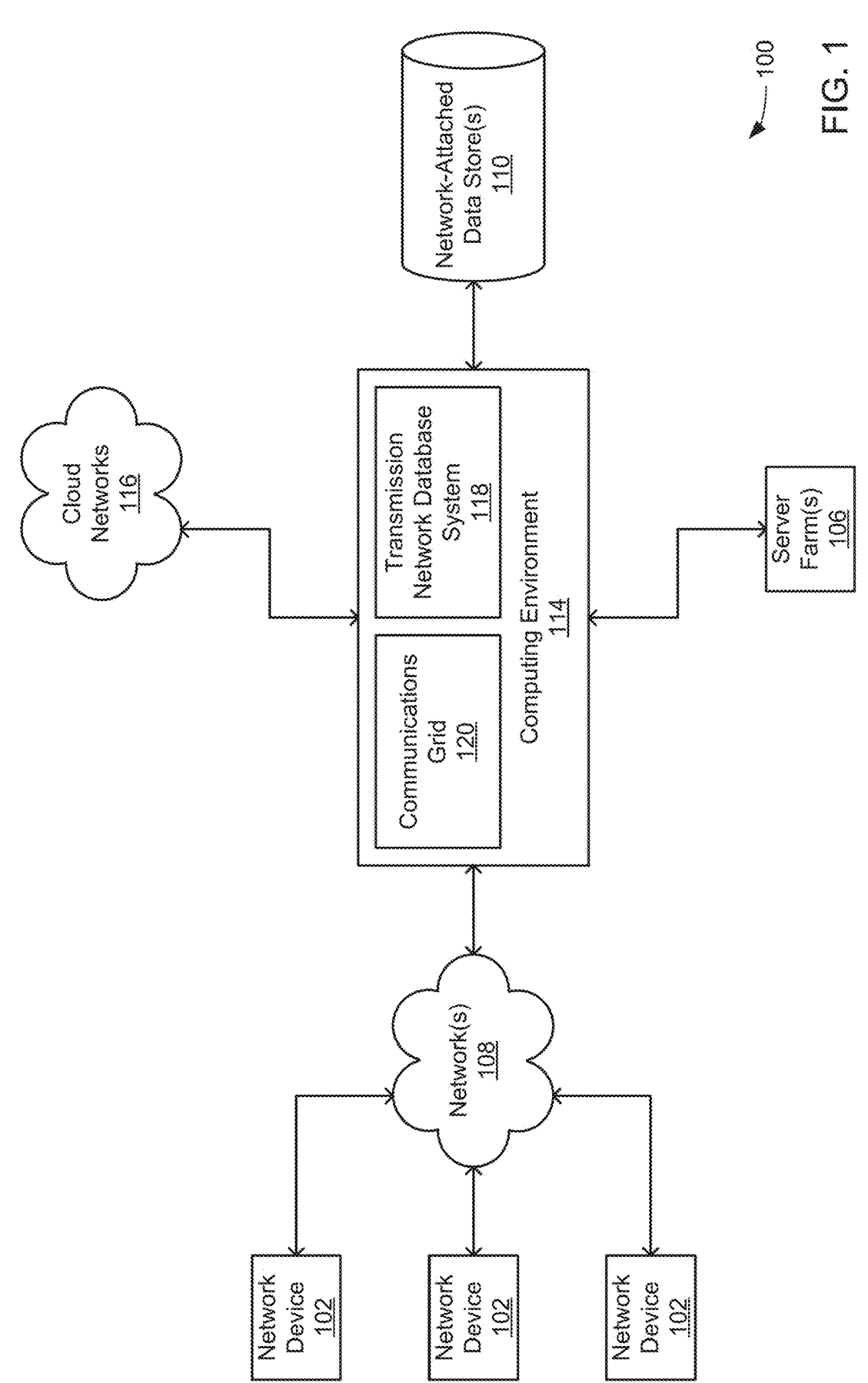
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
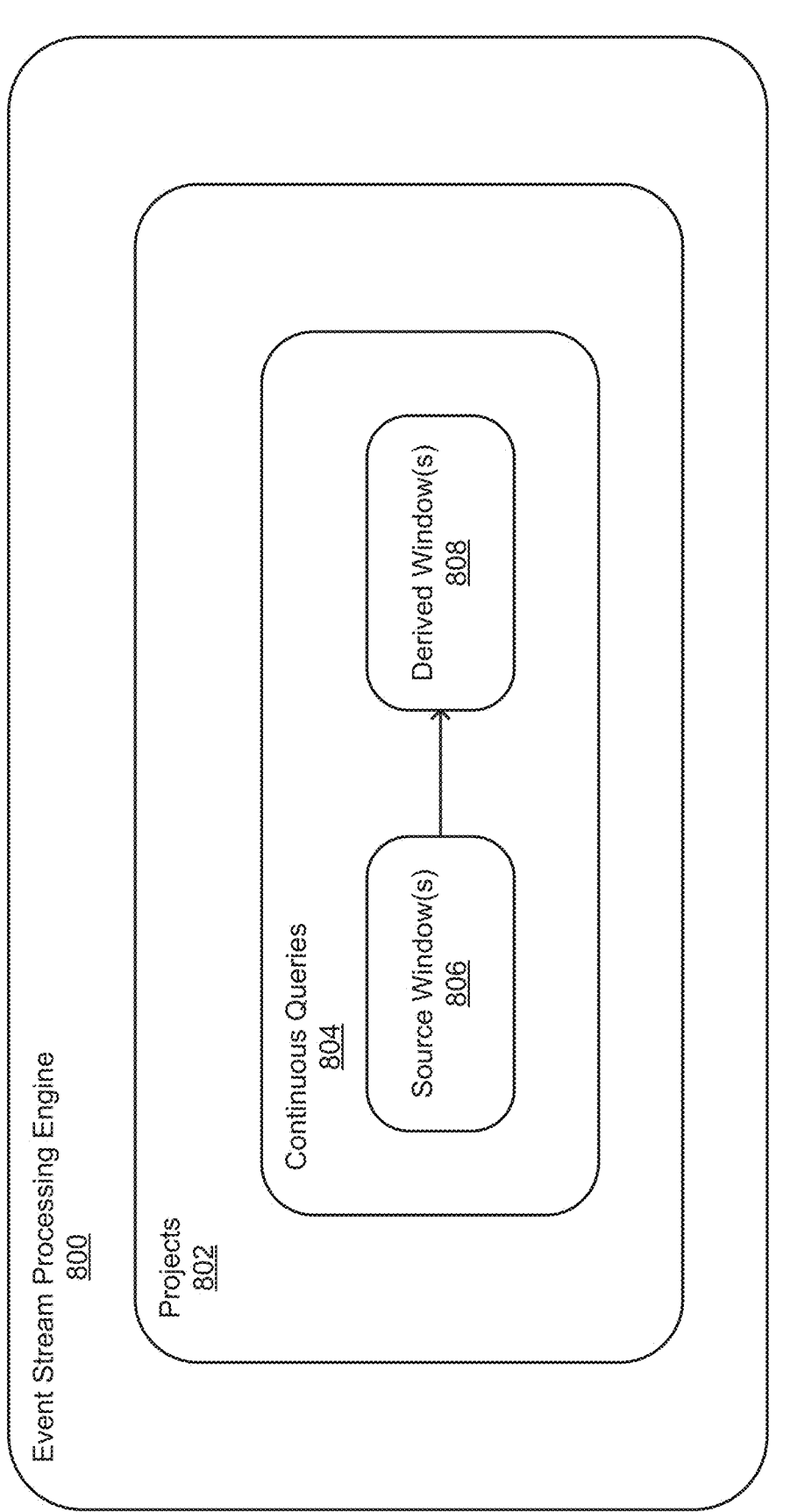
FIG. 8 illustrates a block diagram including components of an Event Stream Processing Engine (ESPE), according to embodiments of the present technology.
Figure 9:
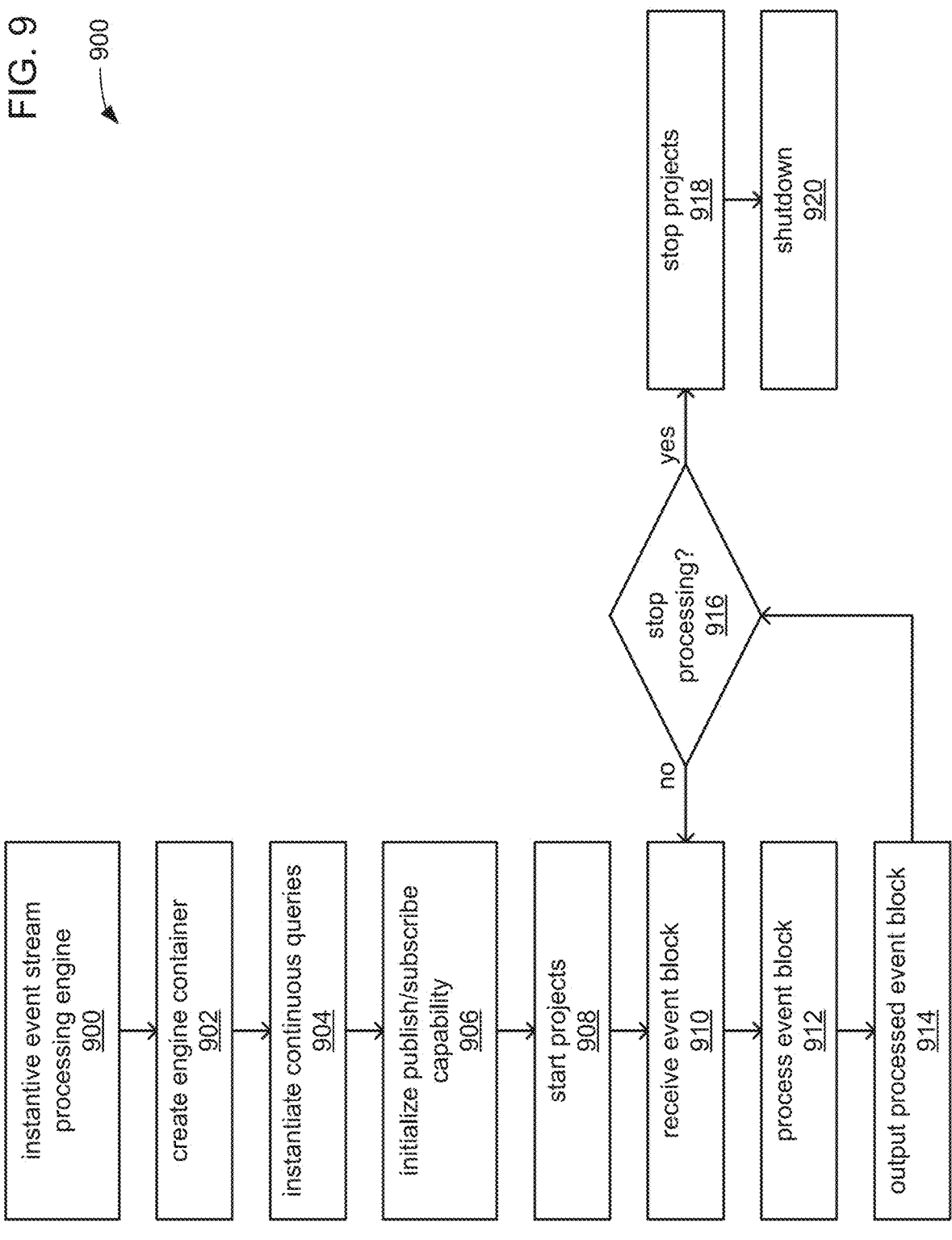
FIG. 9 illustrates a flow chart showing an example process including operations performed by an event stream processing engine, according to some embodiments of the present technology.
Figure 10:
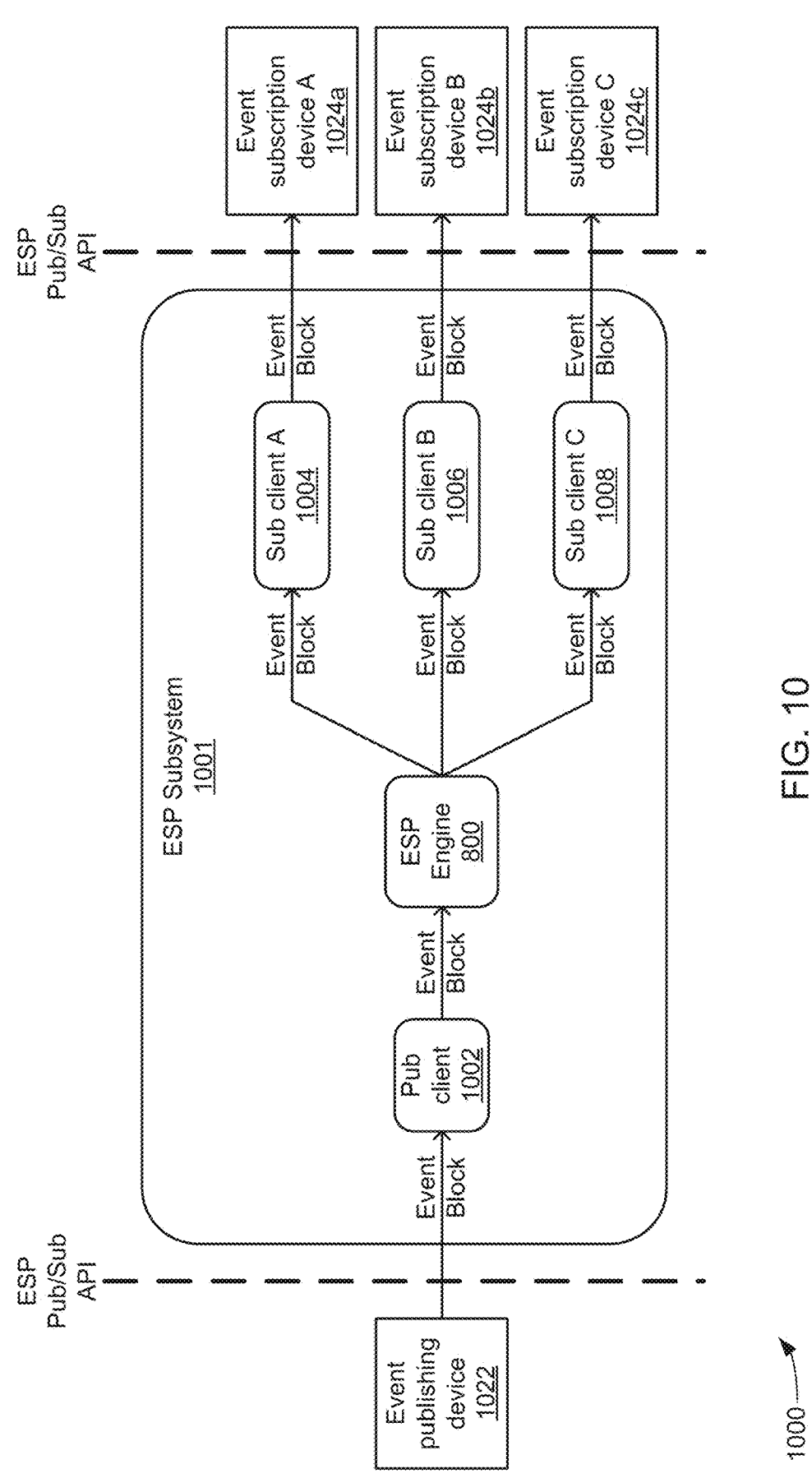
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
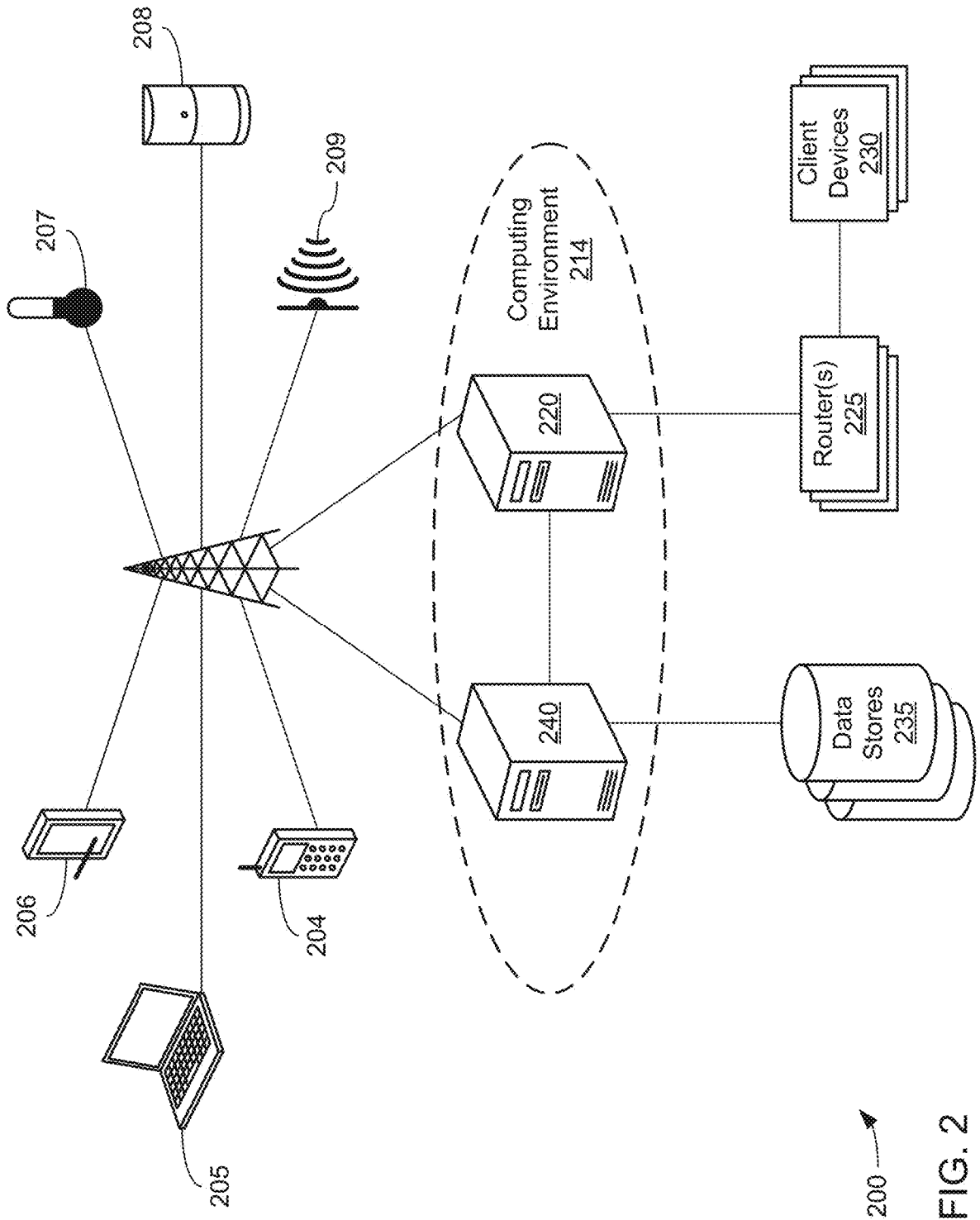
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
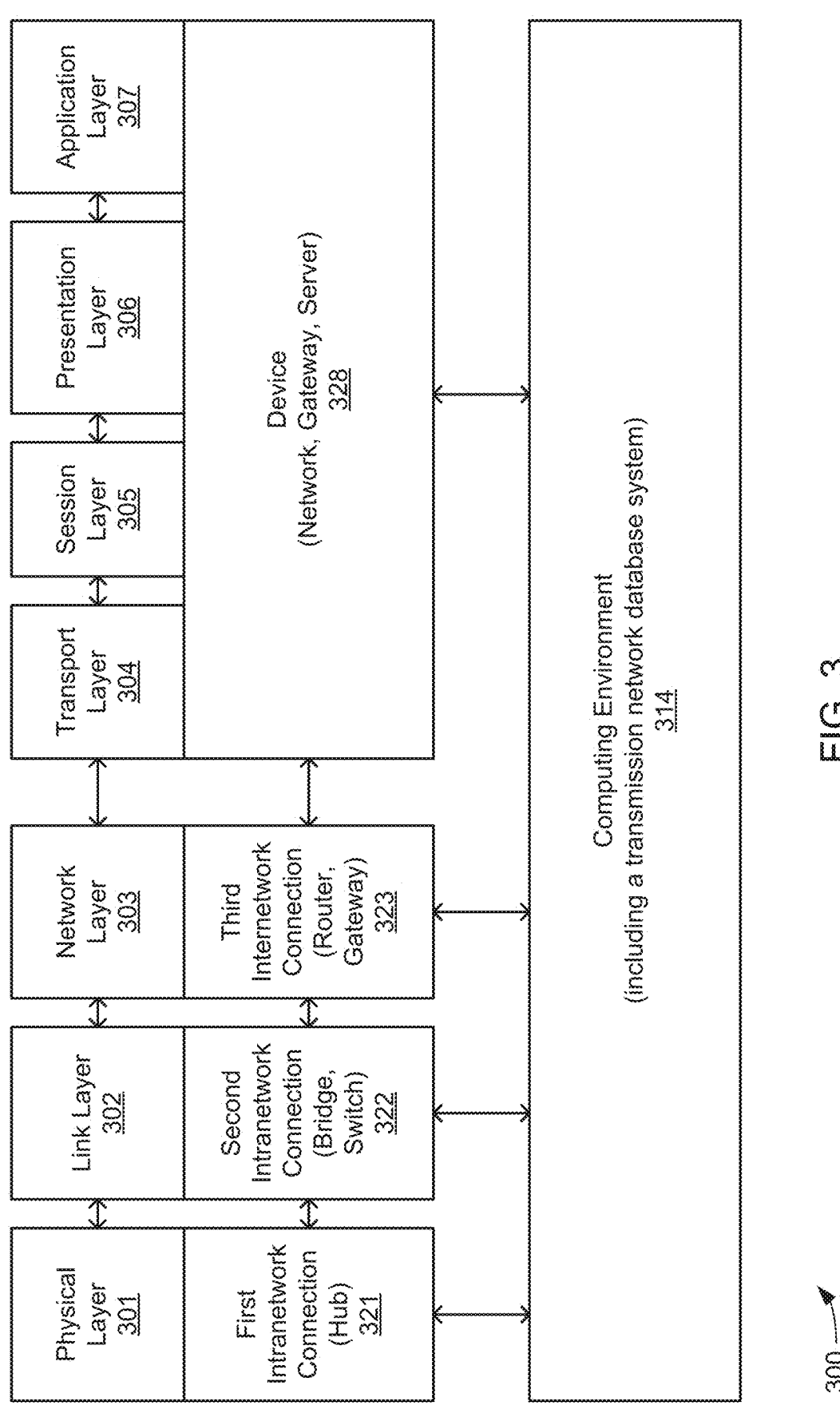
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network.

In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory.

Each node may be assigned a particular task such as a portion of a processing project, or to organize or control other nodes within the grid.

Figure 4:
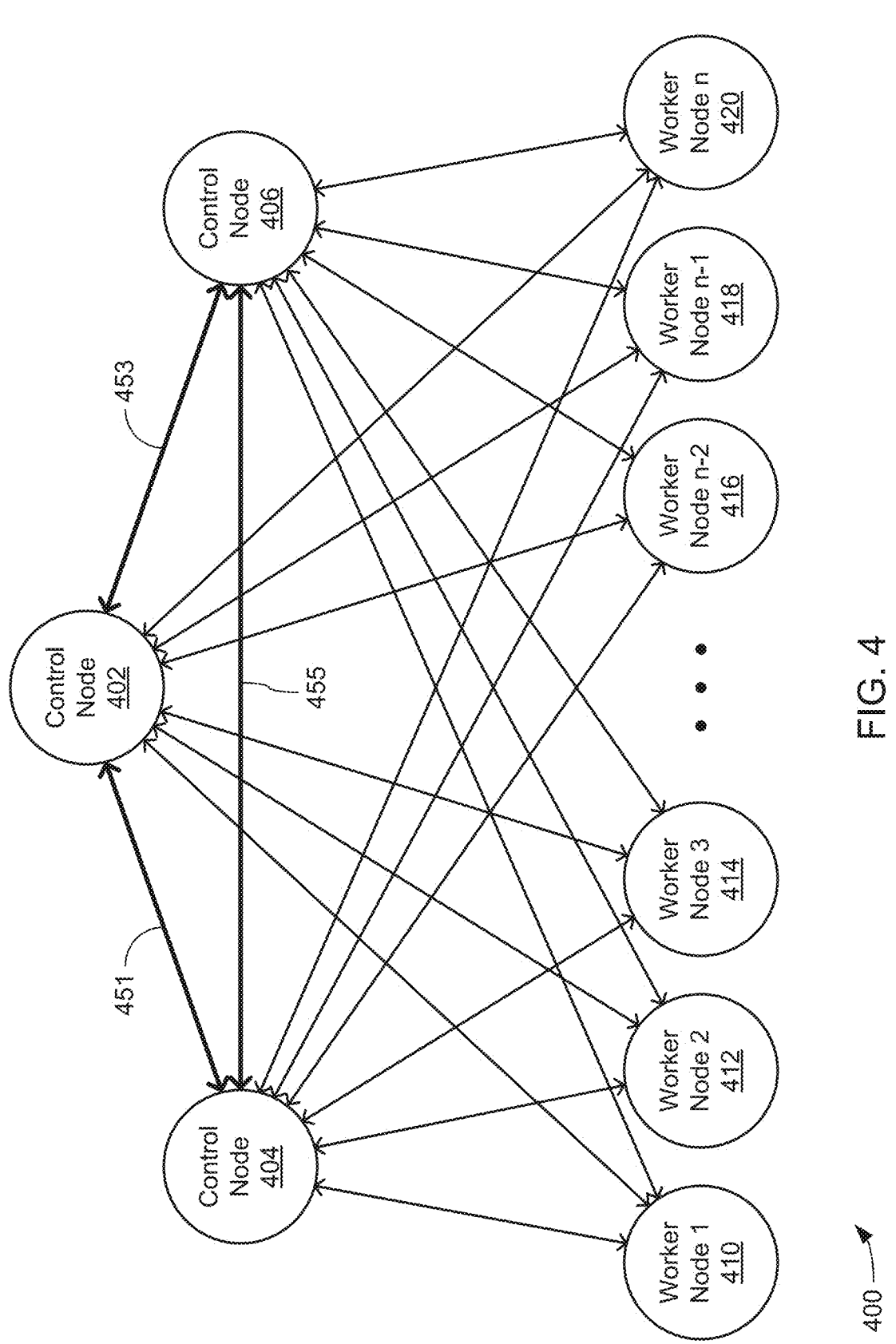
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
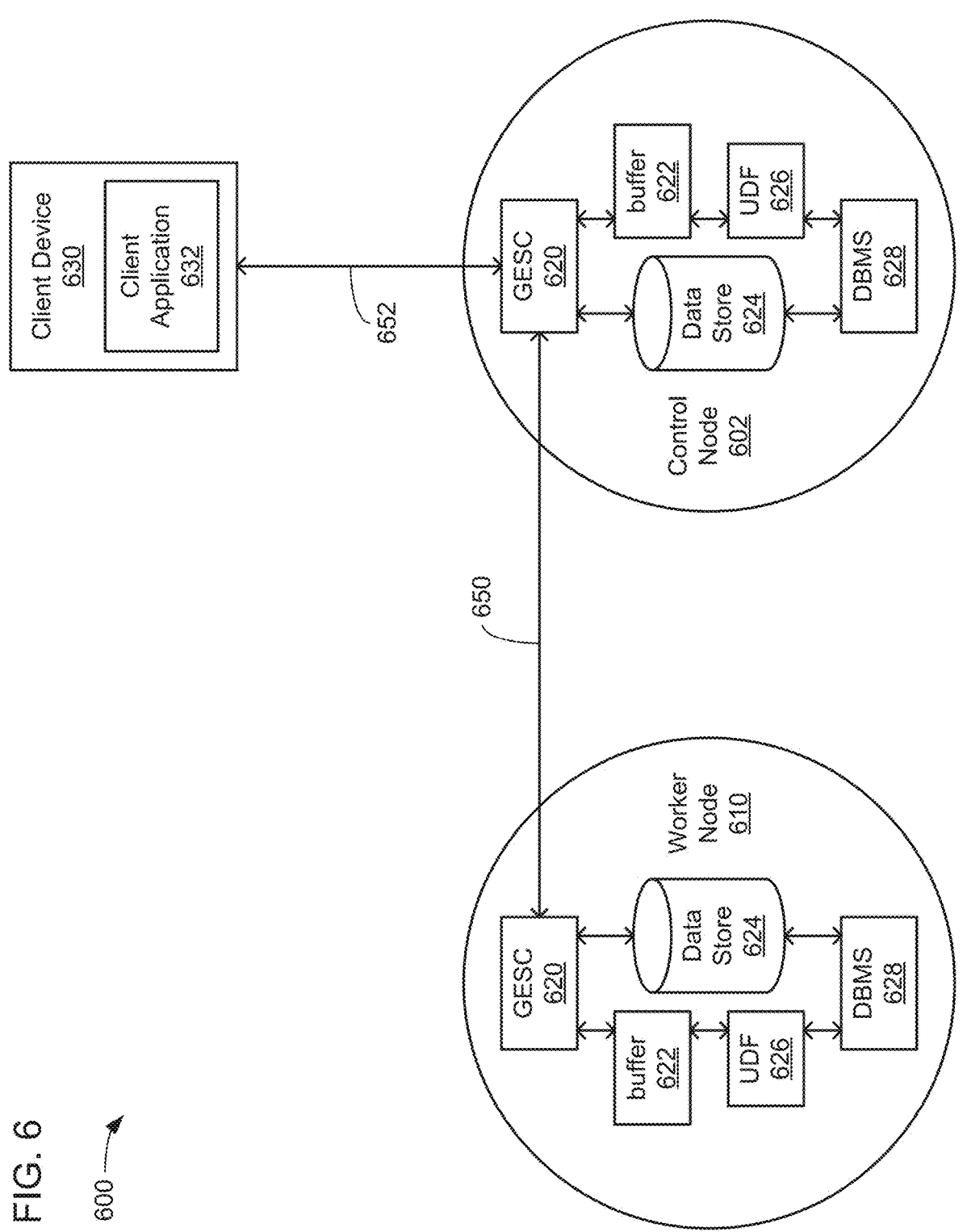
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
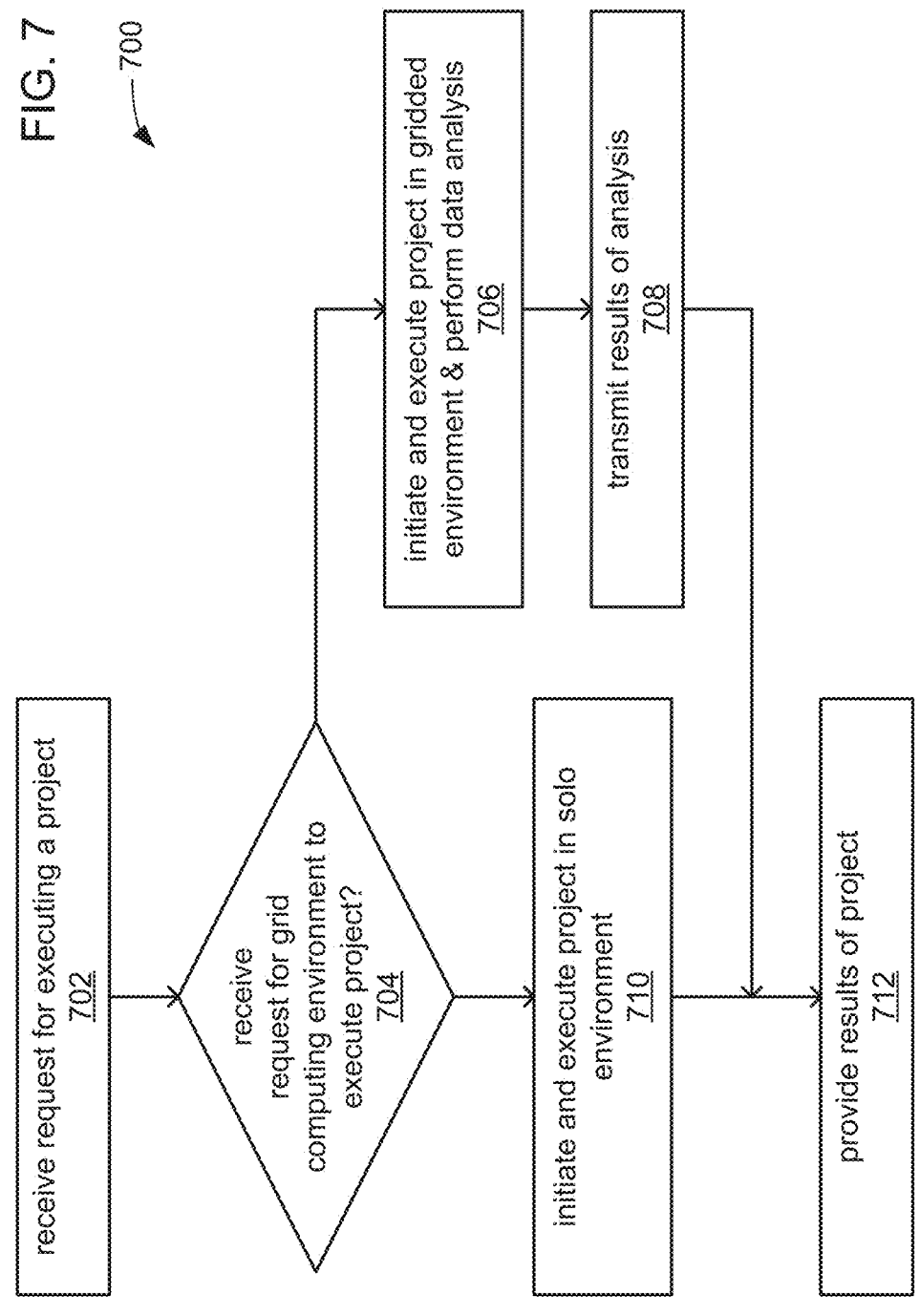
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
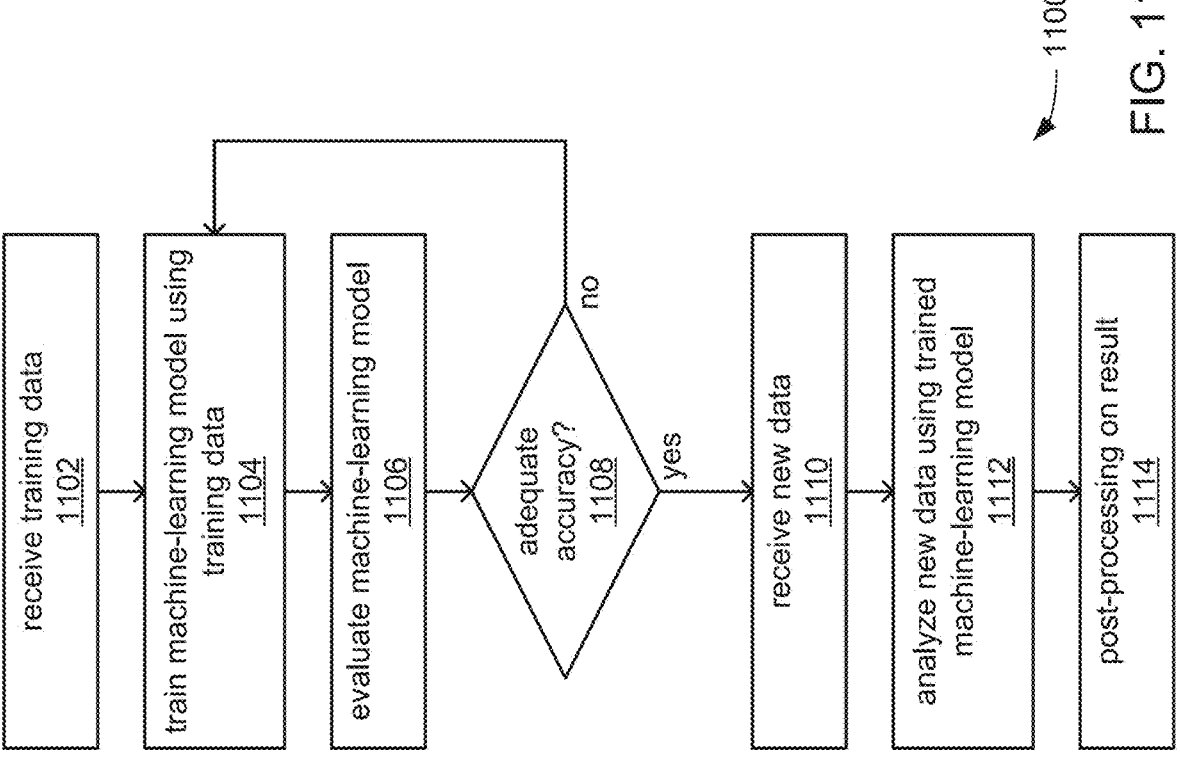
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
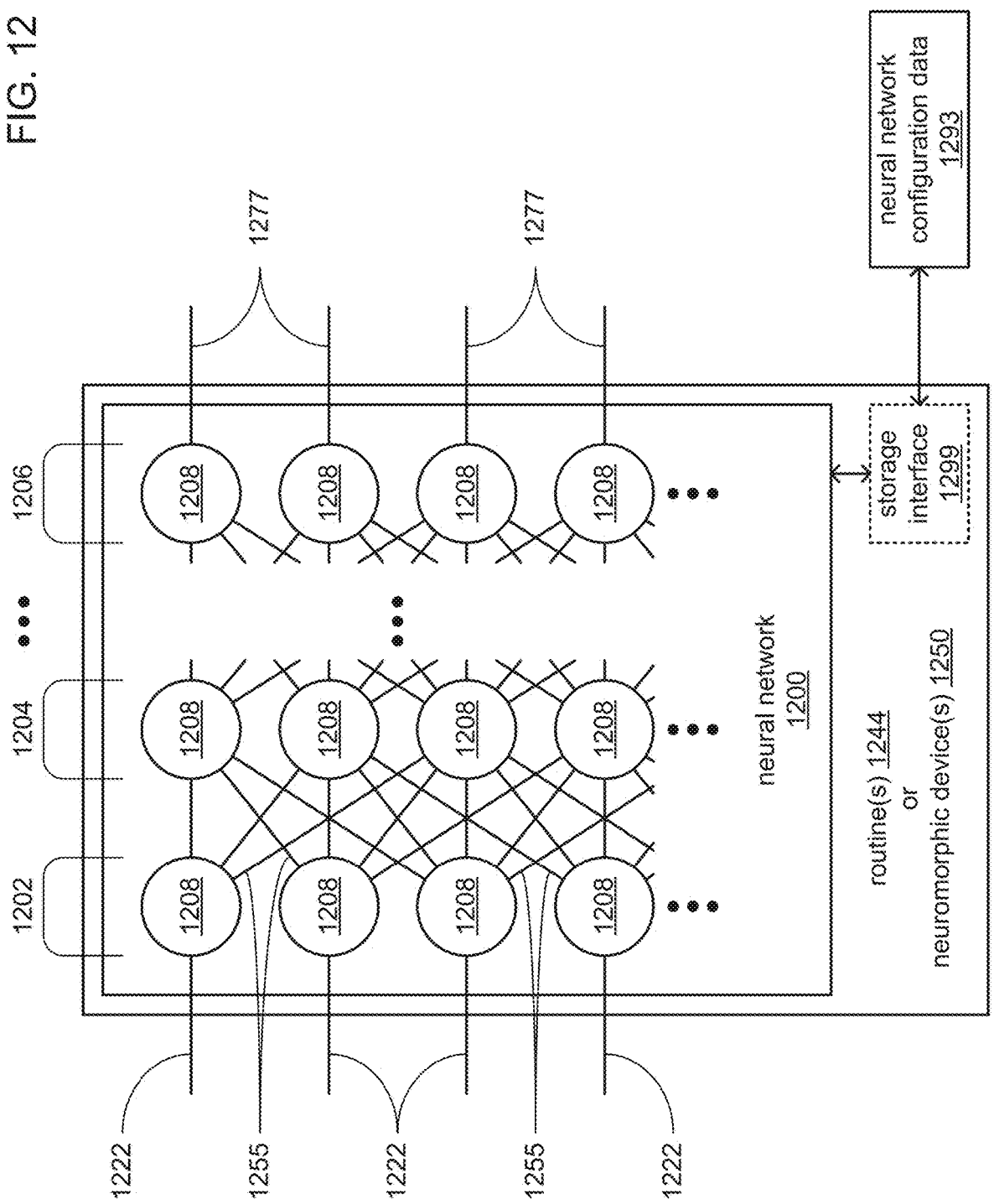
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
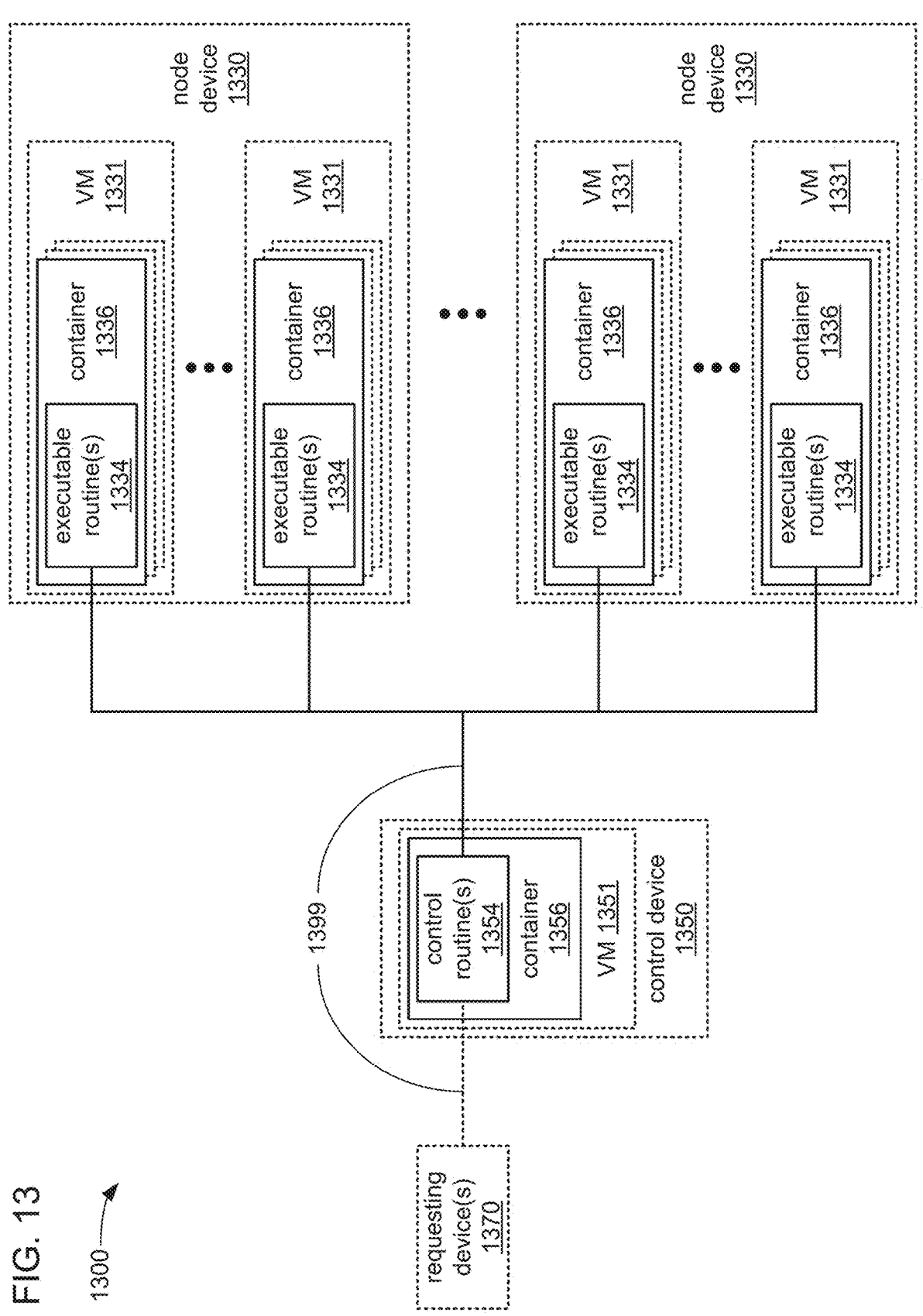
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses that are to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the avail-ability of resources, the status of the performances of analyses that are already underway, and/or still other status information from the node device(s) 1330 in response to polling, at a recurring interval of time, and/or in response to the occurrence of various preselected events. More specifi-cally, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of perfor-mance of portions of each requested analysis based on such factors as data dependencies thereamong, as well as allo-cating the use of containers 1336 in a manner that effectuates such a derived order of performance.

Where multiple instances of control routine 1354 are used to control the allocation of resources for performing requested analyses, such as the assignment of individual ones of the containers 1336 to be used in executing execut-able routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transac-tion to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be pro-vided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the perfor-mance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in per-forming the requested analyses.

Associated Processes

The present method describes processing natural lan-guage inputs to generate computer-executable search queries formatted according to a target data query language. A natural language input may refer to a user-provided input expressed in a human language. The natural language input may be unstructured and may, in some examples, not follow formal syntax rules of a target programming language (e.g., the target data query language, etc.) or a target command-line interface. In particular, many target data query lan-guages may be domain-specific query languages designed for use by technical or experienced users familiar with fixed language syntaxes and operational semantics. Such domain-specific query languages may generally not be intuitive to non-technical users and may often require specialized knowledge of field identifiers, operators, and/or schema definitions to compose a valid search query. In contrast, the disclosed method may enable users to express subject data asset retrieval requests in free-form natural language inputs, thereby abstracting away the technical complexity of domain-specific query languages and making advanced search and retrieval functions accessible to a broader range of users, including those without prior expertise in structured query formulation. The free-form natural language inputs may be processed using a trained natural language-to-search query machine learning model configured to learn the semantic intent of the free-form natural language input and convert the semantic intent to corresponding query components defined within a structured query schema. In one or more implementations, unlike conventional systems, which may typically approximate queries using fixed templates or generate natural language approximations of queries from context, the disclosed method may leverage a machine learning model trained directly on synthetically generated training data that pairs natural language queries with computer-executable search queries. This approach may enable precise schema alignment and complete syntactic validity of generated queries.

In one or more embodiments, the method further describes a synthetic data generation process in which natural language inputs and corresponding search queries structured according to a target data query language are synthetically generated to construct natural language-to-search query training data samples. The natural language-to-search query machine learning model may then be trained using the natural language-to-search query training data samples, such that the natural language-to-search query machine learning model may be operably configured to convert free-form, multi-intent, and context-rich inputs to corresponding structured search queries that conforms to the syntactic and semantic rules of the target data query language. The synthetic training process may include generating erroneous training data samples that contain typographical errors, grammatical inconsistencies, and lexical noise, paired with valid search queries. Generating erroneous training data may enable the model to learn translations from noisy or imperfect user inputs to correct executable queries. The training process may further include natural language variant generation, wherein a single schema-defined facet is expressed in multiple lexical forms (e.g., "created date," "date added," "time of creation"), improving the model's ability to generalize across linguistic variations.

The method further describes execution of the generated search query within a data asset retrieval platform for accurate retrieval of one or more data assets from heterogeneous data sources. In one or more implementations, by integrating a natural language-to-search query machine learning model trained on diverse training datasets, the disclosed method ensures compatibility across different search environments, target query languages, and heterogeneous data platforms, thereby providing a generalized framework for translating natural language inputs into executable search queries.

The method described herein further provides one or more improvements over traditional retrieval-augmented generation (RAG) applications by using a natural language-to-search query machine learning model to autonomously generate a computer-executable search query rather than attempting to produce a natural language approximation of a query based on retrieved context. In conventional RAG approaches, the language model may be tasked with synthesizing query-like text from supporting documents, which may often introduce inconsistencies, redundant syntax, and mismatches with schema-defined fields. By contrast, the disclosed method may use the natural language-to-search query machine learning model trained to translate natural language search constraints into search syntax permitted by a target data query language. As a result, the natural language-to-search query machine learning model may output a fully structured, computer-executable search query that conforms to the syntax of the target data query language, ensuring that the translation from user intent to system-executable command is precise, consistent, and optimized for retrieval performance. This includes the ability to generate and execute complex, multi-constraint queries that simultaneously incorporate text-based, numerical-based, date-related, and symbolic-based constraints. Such capabilities may not be supported by conventional SQL generators or other GPT-based systems.

Additionally, the disclosed method may provide particular improvements when applied to custom, uncommon, complex, and/or low-resource data query languages that may be domain-specific or purpose-built. Traditional RAG approaches may generally rely on approximating query-like responses from retrieved natural language context. When the underlying syntax is domain-specific, irregular, and/or sparsely documented, the approximation of query-like responses may become increasingly error-prone. In contrast, the natural language-to-search query machine learning model described herein may be specifically trained on synthetically generated query training data samples aligned with the structural and semantic requirements of the target data query language, regardless of whether such target data query language is common or rare. By training across the entirety of available query components rather than a subset, the natural language-to-search query machine learning model may achieve greater completeness and efficiency, generating queries that are both syntactically valid and optimized for execution. This capability enables the natural language-to-search query machine learning model to consistently generate semantically valid computer-executable queries, e.g., even for specialized data query languages that may include unique operators, nested constraints, and/or schema-dependent field identifiers.

In one or more embodiments, the graphical user interface (GUI) described herein, when integrated with the natural language-to-search query machine learning model may provide significant improvements over traditional search systems by seamlessly combining user interaction with backend query execution. In conventional systems, users may often be required to manually craft structured queries or interact with rigid search fields, leading to inefficiencies and limited accessibility for non-technical users. In contrast, the disclosed systems and methods may allow a user to enter a natural language input into a search bar of the GUI and initiate a request through a search initiation element of the GUI. Responsive to such a request, the natural language-to-search query machine learning model may be invoked automatically, the natural language input may be converted into a computer-executable search query conforming to the target syntax, the generated search query may be executed against one or more data repositories, and the results (e.g., data assets, datasets, etc.) satisfying the executed search query may be displayed directly in the GUI. The integration of the natural language-to-search query machine learning model with the GUI may therefore transform the search process into an end-to-end interaction, resulting in faster retrieval, higher accuracy, and improved usability compared to traditional search systems.

The disclosed method may further improve processing efficiency over traditional data asset retrieval processes, e.g., by ensuring only datasets necessary to satisfy a natural language input are retrieved and displayed. Conventional search mechanisms may generate overly broad results, often requiring traversal of entire repositories or retrieval of large volumes of unnecessary data, which may significantly increase memory usage and computational overhead. By contrast, the natural language-to-search query machine learning model described herein may generate a computer-executable search query that incorporates precise schema-aligned search constraints, thereby allowing for filtration of only those data assets that have been specified by the natural language input. For example, even if a database comprises large amounts of data (e.g., more than 10 terabytes of datasets), the disclosed method may allow for target retrieval of data assets (e.g., 10 gigabytes of data) that correspond to the expressed search constraints. The targeted retrieval may reduce input/output loads, conserve storage bandwidth, and minimize compute resource utilization, while simultaneously delivering more relevant and streamlined data to the user through the GUI.

Figure 14:
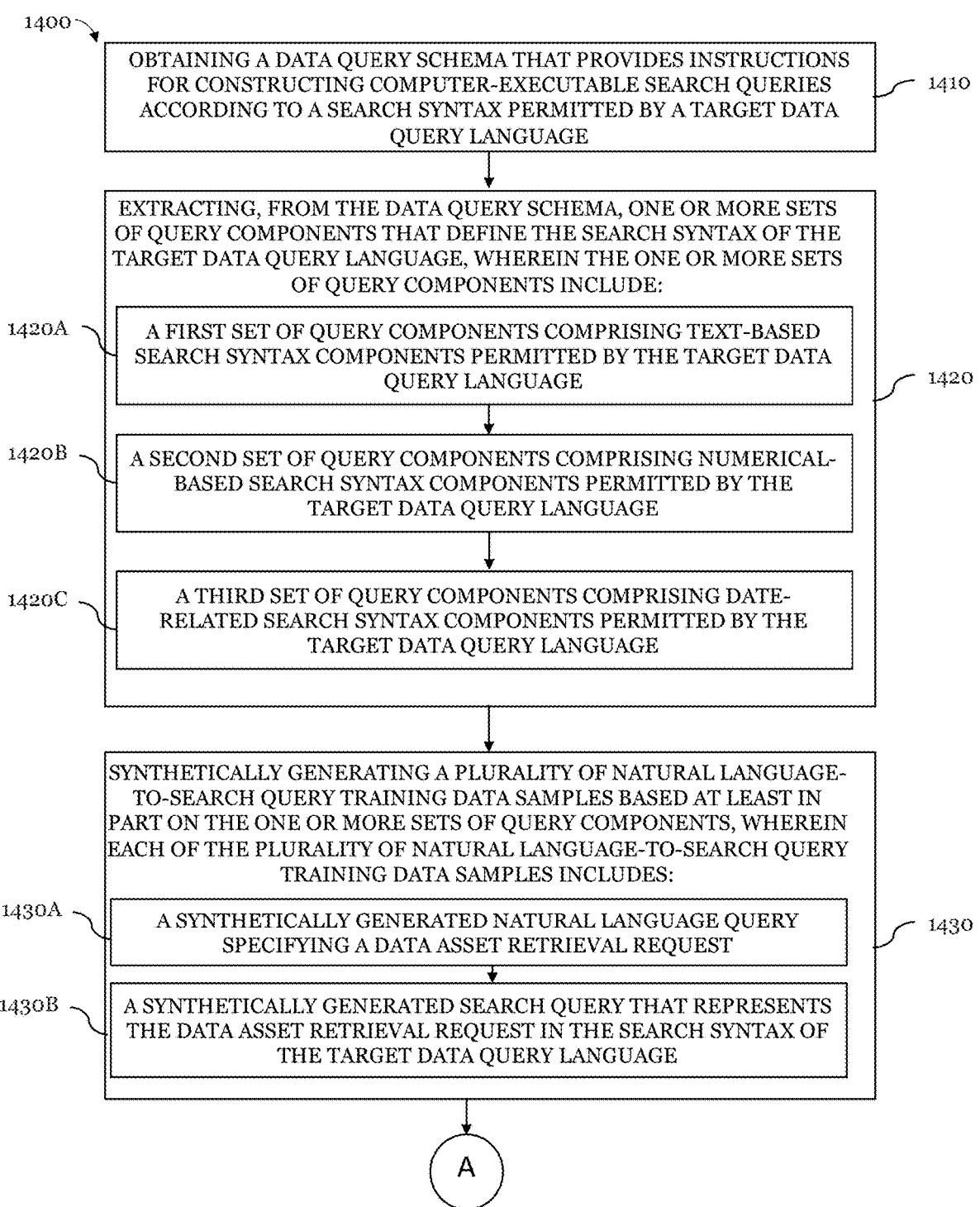

FIGS. 14-14A illustrate one embodiment of a method 1400 for translating natural language to custom query syntax using one or more Large Language Models (LLMs). It will be appreciated that other embodiments contemplated within the scope of the present application may involve more operations, fewer operations, different operations, or a different order of operations than as shown in FIGS. 14-14A.

One of ordinary skill in the art will appreciate that the disclosed method 1400 may provide technical improvements in the generation and execution of computer-executable search queries based on natural language inputs. Traditional systems may often depend on rigid query interfaces that require users to submit requests in structured formats, which increases processing overhead and limits accessibility for non-technical users. The disclosed method 1400 may implement a transformer-based natural language-to-search query model that interprets natural language inputs and identifies schema-defined components of a target query language that corresponds to the natural language inputs. Such configuration may accelerate the translation process, reduce redundant parsing operations, and lower computational resource consumption while maintaining syntactic accuracy of the generated queries.

Additionally, conventional approaches frequently produce inconsistent or ambiguous query translations when handling imprecise user expressions. By contrast, the disclosed method 1400 may apply context-aware tokenization and semantic alignment to disambiguate phrases, resolve entity references, and construct structured queries that are both valid and contextually accurate. This may result in more precise data retrieval, reduced query failures, and improved performance of backend retrieval systems. The disclosed method 1400 may further improve system responsiveness by minimizing reformulation cycles and eliminating round-trip delays that occur in conventional search systems. Since the generated queries may be fully executable in the syntax of the target data query language, latency during query execution may be reduced and retrieval operations may be accelerated across large-scale and distributed data environments. Integration of the natural language-to-search query machine learning model within a data asset retrieval platform may further enhance computational efficiency by reducing inter-process communication overhead and optimizing memory allocation during query generation. Such integration may ensure that query translation and execution are performed as part of a unified process, thereby lowering I/O costs and enabling more efficient utilization of available computing resources.

Obtaining a Data Query Schema

In one or more embodiments, method 1400 may include process 1410. Process 1410, which may include obtaining a data query schema, may function to obtain a data query schema that provides instructions for constructing computer-executable search queries according to a search syntax permitted by a target data query language. A data query schema, in one or more embodiments, may include a structured, machine-readable definition specifying how search requests are to be formulated and interpreted for retrieving data assets from one or more datasets.

In one or more implementations, datasets or data assets may include a wide range of structured, semi-structured, and unstructured data sources maintained across one or more enterprise systems, repositories, and data lakes. Structured datasets, in one or more embodiments, may include relational database tables structured according to a respective schema, such as customer records, product catalogs, financial transactions, or inventory logs which may be commonly encountered in industrial domains including but not limiting to retail, finance, e-commerce, supply chain management, and the like. Semi-structured datasets, in one or more embodiments, may include metadata registries, configuration files, and hierarchical key-value storage that may require schema-aware parsing to identify relevant fields. Examples of semi-structured data sets may include, but not limit to, XML or JSON-based telemetry streams in cloud computing environments, IoT device configurations in manufacturing facilities, and/or log registries in enterprise security systems. Unstructured datasets, in one or more embodiments, may include log files, free-form reports, and natural language documents, which may contain embedded attributes, such as incident reports in healthcare systems, compliance filings in legal and regulatory domains, and/or geospatial imagery annotations in defense and aerospace contexts. In the description that follows, "datasets" and "data assets" may be used interchangeably.

The disclosed method may therefore extend to technical applications in a wide variety of industrial domains. For example, in the financial industry, the disclosed method may enable retrieval of datasets involving fraud detection, risk modeling, or transaction monitoring. Similarly, in the healthcare industry, the disclosed method may enable access to clinical trial records, diagnostic imaging repositories, and/or electronic health records. In another example, in the telecommunications industry, the disclosed method may be applied to access data assets including, but not limiting to, network configuration logs, call detail records, and/or subscriber activity datasets. In each such example, the ability to translate natural language inputs into precise, computer-executable search queries in a target data query language may improve efficiency of data retrieval processes, e.g., by allowing domain specialists to interact with complex data repositories without requiring technical proficiency in the corresponding domain-specific query languages.

In one embodiment, the data query schema may be obtained from a schema repository associated with a data catalog service, a configuration file maintained in persistent storage, or metadata available in a computing environment comprising one or more data storage systems configured to store, manage, and serve dataset information. The data query schema may define permissible query components, the search facet functions applicable to those query components, and the query component types, together with the syntactic and semantic rules for combining them into valid search queries compatible with the target data query language.

In one or more implementations, metadata may include structured or semi-structured descriptive information associated with datasets that facilitates discovery, classification, filtering, and access of the datasets within a computing environment. Query components may represent discrete, searchable dataset attributes or metadata fields, such that for each query component, the data query schema may specify one or more search facet functions and one or more query component types. A search facet may be defined as a specialized type of query component corresponding to a structured field representation in the data query schema. A search facet function may define the permitted operation or matching criteria applicable to a query component. A query component type may specify the expected data type, value format, or constraint classification associated with the query component.

By incorporating the search facet functions and query component types, the data query schema may enable a query construction process that can automatically generate computer-executable search queries conforming to the syntax rules, operator precedence, and structural constraints of a target data query language. In various examples, the target data query language may include SAS® SQL language, SAS® FedSQL language, or other Structured Query Language (SQL)-compliant dialects supported by SAS® Viya™ platforms, as well as general-purpose query languages such as ANSI SQL, HiveQL, or Spark SQL, each having its own permitted syntax and structural constraints for query formulation.

In one non-limiting example shown in FIG. 18, the data query schema 1502 may include a plurality of search facets 1802. Each search facet of the plurality of search facets 1802 included in the data query schema 1502 may be associated with a respective search facet function 1804 (e.g., search facet task) and a corresponding query component type 1806. For instance, a query component "DateModified" within the plurality of search facets 1802 may have a corresponding search facet function 1804 or task of "finding assets modified on specified dates," and a query component type 1806 of "date." The "DateModified" query component may allow filtering of data assets by matching the recorded modification date for each data asset to one or more user-specified dates, expressed in a format recognized by the target data query language (e.g., MM/DD/YYYY). In another example, a query component "RowCount" may have a corresponding search facet function 1804 (or task) of "finding datasets having a specific number of rows" and a query component type 1806 of "numeric." The "RowCount" query component may support comparison operations such as greater than, less than, or between specified numerical thresholds to identify datasets based on volume (e.g., the number of rows). A further example includes the "AssetType" query component, which may have a search facet function 1804 (or task) of "finding assets matching specified type designations," and a query component type 1806 of "keyword." The "AssetType" component may enable classification-based filtering using supported keywords that match asset types such as report, dashboard, or dataset, according to the syntactic rules of the target data query language.

In yet another example, a query component "Column.dataType" may have a search facet function 1804 (or task) of "finding columns of a specified data type" and a query component type 1806 of "keyword." The "Column.dataType" query component may allow for retrieval of only those data assets that contain columns with a specified data type, such as numeric or character, wherein the data type is represented in a format recognized by the target data query language. Similarly, another query component "Column.semanticType" may have a search facet function 1804 (or task) of "finding columns with a specified semantic type" and a query component type 1806 of "keyword." For the "Column.semanticType" query component, the data query schema 1502 may specify an associated search facet function 1804 configured to perform the task of finding columns associated with a specified semantic data type defined within the dataset. That is, the "Column.semanticType" query component may allow for retrieval of data assets that contain columns assigned to a specific semantic category, such as date, gender, or country, in a manner interpretable by the target data query language.

In one example, a query component "AccessedBy" may include a search facet function 1804 (or task) of "finding the principal who most recently accessed the dataset" and a query component type 1806 of "text." The "AccessedBy" query component may allow for retrieval of data assets based on the user or system account most recently recorded as accessing the data assets, with the account identifier represented as a text string according to the target data query language syntax.

In another non-limiting example shown in FIG. 18A, the data query schema 1502 may define one or more syntactic rules for interpreting special values, range expressions, wildcards, and mandatory match operators within a query construction process. In one embodiment, using a "Special Value Syntax," the data query schema 1502 may define permissible keyword-based values that can be used in place of fixed literals. Fixed literals may represent hardcoded values directly specified in a search query (e.g., DateCreated: 2023-09-01), whereas the keyword-based values may function as symbolic placeholders (e.g., DateCreated: PreviousDay) that may be dynamically interpreted at the time a search query is executed. In other examples, when a search facet 1802 includes a date field such as "DateModified," the data query schema 1502 may recognize other predefined keywords like, "Previous Week", "Previous Month", "Previous Quarter", and "Previous Year", which may internally resolve to rolling time windows of, 7 days, 30 days, 90 days, and 365 days, respectively, at query execution time.

In one example, the data query schema 1502 may further support range notation syntax using square brackets ("[ ]") and the "to" keyword. For instance, a query expressed as "DateModified:[2023-07-10 TO 2023-07-15]" may instruct the system to retrieve data assets modified between Jul. 10, 2023 and Jul. 15, 2023. Similarly, queries such as "ColumnCount:[50 TO 100]" or "Completeness:[70 TO 100]" may express numeric value ranges that are interpreted based on the associated query component type 1806. This syntax allows for precise filtering without requiring multiple individual constraints. In another example, for numeric fields, the data query schema 1502 may enable relational filtering using symbolic operators, such as <(e.g., less than symbol), > (e.g., greater than symbol), <=(e.g., less than or equal to symbol), or >=(e.g., greater than or equal to symbol), provided that the equal sign is appended after the relational operator (e.g., >=95). The symbolic operators may be applicable to query components such as "ColumnCount," "RowCount," "Completeness," "StepCount," and the like.

In one embodiment, as shown in the non-limiting example of FIG. 18A, the data query schema 1502 may be configured for wildcard-based pattern matching, e.g., "*" symbol may be used within search terms to represent one or more unknown characters. In an example, query expressions such as "cars", "*cars", or "cars*" may allow flexible partial matching on query terms. In another embodiment, the data query schema 1502 may further include logic for mandatory search conditions using the "+" symbol, referred to as the "MUST operator." When used before a facet expression, such as "+Name: +Patient Description:Medical Record", the query processing system may interpret the search criteria as mandatory. If multiple "+" or "−" prefixed expressions are provided, the system may ensure that all expressions must be satisfied for a data asset to match the query.

In one or more embodiments, the inclusion of the plurality of search facets 1802, corresponding search facet functions 1804, and query component types 1806 within the data query schema 1502 may enable a query processing system to automatically construct, validate, and execute computer-executable search queries that conform to the permitted syntax, operator usage, and value formatting rules of the target data query language, thereby ensuring query compatibility and improving search precision across diverse datasets.

Extracting One or More Sets of Query Components from the Data Query Schema

In one or more embodiments, method 1400 may further include process 1420. Process 1420, which may include extracting query components, may function to extract one or more sets of query components from the data query schema 1502 that may define the search syntax of the target data query language. In one or more embodiments, Process 1420 may systematically parse a data query schema 1502 or the structured schema definition associated with data query schema 1502 to obtain discrete elements permitted for use in constructing search queries executable within the constraints of the target data query language.

The data query schema 1502 may include a machine-readable definition of query construction rules, which may specify the permitted operators, data formats, and syntactic conventions required to generate valid search expressions. The extraction process, in some embodiments, may include identifying individual search facets 1802, such as metadata fields, column properties, or dataset-level attributes, that can be used in forming search criteria. For each search facet 1802, the extraction process, in one or more embodiments, may further retrieve associated metadata, such as the expected data type, permissible operators or comparison functions (e.g., equality, range, wildcard), and value formatting constraints. The extracted elements together may define the semantic and syntactic rules for how a given search facet 1802 may be used in a search query in the target data query language.

Each set of query components may be categorized according to one or more dimensions, such as the expected data type of the component (e.g., text, numeric, date, or symbol), the type of matching or filtering operations supported (e.g., exact match, range search, pattern match), and the domain or scope of applicability (e.g., dataset-level metadata vs. column-level attributes). The output of process 1420 may be used to drive downstream tasks such as natural language-to-search query translation, query validation, or visual query builder interface generation.

By extracting structured sets of query components from the data query schema 1502, process 1420 may enable only syntactically valid and semantically meaningful search expressions being generated, thereby reducing query errors, improving search precision, and enabling system-wide consistency in query behavior across heterogeneous data sources.

Figure 15:
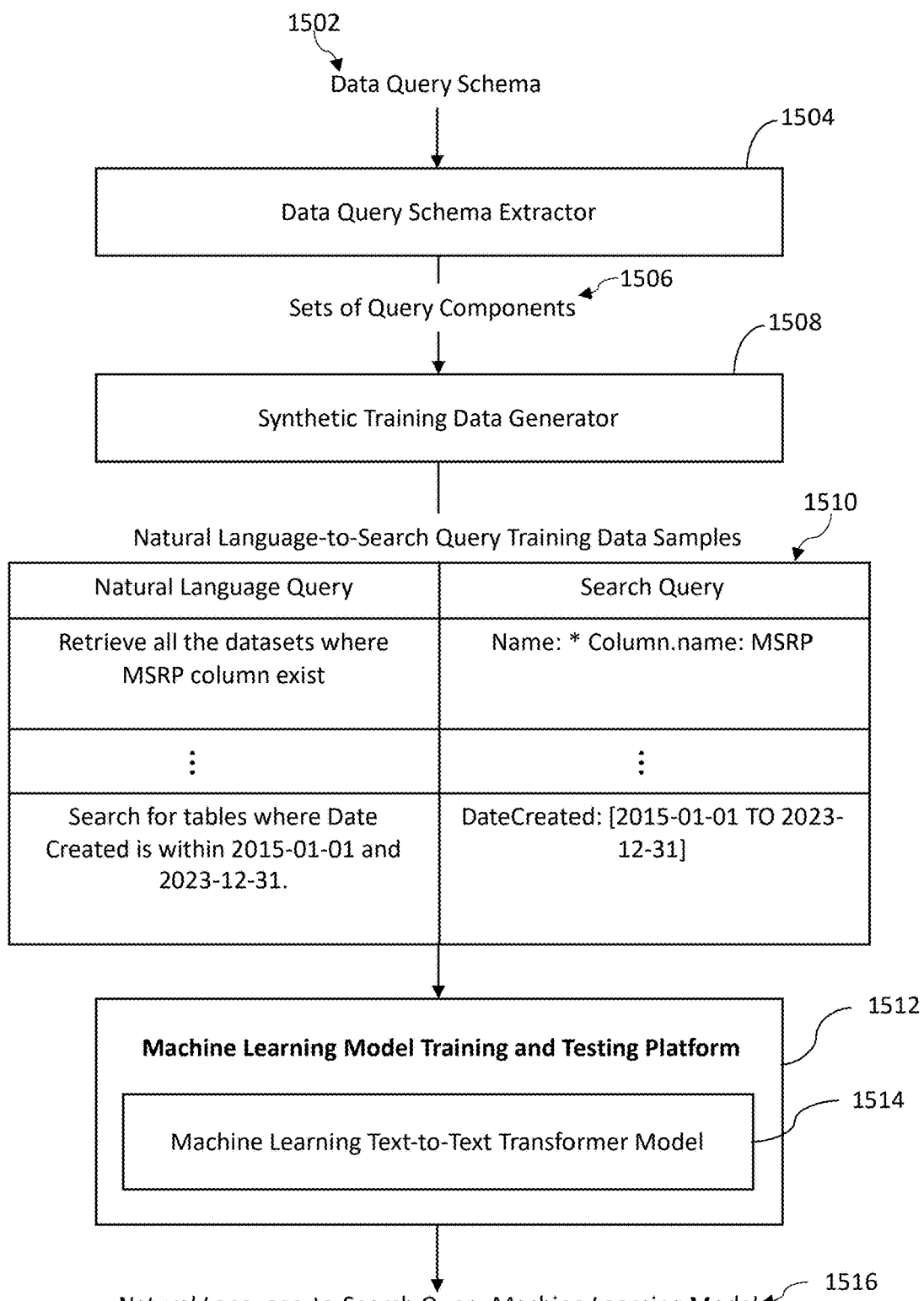
FIG. 15 illustrates an example schematic of configuring and training a natural language-to-search query machine learning model, according to some embodiments of the present technology.

In one non-limiting example shown in FIG. 15, the data query schema 1502 may be provided as input to a data query schema extractor 1504. The data query schema 1502, in one or more embodiments, may represent a structured, machine-readable specification of query construction rules for constructing computer-executable search queries within a given dataset environment. The data query schema extractor 1504 may be configured to parse the data query schema 1502 and extract syntax-related information encoded within the data query schema 1502. As depicted, the data query schema extractor 1504 may identify one or more sets of query components 1506, which may correspond to discrete elements supported by the target data query language. In one or more embodiments, the one or more sets of query components 1506 permitted by the target query language may at least include a first set of query components that may include text-based search syntax components, a second set of query components that may include numerical-based search syntax components, and a third set of query components that may include date-related search syntax components.

The extracted sets of query components 1506 may include structural details relevant to query formulation, including whether the query language permits single or multi-valued keyword matches, ordered numeric ranges, symbolic operators, or logical composition rules. In one implementation, the sets of query components 1506 may also differentiate between text-based components, relational operators, and special value syntaxes, which may enable automated construction of search queries by using the sets of query components 1506 to assemble valid computer-executable search queries based in part on query component type.

As shown in the non-limiting example of FIG. 19, the data query schema extractor 1504 may assess the data query schema 1502 to identify specific categories of one or more sets of query components 1506 within the data query schema 1502, each category defining a different type of search syntax. In one implementation, the data query schema extractor 1504 may analyze the data query schema 1502 to extract four distinct categories of sets of query components 1506 that collectively define the permissible search syntax of the target data query language. A first category may include text-based search syntax components that may be used to match against string-encoded metadata attributes using expressions with keyword tokens, quoted phrases, or wildcard characters. Metadata attributes, as generally referred to herein, may refer to structured descriptors associated with datasets that may define identifying properties, operational parameters, semantic categories, access information, provenance details, or evaluation statistics related to the dataset or constituent components of the dataset. These metadata attributes may include, but are not limited to, field names, creation timestamps, data types, ownership identifiers, access patterns, completeness scores, privacy annotations, and step-level execution metrics. Each metadata attribute may enable search, filtering, and classification operations when constructing data queries using the permitted syntax components of the target data query language. Stated another way, in one or more embodiments, process 1420 may function to extract, from data query schema 1502, a first set of query components that may include text-based search syntax components permitted by a target data query language.

A second category of the one or more sets of query components 1506 may include numerical-based search syntax components, which may define structured numeric comparison operations using relational symbols or range syntax such as to filter data assets based on quantitative metadata like row counts, column counts, or completeness percentages. Stated another way, in one or more embodiments, process 1420 may function to extract, from data query schema 1502, a second set of query components that may include numerical-based search syntax components permitted by the target data query language.

A third category of the one or more sets of query components 1506 may include date-related search syntax components, which may support absolute and relative date filtering using recognized formats (e.g., MM/DD/YYYY) or predefined temporal keywords. Stated another way, in one or more embodiments, process 1420 may function to extract, from data query schema 1502, a third set of query components that may include date-related search syntax components permitted by the target data query language.

A fourth category of the one or more sets of query components 1506 may include symbolic search syntax components, which incorporate special tokens for mandatory match enforcement, field-value association, or wildcard expansion. The symbolic search syntax components may enable structured query expressions that comply with the parsing and grammar rules of the target data query language. The extraction of these categories by data query schema extractor 1504 allows downstream query generation logic to construct valid, semantically precise, and syntactically compliant computer-executable search queries. Stated another way, in one or more embodiments, process 1420 may function to extract, from data query schema 1502, a fourth set of query components that may include symbolic syntax components permitted by the target data query language.

Other categories of the sets of query components 1506 may be possible, and such implementations are contemplated. For instance, in some embodiments, each distinct type of query component may be organized into a respective set of query components 1506. For example, numerical-based query components may be grouped together into a numerical set of query components, date-related query components may be grouped together into a date-related set of query components, and/or text-based query components may be grouped together into a text-based set of query components. More generally, for n distinct types of query components, the system may maintain n corresponding sets of query components, such that a one-to-one correspondence is established between each query component type and a respective query component set. By way of illustration, if 30 distinct types of query components are defined in accordance with a target data query language, then 30 corresponding sets of query components may be instantiated to structurally organize the available query components by type.

Extracting a First Set of Query Components Comprising Text-Based Search Syntax Components Permitted by the Target Data Query Language In one embodiment, process 1420 may include subprocess 1420A. Subprocess 1420A may include extracting, from data query schema 1502, a first set of query components comprising text-based search syntax components permitted by the target data query language. The first set of query components, i.e., text-based syntax components, may include searchable field definitions and associated operations that allow text-matching operations over textual metadata attributes of datasets. The first set of query components may define permitted search facet functions 1804 and expected query component types 1806 for handling unstructured or semi-structured natural language textual input. The inclusion of text-based search syntax components within the first set of query components may facilitate the formulation of search queries that support keyword matching, free-text search, wildcard expansion, or semantic filtering across one or more text fields, such as dataset title, description, column name, or owner name.

In one embodiment, the text-based syntax components within the first set of query components may include search syntax components compatible with the text string handling capabilities of the target data query language. For instance, the text-based syntax components may allow for application of wildcard operators, logical operators (e.g., AND, OR), or phrase matching constructs supported by the search syntax of the target data query language. Each component of the text-based syntax components may be encoded with syntactic constraints and operator precedence rules that ensure accurate interpretation during query translation and execution. Syntactic constraints may define allowable structure, ordering, and formatting of query components within the data query schema 1502. Further, operator precedence rules may specify a hierarchical evaluation order of search facet functions 1804 to ensure that a search query is semantically correct and compatible with the target data query language. The query component type 1806 associated with the text-based syntax components may be classified as "text," or "keyword" or other designated types corresponding to the value representation expected by the target data query language parser.

In one non-limiting example of FIG. 18, text-based syntax components extracted from the data query schema 1502 may include search facets 1802 such as "AccessedBy," "Column.keywords," "Column.label," "Column.notes," and the like. The "AccessedBy" query component may enable filtering of a dataset based on a system account that most recently accessed the dataset, wherein the system account identifier may be matched as a string token. The "Column.keywords" query component may support text-based retrieval of data assets based on keywords or tags associated with a column, as defined in the metadata. The query component "Column.label" may support identification of datasets based on human-readable labels assigned to columns, thereby enhancing semantic matching capabilities. Similarly, the "Column.notes" query component may enable text-based filtering of datasets using annotations or descriptive comments associated with dataset columns, which may be stored as unstructured text fields. Each of these search facets 1802 may define a distinct search facet function 1804, and a corresponding query component type 1806 consistent with expected string-based value formats, enabling text-oriented filtering across dataset repositories.

In one non-limiting example shown in FIG. 19, the data query schema 1502 may be processed using the data query schema extractor 1504 to extract or identify text-based search syntax components permitted by the target data query language. These text-based search syntax components may be derived from parsing text-compatible query definitions within the data query schema 1502, and may enable search query formulation involving user-defined keywords or textual filters. The syntactic rules for such text-based expressions may be explicitly specified in the data query schema 1502, enabling consistent interpretation of user search input across systems that implement the target data query language.

Extracting a Second Set of Query Components Comprising Numerical-Based Search Syntax Components Permitted by the Target Data Query Language In one or more embodiments, process 1420 may include a subprocess 1420b. Subprocess 1420B may include extracting, from data query schema 1502, a second set of query components comprising numerical-based search syntax components permitted by the target data query language. The numerical-based search syntax components may include searchable field definitions and associated operations that enable quantitative filtering based on numeric values or ranges of values associated with metadata attributes of datasets. The second set of query components 1506 within the numerical-based search syntax components may define permitted search facet functions 1804 and expected query component types 1806, facilitating query construction based on arithmetic comparisons, bounded range evaluations, and numeric threshold constraints. The inclusion of numerical-based search syntax components within the second set of query components may enable formulation of search queries that incorporate numeric expressions, interval filters, or symbolic operators over quantitative metadata fields including, but not limiting to, row count, column count, step count, and completeness.

In one embodiment, the numerical-based search syntax components may include search syntax components compatible with numeric handling constructs supported by the search syntax and evaluation semantics of the target data query language. For instance, the numerical-based search syntax components may support expression of numeric comparisons using symbolic operators (e.g., $<$, $<=$, $>$, $>=$, $=$), bounded ranges expressed using square bracket notation with the "to" keyword, or equality-based threshold expressions. The numerical-based search syntax components may be associated with operator precedence rules and expression formatting constraints encoded in the data query schema 1502, thereby ensuring valid and consistent interpretation at query generation and execution time. The query component type 1806 associated with the numerical-based search syntax components may be classified as "numeric," "integer," "double," or other value types recognized by the parser of the target data query language.

In a non-limiting example shown in FIG. 19, the data query schema extractor 1504 may extract numerical-based syntax components from the data query schema 1502. The numerical-based search syntax components, as illustrated by way of example in FIG. 18, may include search facets 1802 such as "RowCount", "StepCount", "ColumnCount", and "Completeness". The "RowCount" query component may allow filtering of datasets based on the number of rows, for example, selecting datasets where the total row count exceeds a specified threshold. The "StepCount" query component may enable filtering based on the number of data processing steps associated with a data asset. Similarly, the "ColumnCount" query component may support numeric filtering operations based on the number of columns in a dataset. The "Completeness" query component may represent a completeness score, such as a percentage or index value, indicating the extent to which data records are populated or fully filled, and may be used to perform comparisons or range-based evaluations for data quality assessments. Each of these search facets 1802 may define search facet functions 1804 such as "datasets with more than N rows" or "dataflows with fewer than M steps," and may be mapped to query component types 1806 such as "numeric," in accordance with the value representations permitted by the target data query language. These numerical-based syntax components extracted from the data query schema 1502 by the data query schema extractor 1504 may enable consistent and performance-oriented query construction over structured datasets in the target environment.

Extracting a Third Set of Query Components Comprising Data-Related Search Syntax Components Permitted by the Target Data Query Language In one or more embodiments, process 1420 may include a subprocess 1420C. Subprocess 1420C may include extracting, from data query schema 1502, a third set of query components comprising date-related search syntax components permitted by the target data query language. The date-related search syntax components may include searchable field definitions and associated operations that enable temporal filtering of datasets based on one or more time-stamped metadata attributes. The date-related search syntax components may define permitted search facet functions 1804 and expected query component types 1806, facilitating the formulation of time-sensitive queries based on absolute dates, relative time intervals, or logical date boundaries. The inclusion of date-related search syntax components within the third set of query components may support search scenarios involving recency, data freshness, archival age, or modification chronology across dataset repositories.

In one embodiment, the date-related search syntax components may be compatible with temporal constructs supported by the search syntax of the target data query language, including syntactic elements for specifying absolute timestamps (e.g., "2023-12-31"), relative intervals (e.g., "last 7 days"), or symbolic operators (e.g., $>=$, $<=$, between). The third set of query components 1506 may include parsing rules, date formats, and precedence constraints that govern evaluation of temporal expressions in the target data query language. The query component type 1806 associated with the third set of query components 1506 may be classified as "date," "datetime," "timestamp," or any other temporal type supported by the query parser.

In a non-limiting example illustrated in FIG. 19, the data query schema extractor 1504 may process the data query schema 1502 to extract date-related query components based on defined syntactic and semantic properties associated with temporal metadata fields. The extracted query components may include, without limitation, "DateAccessed:", "DateAnalyzed:", "DateCreated:", and "DateModified:". The "DateAccessed:" query component may enable filtering datasets based on the last access time, allowing for queries such as "datasets accessed in the past 24 hours." The "DateAnalyzed:" query component may support filtering based on the last date on which a dataset underwent analysis or profiling. The "DateCreated:" query component may allow users to identify datasets ingested or created within a specific time range. The "DateModified:" query component may facilitate retrieval of datasets recently updated or altered. The third set of query components 1506 may further specify search facet functions 1804 such as "datasets modified in the last 30 days" or "assets created before a specific archival cutoff," and may be mapped to date-compatible query component types 1806 defined in the target data query language. The syntax constraints and supported operations for each date-related query component may be explicitly specified within the data query schema 1502 and systematically extracted by the data query schema extractor 1504 to ensure consistent query formulation and execution across compliant systems.

Additionally, or alternatively, as shown by way of the non-limiting example in FIG. 19, process 1420 may function to extract a fourth set of query components that may include symbolic search syntax components permitted by the target data query language. The symbolic search syntax components may include operator tokens or symbol-based expressions, such as comparison operators, logical connectors, wildcard indicators, range specifiers, or equality markers, that may be used to construct valid and compact expressions within a search query.

The symbolic search syntax components may be used to compose expressions that define constraints, thresholds, or logical relationships between other query components and their associated values. For example, operators such as $<$ (less than), $<=$ (less than or equal to), $>$ (greater than), $>=$ (greater than or equal to), $=$ (equal to), and $!=$ (not equal to)

may define comparative relationships between text-based syntax components and numerical-based query components. For instance, in a non-limiting example, an operator "<" may be applied to a numerical-based search syntax component such as "DatasetSize" to generate a search query "DatasetSize <1000", enabling retrieval of datasets smaller than 1000 bytes in size. In another example, the fourth set of query components may further include wildcard symbols such as "*" or "?". In one non-limiting example, a query component "Folder.name" used for filtering datasets based on names of folders may be used with a symbolic search syntax component "*" to generate a search query "Folder.name="Project*", which may retrieve all data assets stored in folders with names starting with "Project", such as "ProjectAlpha", "Project_Beta", or "Project2025", regardless of the remaining characters after the prefix "Project".

The fourth set of query components may define permitted search facet functions 1804 that are applicable when combining symbolic syntax components with other query components, ensuring valid expression construction and consistent interpretation during query generation. Corresponding query component types 1806 may include classifications such as "symbol," "operator," or "wildcard," depending on the nature of the token representation supported by the target data query language.

Synthetically Generating a Plurality of Natural Language to-Search Query Training Data Samples In one or more embodiments, method 1400 may include process 1430. Process 1430, which may include synthetically generating a plurality of natural language-to-search query training data samples based at least in part on the one or more sets of query components 1506 extracted from the data query schema 1502, may function to produce a diverse and scalable corpus of paired training data samples for use in configuring (e.g., training, etc.) one or more machine learning models that learns to convert unstructured natural language inputs to structured search queries executable in the target data query language. Each natural language-to-search query training data sample, in one or more embodiments, may include a synthetically generated natural language query specifying a data asset retrieval request and a synthetically generated search query that represents the data asset retrieval request in the search syntax of the target data query language. A data asset retrieval request, in some embodiments, may include an unstructured or abstract query (e.g., in natural language) initiated by a user, system, or process to locate, fetch, and return one or more data assets from a data repository, catalog, or storage system based on specific filtering criteria. Further, a synthetically generated search query may include a computer-executable structured query derived based on the data asset retrieval request, wherein the query conforms to the syntactic, semantic, and operational constraints defined in the target data query language.

In one non-limiting example shown in FIG. 15, a synthetic training data generator 1508 may receive a structured input in the form of sets of query components 1506. Using the sets of query components 1506, the synthetic training data generator 1508 may produce a plurality of natural language-to-search query training data samples 1510. Each natural language-to-search query training data sample may include a synthetically generated natural language query that specifies a data asset retrieval request expressed in a human-readable language (e.g., English, French, German, etc.) and a synthetically generated search query that syntactically represents the data asset retrieval request in the search syntax of the target data query language. Stated another way, process 1430 may function to generate a plurality of synthetic natural language-to-search query training data samples 1510 derived from query components extracted from the data query schema 1502. Each natural language-to-search query training data sample may include a synthetically generated natural language query that specifies a data asset retrieval request and a corresponding computer-executable search query formulated in the syntax of the target data query language. Such synthetic generation of natural language-to-search query training data samples 1510 may produce a scalable corpus of consistent, structured training data that enables configuration and/or training of a machine learning model to reliably transform unstructured natural language inputs into executable search queries in the target data query language.

In one or more embodiments, the natural language-to-search query training data samples 1510 may each comprise paired representations of human-readable natural language queries and corresponding computer-executable search queries. For example, a first entry in a given natural language-to-search query training data sample may include a human-oriented request such as "find records where the status is active," while the corresponding search query portion of the training data sample may encode the same intent in the syntax of the target data query language, such as "Status: active." In another example, another entry may include a natural language query "show all datasets created after January 2023," with the corresponding search query portion structured as "CreatedDate: >2023-01-01." Each natural language-to-search query training data sample may therefore establish a direct association between an unstructured natural language input and a structured query language representation that satisfies the syntactic and semantic requirements of the target data query language.

Synthetically Generating a Natural Language Query Specifying a Data Asset Retrieval Request In one or more embodiments, process 1430 may include subprocess 1430A. Subprocess 1430A may function to synthetically generate a natural language query that may represent a human-readable instruction emulating an intent (e.g., user intent, etc.) to retrieve one or more data assets from a catalog of available data repositories, including but not limiting to, enterprise data catalogs, unstructured or semi-structured repositories, relational databases, data warehouses, data lakes, and the like. In an implementation, a given data asset retrieval request may textually indicate, in a form that may or may not conform to a rigid search syntax, one or more search constraints that represent multiple criteria for filtering available data repositories to retrieve the intended data assets. The search constraints in a given data asset retrieval request may vary in number, e.g., ranging from a single search constraint to multiple search constraints, wherein each search constraint may reflect a different criteria. For instance, a data asset retrieval request may specify a date-based search constraint such as "records from last year," a text-based search constraint such as "projects in healthcare," a symbol-based search constraint such as "count <1000," or a combination thereof. Further, each data asset retrieval request may be expressed in natural conversational language rather than in a formal query language.

Each synthetically generated natural language query specifying a data asset retrieval request may be linguistically structured to express user intent to apply one or more data selection operations using the search constraints defined within the bounds of the data query schema 1502. The associated intent encapsulated in the synthetically generated natural language query may reference a wide range of (e.g., user) intents, including but not limited to, retrieving tables whose names contain a given keyword, identifying datasets modified within a specified temporal interval, locating records with column values exceeding or falling within numerical thresholds, or filtering datasets according to quality metrics such as completeness or row count.

In an embodiment, the natural language queries may be synthetically generated to construct training data, e.g., natural language-to-search query training data samples 1510, to train a machine learning model for converting natural language queries to computer-executable search queries in a target data query language. Using synthetically generated natural language queries to construct the training data may allow for a broader and more comprehensive training process for the machine learning model, than what would be achievable through reliance on naturally collected natural language queries alone. By generating natural language queries synthetically, the training data may encompass not only frequently occurring and common query expressions but also rare, edge-case, and structurally complex query patterns that may otherwise be less likely to be sufficiently represented in organically collected natural language queries. Stated in another way, synthetically generating natural language queries may enable the resulting natural language-to-search query training data samples 1510 to adequately reflect a wider range of linguistic variations, structural formulations, and domain-specific user intents, thereby improving the coverage and representativeness of the natural language-to-search query training data samples 1510.

In a non-limiting example illustrated in FIG. 15, the data asset retrieval request of one synthetically generated natural language query within the natural language-to-search query training data samples 1510 may include a text string such as: "Retrieve all the datasets where MSRP column exist". Such a data asset retrieval request may include a selection constraint that targets datasets containing a specific metadata field, namely, a column labeled "MSRP." In another example, the data asset retrieval request of another synthetically generated natural language query within the natural language-to-search query training data samples 1510 may include a text string such as: "Search for tables where Date Created is within 2015-01-01 and 2023-12-31." This synthetically generated natural language query may include a temporal range constraint and reflect an intent (e.g., user intent, etc.) to filter data tables based on creation date metadata.

In an implementation, each synthetically generated natural language query may be paired with a synthetically generated search query that is syntactically valid and logically equivalent to the natural language query. The synthetically generated search query may represent a data asset retrieval request in a search syntax of the target data query language. The synthetically generated natural language queries and corresponding synthetically generated search queries may form the natural language-to-search query training data samples 1510.

In one or more embodiments, natural language-to-search query training data samples 1510 may be generated in varying quantities, e.g., depending on the complexity of the data query schema 1502 and diversity of the query components 1506 within the data query schema 1502. In some implementations, thousands or tens of thousands of distinct natural language-to-search query training data samples 1510 may be generated, wherein each natural language-to-search query training data sample may comprise a synthetically generated natural language query specifying a data asset retrieval request and a corresponding synthetically generated search query in the syntax of the target data query language. Each such natural language-to-search query training data sample may therefore be used to train the machine learning model (e.g., natural language-to-search query machine learning model 1516).

Synthetically Generating a Search Query that Represents the Data Asset Retrieval Request in the Search Syntax of the Target Data Query Language In one or more embodiments, process 1430 may include subprocess 1430B. Subprocess 1430B may include synthetically generating a search query that represents the data asset retrieval request expressed in the corresponding synthetically generated natural language query. Each synthetically generated search query may be derived by identifying, from the one or more sets of query components 1506 extracted from the data query schema 1502, query components that may correspond to the search constraints present in the synthetically generated natural language query. The query components may define structural elements of the target data query language, such as attribute identifiers, field operators, relational connectors, and temporal delimiters. In one implementation, the search constraints in a synthetically generated natural language query may be expressed in conversational form and these search constraints may be matched to query components that collectively represent the same data asset retrieval request in a structured syntax of the target data query language. The synthetically generated search query may function as a standard representation of the search intent expressed in the synthetically generated natural language query.

As shown in the non-limiting example of FIG. 15, a synthetically generated natural language query within the natural language-to-search query training data samples 1510 may include a data asset retrieval request "Retrieve all the datasets where MSRP column exist." This synthetically generated natural language query may be syntactically paired with a synthetically generated search query: "Name: *Column.name: MSRP", which may conform to the structural rules of the target search language by employing a query component (Column.name:) to define a constraint on the presence of a specific column name. In another example, the synthetically generated natural language query: "Search for tables where Date Created is within 2015-01-01 and 2023-12-31" may be syntactically represented by the synthetically generated search query: "DateCreated: [2015-01-01 TO 2023-12-31]", which uses a query component (DateCreated:) within square brackets and a colon-prefixed field reference to capture the desired temporal constraint.

Each synthetically generated search query generated by subprocess 1430B may therefore be derived in logical correspondence with a corresponding synthetically natural language query generated by subprocess 1430A, thereby supporting the generation of aligned pairs of natural language-to-search query training data samples 1510 for use in training and validating the machine learning model (e.g., natural language-to-search query machine learning model 1516) that learn semantic-to-syntactic query translation.

In one embodiment, using natural language-to-search query training data samples 1510 including synthetically generated natural language queries and corresponding synthetically generated search queries to train the machine learning model may enable the machine learning model to learn explicit alignments between unconstrained, user-like formulations of data asset retrieval requests and precise, computer-executable search expressions that satisfy the data asset retrieval requests. Over repeated training iterations, the machine learning model may progressively learn statistical correspondences between linguistic tokens, grammatical structures, and semantic user intent as matched with corresponding attribute identifiers, operators, and query components.

In one or more embodiments, the generation of natural language-to-search query training data samples 1510 may further include generating erroneous natural language-to-search query training data samples. Each erroneous natural language-to-search query training data sample, in some embodiments, may include an erroneous natural language query specifying a respective erroneous data asset retrieval request, and a corresponding search query that correctly represents the erroneous natural language query in the search syntax of the target data query language. Further, each erroneous natural language query may include a malformed or noisy natural language query that contains one or more errors, including grammatical mistakes, misspellings, typographical errors, or semantic ambiguities. These erroneous natural language queries may be paired with correctly structured synthetically generated search queries representing the same data retrieval intent, thereby enabling the trained model to learn conversion of noisy or imperfect inputs to valid and accurate search expressions.

Each erroneous natural language query of the erroneous natural language-to-search query training data samples 1704 may include at least one type of linguistic or structural error. These errors may include grammatical errors, such as subject-verb disagreement or incorrect tense usage. The errors may further include punctuation errors, such as missing commas, misplaced periods, or improper use of colons and quotation marks. Spelling errors may be introduced by deliberately misspelling common or domain-specific terms. Further, typographical errors may be infused that include letter transpositions, accidental duplications, or omitted characters. In some samples, language translation errors may be introduced, such as incorrect translations or phrasing, or improper transliteration of names or technical terms from one language to another. These erroneous natural language queries may still semantically express a data asset retrieval request but in a malformed or noisy form.

In one example, an erroneous natural language query may include "List datasets where row count is between about 750 and 1,250." The natural language query may be infused with a vague modifier "about" in combination with a numeric-based search constraint. Such approximate or imprecise phrasing may not correlate directly to any defined query component of the data query schema 1502. A correctly structured synthetically generated search query may be generated by discarding the ambiguous modifier and rendering the search constraint as a closed numeric interval, e.g., "RowCount: [750 TO 1250]." In another example, an erroneous natural language query may include "Show entries where colum count no less than 12." This natural language query may be infused with both a typographical error ("colum" instead of "column") and a verbose inequality expression ("no less than") that may not be a valid operator in the syntax of the target data query language. The erroneous natural language query may be associated with a search query "ColumnCount: >=12" having a correct syntax according to the target data query language. The association of erroneous natural language queries with search queries in the natural language-to-search query training data samples 1510 may ensure that a machine learning model when trained using the natural language-to-search query training data samples 1510 is configured to accurately translate erroneous natural language queries to consistent computer-executable search queries in the target data query language.

In one non-limiting example shown in FIG. 17, a set of natural language-to-search query training data samples 1510 may be synthetically generated, wherein the natural language-to-search query training data samples 1510 may include non-erroneous natural language-to-search query training data samples 1702 and erroneous natural language-to-search query training data samples 1704.

A respective non-erroneous natural language-to-search query training data sample of the non-erroneous natural language-to-search query training data samples 1702 may include a synthetically generated natural language query that specifies a data asset retrieval request in unstructured human-readable language, and a corresponding synthetically generated search query that represents the same data asset retrieval request in a structured search syntax defined by the target data query language. In the shown example, one of the non-erroneous natural language-to-search query training data samples 1702 may include a synthetically generated natural language query such as "Retrieve all the datasets where MSRP column exist." The synthetically generated natural language query may be associated with a corresponding synthetically generated search query of the form "Name: *Column.name: MSRP", wherein the wildcard symbol (*) matches any dataset name and the "Column.name" field indicates a specific column identifier. Another synthetically generated natural language query in the non-erroneous natural language-to-search query training data samples 1702 may include a temporal constraint expressed as "Search for tables where Date Created is within 2015-01-01 and 2023-12-31," mapped to the corresponding synthetically generated search query "DateCreated: [2015-01-01 TO 2023-12-31]", using a valid date range syntax. Additional non-erroneous examples may include a column-count-based constraint expressed as "Retrieve tables with column count >=40762," paired with the structured query ColumnCount: >=40762, and a keyword match query "Retrieve reports with the phrase "boats"," translated to *boats*, indicating a full-text search with wildcard placement.

Further, a respective erroneous natural language-to-search query training data sample of the erroneous natural language-to-search query training data samples 1704 may include synthetically generated natural language queries that may be intentionally infused with a variety of linguistic or structural defects to simulate real-world user errors, and corresponding synthetically generated search queries in the search syntax of the target data query language. As shown in the example of FIG. 17, one erroneous natural language query of the erroneous natural language-to-search query training data samples 1704 may read as, "Lit entries where nuber of rows is within 500 and 1000," wherein "Lit" may be a typographic error for "List" and "nuber" may be a misspelling of "number." Despite these errors, the paired search query RowCount: [500 TO 1000] remains valid and may adequately interpret the data asset retrieval request specified by the erroneous natural language query. Another example includes a complex erroneous natural language query that states "Get data where table name contains cars and datemodified within 2023-01-01 and 2025-12-20 and ColumnCount is at, least 10.;" containing errors in punctuation, spacing, and phrasing. This erroneous natural language query may be accurately paired with the structured search query "Name: *cars*DateModified: [2023-01-01 TO 2025-12-20] ColumnCount: >=10".

Each of these examples in natural language-to-search query training data samples 1510 demonstrates the ability of the system to synthetically generate aligned input-output query pairs across a diverse spectrum of linguistic expressions, noise levels, and query constructions to support robust machine learning-based translation from natural language to executable search syntax. Moreover, the disclosed method may enable training of the natural language-to-search query machine learning model 1516 to translate malformed or imperfect natural language queries to semantically valid computer-executable search queries in the target data query language. By systematically incorporating erroneous natural language queries into training data, the natural language-to-search query machine learning model 1516 may exhibit increased robustness and fault-tolerance in processing typographical mistakes, incomplete phrases, and/or non-standard linguistic variations that may often occur in natural language inputs. This mitigates model fragility against noise introduced by human error, automated text generation systems, and/or multilingual translations, thereby reducing the frequency of failed search queries and/or retrieval of incorrect data asset.

In one or more implementations, process 1430 may further include generation of separate sets of natural language-to-search query training data samples 1510 corresponding to multiple distinct human languages. Each such set of natural language-to-search query training data samples 1510 may be defined by a pairing of a computer-generated natural language query specifying a data asset retrieval request textually represented in a given distinct human language and a computer-generated search query that represents the computer-generated natural language query in the search syntax of the target data query language. Generation of natural language-to-search query training data samples 1510 may enable the training of multilingual machine learning models that can accurately interpret user search intents expressed in different linguistic formats.

In one embodiment, a first subset of the natural language-to-search query training data samples 1510 may include a set of training data samples associated with a first distinct human language. Each training data sample of this subset may include a computer-generated natural language query that specifies a data asset retrieval request and is textually expressed using the grammar and vocabulary of the first human language. The corresponding computer-generated search query in each pair may encode the same data asset retrieval request using the formal search syntax of the target data query language. For example, when English is taken as the first human language, a natural language query such as "Show tables updated last month" may be paired with a search query like "DateModified BETWEEN "2024-07-01" AND "2024-07-31"". Other subsets of natural language-to-search query training data samples 1510 corresponding to different human languages such as, but not limited to, Spanish, French, German, Arabic, etc. may be generated similarly.

Each of the synthetically generated natural language queries across the different subsets may be generated using language-specific templates, token pools, and synonym variants to ensure linguistic diversity and expression variability, while their respective synthetically generated search queries may conform to a unified representation format aligned with the schema-defined search syntax of the target data query language. The multilingual structure of the natural language-to-search query training data samples 1510 may enable effective cross-language generalization during model training and supports deployment of multilingual search interfaces that can accept natural language input in multiple human languages and produce semantically equivalent, syntactically valid query strings for execution.

In one or more implementations, the synthetic generation of natural language-to-search query training data samples 1510 may include using query components from the one or more sets of query components 1506, wherein each query component may correspond to a specific category of search syntax. Synthetically generated natural language queries may be created by selecting one or more query components and generating textual formulations that correspond to the semantic operation of the selected query components. For example, when a synthetically generated natural language query "find datasets whose name contains the word budget updated between January 2023 and December 2024," may be constructed using a text-based search syntax component ("budget") and a date-related search syntax component ("January 2023 and December 2024"). Similarly, a natural language query "list tables where the number of rows is greater than 1,000 but not archived" may be synthetically generated using a combination of numerical-based search syntax component ("1000") and a symbolic-based search syntax component ("greater than").

Corresponding to each synthetically generated natural language query, a search query may also be synthetically generated, that incorporates the selected query components from the synthetically generated natural language query in a structured form of the target data query language. Continuing from the examples above, the search query corresponding to synthetically generated natural language query "find datasets whose name contains the word budget updated between January 2023 and December 2024," may be synthetically generated as "Name: budget DateModified: [2023-01-01 TO 2024-12-31]." Similarly, a search query corresponding to the synthetically generated natural language query "list tables where the number of rows is greater than 1,000 but not archived," may be synthetically generated as "RowCount: >1000 Status: !=archived." Each synthetically generated search query may therefore reflect a direct translation of semantic search constraints expressed in the natural language to explicit query components categorized into text-based, numerical-based, date-related, symbolic-based, or a combination of these search syntax components.

In one embodiment, the natural language-to-search query training data samples 1510 may be generated as paired instances comprising the synthetically generated natural language queries and corresponding synthetically generated search queries. The structural pairing may ensure that a machine learning model trained using the natural language-to-search query training data samples 1510 learns to observe direct alignments between free-form human natural language inputs and schema-derived, computer-executable search queries. Further, as the synthetically generated search queries are assembled from structured query components, the alignments may be precise and unambiguous, enabling the machine learning model to internalize consistent associations between lexical cues and structural query constructs.

In one embodiment, the synthetic generation of natural language-to-search query training data samples 1510 may be performed through an iterative sampling routine that continues until a predefined number of natural language-to-search query training data samples 1510 have been generated. For example, the predefined number may be set to 50,000 natural language-to-search query training data samples 1510, although other configurations may specify fewer than 10,000 samples for smaller-scale deployments or more than 1,000,000 samples for large-scale multilingual or enterprise-wide training environments. A new natural language-to-search query training data sample may be generated in each iteration, by independently generating a synthetically constructed natural language query and a corresponding synthetically generated search query formatted according to the syntax of the target data query language. During a respective iteration, the generation process may begin by synthetically generating a new natural language query that specifies a new data asset retrieval request. The natural language query may be constructed using a predefined natural language query generation template comprising structured placeholders for query components including command tokens, entity tokens, contextual tags, filter conditions, and attribute constraints. For example, a template such as "Show me all [ENTITY] that [CONDITION]" may be populated with sampled tokens and constraints to produce a natural language query like "Show me all tables created after Jun. 1, 2023."

In one or more embodiments, command tokens may represent syntactically significant lexical elements that indicate operational intent within a natural language query, typically corresponding to action-oriented instructions provided by a user. The command tokens may be selected from a predetermined set of canonical commands, including "show," "retrieve," "list," "find," or "display," each specifying a directive for initiating a data retrieval, filtering, or aggregation operation. Further, entity tokens may represent semantic references to data objects or asset classes targeted by the natural language query. The entity tokens may be selected from a predetermined set of domain-relevant entities, such as "tables," "files," "datasets," "reports," or "records," each token identifying the scope of the data retrieval request.

Subsequently, in one or more embodiments, a corresponding computer-executable search query may be synthetically generated to represent the same data asset retrieval request in the formal search syntax of the target data query language. The synthetic generation of the search query may be performed using a predefined search query generation template into which at least one query component from the previously extracted sets of query components 1506 and a syntactically valid parameter value associated with that query component are inserted. For instance, the above natural language query may yield a search query such as DateCreated >"2023-06-01", where "DateCreated" is the query component and "2023-06-01" is the associated parameter value.

The iterative generation process of natural language-to-search query training data samples 1510 may ensure that each constructed training data sample pairs a user-intent-driven natural language query with a corresponding search query that is semantically and syntactically valid for the query execution environment of the target query language. Further, the use of predefined generation templates for both natural language and search queries guarantees structural consistency, while randomized sampling of query components, parameter values, and linguistic tokens introduces diversity across the generated dataset. The resulting set of natural language-to-search query training data samples 1510 may therefore include thousands or millions of examples, each generated through such iterative synthesis logic, and ready for use in training a machine learning model capable of translating human-readable queries into executable search instructions.

Stated another way, process 1430 may function to synthetically generate natural language-to-search query training data samples 1510, each comprising a synthetically generated natural language query specifying a data asset retrieval request and a corresponding synthetically generated search query formulated in accordance with the target data query language. The synthetically generated natural language queries may be constructed to reflect human-readable request variations, while the synthetically generated search queries may be derived from query components defined in the data query schema 1502 to ensure syntactic and semantic validity. By pairing the synthetically generated natural language queries with corresponding synthetically generated search queries, the resulting natural language-to-search query training data samples 1510 may provide a scalable and diverse set of training data that enables the machine learning model to accurately learn conversion of unstructured natural language input to computer-executable search queries in target data query language.

Additionally, or alternatively, process 1430 may further include structured procedures wherein a respective natural language-to-search query training data sample is synthetically generated using a combination of numeric values, symbolic-based search syntax components selected from the fourth set of query components 1506, and numerical-based search syntax components selected from the second set of query components 1506. A respective training data sample may be generated by randomly selecting a numeric value from a predetermined range of numeric values, randomly selecting a symbolic-based search syntax component from the fourth set of query components 1506, and randomly selecting a numerical-based search syntax component from the second set of query components 1506.

In one or more embodiments, a symbolic-based search syntax component may correspond to a logical or mathematical operator that expresses a condition to be evaluated, such as "=," "!=," "<," ">," "<=," or ">=." A numerical-based search syntax component may correspond to a schema-aligned numeric attribute of a dataset, such as "RowCount," "ColumnCount," "RecordLength," or other measurable metadata fields. The numeric value may correspond to a specific quantity or threshold selected from a defined range, such as integers between 1 and 10,000, or floating-point values within a particular domain. By combining these elements, i.e., an attribute (numerical-based search syntax component), an operator (symbolic-based search syntax component), and a value (numeric value), a complete query constraint may be generated that expresses a structured filtering condition in the target data query language.

In one non-limiting example, if the symbolic-based search syntax component includes ">," (greater than) the numerical-based search syntax component includes "RowCount," and the numeric value is "1000," the generated search constraint may be represented as "RowCount >1000." In another example, if the symbolic-based search syntax component includes "<=," (less than or equal to) the numerical-based search syntax component is "ColumnCount," and the numeric value is "25," the generated constraint may be represented as "ColumnCount <=25." Each such synthetically generated search constraint may be paired with a natural language equivalent, such as "find all datasets with more than 1000 rows" or "list tables having 25 or fewer columns," thereby forming a natural language-to-search query training data sample.

In one implementation, the selected symbolic-based search syntax component and numerical-based search syntax component may be inserted into corresponding slots of a predefined search query generation template to generate a subject search query. In one or more embodiments, slots may refer to predefined placeholder positions within a search query generation template that may be configured to receive specific query components during query construction. Each slot may correspond to a syntactic location in the query generation template, wherein a particular type of search syntax component, such as a text-based, numerical-based, date-related, or symbolic-based search syntax component, can be inserted. For example, a slot may be defined for an attribute identifier, a comparison operator, or a parameter value, such that when a query component is associated with the slot, the placeholder may be replaced with a concrete schema-aligned expression.

In one non-limiting example, if a predefined search query generation template includes slots for an attribute identifier, a symbolic operator, and a parameter value, the symbolic-based search syntax component "!=" may be inserted into the operator slot, the numerical-based search syntax component "ColumnCount" may be inserted into the attribute slot, and the numeric value "5" may be inserted into the value slot. Upon populating the slots with the respective components, the resulting subject search query may be represented as "ColumnCount !=5." To construct the corresponding subject natural language query, a natural language variant that textually represents the symbolic-based search syntax component in alphabetic characters may be retrieved from a predetermined set of symbolic search syntax component variants. In the above example, "!=" may be mapped to "not equal to." A textual representation of the numerical-based search syntax component may also be obtained, where the lexical form differs from the syntax form, for example converting "ColumnCount" into "number of columns."

The process 1430 may further include randomly selecting one or more command tokens from a predetermined set of command tokens, as well as one or more entity tokens from a predetermined set of entity tokens.

In one implementation, the one or more command tokens, the one or more entity tokens, the textual representation of the numerical-based search syntax component, the natural language variant representing the symbolic-based search syntax component, and the numeric value are inserted into corresponding slots of a predefined natural language query generation template to generate a subject natural language query. The synthetically generated natural language query may correspond to the subject natural language query, and the synthetically generated search query may correspond to the subject search query, ensuring precise alignment between natural language intent and executable query structure. Using the subject natural language query and the corresponding subject search query, a sample training pair may be generated. One or more sample training pairs may then be collated together to form a natural language-to-search query training data sample of the natural language-to-search query training data samples 1510.

As described in the foregoing, in one or more embodiments, a command token may represent an action-oriented lexical unit that conveys the user's retrieval intent, such as "find," "show," "list," "retrieve," or "display." An entity token may represent a semantic reference to a category of data assets that are subject to retrieval, such as "datasets," "tables," "reports," "files," or "records." The command tokens and entity tokens may serve as linguistic framing of the synthetically generated natural language query, while the numerical-based search syntax component, symbolic-based search syntax component, and numeric value provide the filtering or search constraint expressed within the synthetically generated natural language query. By inserting each of these elements into predefined slots of the natural language query generation template, a grammatically coherent and semantically meaningful subject natural language query may be generated.

In one non-limiting example, the predefined query generation template may take the form "<COMMAND> all <ENTITY> where <ATTRIBUTE> <OPERATOR> <VALUE>." When the command token is selected as "list," the entity token is selected as "tables," the numerical-based search syntax component includes "ColumnCount," the symbolic-based search syntax component includes ">=," (greater than equal to) and the numeric value is "50," the resulting subject natural language query may be synthetically generated as "list all tables where ColumnCount is greater than or equal to 50." The corresponding subject search query may then be represented as "Column Count >=50."

In another non-limiting example, the predefined query generation template may take the form "<COMMAND> <ENTITY> having <ATTRIBUTE> <OPERATOR> <VALUE>." When the command token includes "show," entity token includes "datasets," the numerical-based search syntax component includes "RowCount," the symbolic-based search syntax component includes "<," (less than) and the numeric value is "1000," the resulting subject natural language query may be generated as "show datasets having RowCount less than 1000," with the corresponding subject search query represented as "RowCount <1000."

In an alternative implementation, instead of replacing the symbolic-based search syntax component with the natural language variant, the symbolic-based search syntax component may be directly inserted into the predefined natural language query generation template to generate the subject natural language query. For instance, using the same symbolic-based search syntax component "!=," the subject natural language query may be expressed as: "Retrieve tables where ColumnCount !=5." In either implementation, the synthetically generated natural language query of the respective natural language-to-search query training data sample corresponds to the subject natural language query, and the synthetically generated search query corresponds to the subject search query, ensuring precise alignment between natural language intent and executable query structure.

Additionally, or alternatively, the process 1430 may further include a generation sequence configured to compose a paired natural language-to-search query training data sample comprising a synthetically generated natural language query and a corresponding synthetically generated search query, both of which represent the same data asset retrieval request. The generation sequence may begin by randomly selecting a search facet 1802 from the one or more sets of query components 1506, where the selected search facet 1802 may be structurally valid and semantically relevant within the constraints of the target data query language. The search facet 1802 may represent a schema-aligned attribute or metadata field, such as "tag," "owner," "created_date," or "RowCount," that defines a filterable dimension within one or more data repositories. A textual representation of the search facet 1802 may then be obtained, where the textual representation is expressed in a lexical form different from the search facet 1802, thereby introducing natural language variability into the resulting natural language-to-search query training data sample. For example, the search facet "created_date" may yield textual variants such as "date created," "created date," "time of creation," or "when it was added." Similarly, the search facet "RowCount" may yield textual forms such as "row count," "number of rows" or "total records."

The generation sequence may further include randomly selecting a contextual tag from a predetermined set of contextual tags, where the contextual tag provides additional semantic framing or functional scoping for the query. The contextual tag may correspond to qualifiers that restrict or enrich the retrieval context, such as organizational labels ("by the security team"), temporal scope ("during Q1"), or classification markers ("marked as confidential"). The selected command tokens (e.g., "find," "show," "list"), entity tokens (e.g., "datasets," "tables," "reports"), textual representation of the search facet 1802 (e.g., "tagged as confidential"), and contextual tag (e.g., "by the security team") may be inserted into corresponding slots of the predefined natural language query generation template to produce a subject natural language query. For example, the generated subject natural language query may be: "Find datasets tagged as confidential by the security team," where "tagged as confidential" serves as the lexical form of the selected search facet 1802 and "by the security team" represents the contextual tag. In another example, a search facet "created_date" may yield a subject natural language query such as "Show reports created in Q1 of 2024," where the contextual tag "in Q1 of 2024" narrows the scope of the natural language query.

Simultaneously, a subject search query may be generated by inserting the search facet 1802 and the obtained contextual tag into corresponding slots of the predefined search query generation template. In the above example, the corresponding subject search query may take the form: "tag='confidential' AND tagger='security_team'". The synthetically generated natural language query of the respective natural language-to-search query training data sample may correspond to the subject natural language query, and the synthetically generated search query of the same training data sample may correspond to the subject search query, thereby ensuring one-to-one correlation between natural language inputs and computer-executable search queries.

In another implementation, process 1430 may further include incorporating controlled randomness and lexical variation to produce realistic yet programmatically structured natural language-to-search query training data samples 1510. In an implementation, controlled randomness may refer to systematic random selection of elements such as search facets 1802, terms, command tokens, and entity tokens from predefined sets, ensuring that each synthetically generated query may be syntactically valid and semantically diverse. Further, lexical variation may refer to generation of alternative textual forms of schema-aligned fields, thereby allowing the same underlying search facet 1802 to be expressed in multiple natural language phrasings.

The generation process may begin by randomly selecting a search facet 1802 included in the one or more sets of query components 1506, where the search facet 1802 defines a valid constraint field supported by the target data query language. Examples of search facets 1802 may include "classification_level," "owner," "status," or "RowCount." A textual representation of the search facet 1802 may then be obtained in a lexical form different from the search facet 1802, such as expressing "classification_level" as "classification tier" or "security category," thereby enabling natural language diversity in the constructed training data. The generation process may continue by randomly selecting a term from a predetermined set of terms, where the term defines a constraint value, context modifier, or scope specifier applicable to the selected search facet 1802. For example, the term "high" may correspond to a classification level, while the term "archived" may correspond to a status. Additionally, one or more command tokens may be randomly selected from a predetermined set of command tokens to convey user intent, e.g., "find," "fetch," or "retrieve," and one or more entity tokens may be randomly selected from a predetermined set of entity tokens to represent the targeted data objects or datasets, e.g., "datasets," "tables," or "reports."

A subject natural language query may be generated by inserting the one or more command tokens, the one or more entity tokens, the lexical representation of the search facet 1802, and the term into corresponding slots of a predefined natural language query generation template. For example, the generated subject natural language query may be: "Fetch all reports where the classification level is high," where "classification level" represents the lexical form of the selected search facet 1802 and "high" represents the randomly selected term. In another example, the command token "list," the entity token "datasets," the search facet "status," and the selected term "archived" may be combined in a natural language template to yield the subject natural language query: "List all datasets where the status is archived." Further, a corresponding subject search query may be generated by inserting the search facet 1802 and the obtained term into corresponding slots of a predefined search query generation template, producing an executable search query such as classification_level='high' or "status='archived'."

The synthetically generated natural language query of the respective natural language-to-search query training data sample corresponds to the subject natural language query, and the synthetically generated search query corresponds to the subject search query, ensuring semantic consistency and structural validity between natural language representations and executable queries. By synthesizing a scalable and heterogeneous set of natural language-to-search query training data samples 1510 using structured query components extracted from the data query schema 1502, process 1430 supports the training of a machine-learned model capable for transforming natural language queries into syntactically valid and semantically accurate search queries aligned with the target data query language.

Configuring a Natural Language-to-Search Query Machine Learning Model Based on Training a Machine Learning Text-to-Text Transformer Model Using the Plurality of Natural Language-to-Search Query Training Data Samples In one or more implementations, method 1400 may include process 1440. Process 1440, which may include configuring a natural language-to-search query machine learning model 1516 based on training a machine learning text-to-text transformer model 1514 (e.g., a large language model (LLM), a small language model (SLM, etc.) using a diverse and structured set of natural language-to-search query training data samples 1510 on a machine learning model training and testing platform 1512, may function to generate a trained machine learning model configured to translate natural language queries into structured search queries formatted according to a search syntax permitted by a target data query language.

The natural language-to-search query training data samples 1510 may serve as input training data for training the natural language-to-search query machine learning model 1516. Each natural language-to-search query training data samples 1510 may include a paired input-output tuple comprising a synthetically generated natural language query specifying a data asset retrieval request and a synthetically generated search query formatted in the search syntax of the target data query language, which may represent translation of the data asset retrieval request from natural language to a search syntax of the target data query language. The natural language-to-search query training data samples 1510 may be generated to capture a wide variety of language patterns, query intents, metadata references, and syntactic structures across multiple human languages, including both grammatically well-formed and noisy natural language queries. The inclusion of structurally diverse samples enhances the generalization capability of the trained model.

In one embodiment, training may be executed on a machine learning model training and testing platform 1512 configured with one or more computational resources such as GPU clusters and TPU pods to support large-scale training of transformer-based architectures. The machine learning model training and testing platform 1512 may additionally integrate distributed training frameworks such as Horovod, TensorFlow Distributed, or PyTorch DDP to scale across multiple compute nodes. Dataset loading, preprocessing, tokenization, checkpointing, and validation testing are orchestrated within the machine learning model training and testing platform 1512.

The underlying model architecture used for training the natural language-to-search query machine learning model 1516 may include a machine learning text-to-text transformer model 1514. Examples of machine learning text-to-text transformer model 1514 may include Text-to-Text Transfer Transformer (T5), Multilingual Text-to-Text Transfer Transformer (mT5), or Bidirectional and Auto-Regressive Transformers (BART) or custom variants tailored to domain-specific syntax parsing. The machine learning text-to-text transformer model 1514 may include encoder-decoder layers, where the encoder transforms the tokenized input natural language query into a contextualized latent representation using multi-head self-attention layers, and the decoder generates the target search query using autoregressive decoding. Positional embeddings may be added to input token vectors to preserve word order information in both the encoder and decoder stacks. The decoder may attend to the encoder's output via cross-attention layers to align natural language input structures with corresponding search query slots. Layer normalization and residual connections may be applied throughout the encoder and decoder to stabilize training and improve convergence. The machine learning text-to-text transformer model 1514 may further leverage sub-word tokenization techniques such as SentencePiece or Byte-Pair Encoding to handle vocabulary across different human languages and special search syntax tokens.

The configuration of the natural language-to-search query machine learning model 1516 may include tokenizing each training input from a given natural language-to-search query training data sample and transforming the input into a fixed-dimensional embedding. The transformation may include preserving token types for command tokens, entity tokens, numeric values, and special syntax symbols. For each paired sample, the synthetically generated natural language query may serve as the encoder input and the corresponding synthetically generated search query may serve as the decoder target.

In one or more implementations, a cross-entropy loss function may be applied over the output token sequence, with optional label smoothing, and token-level masking may be applied for multilingual training scenarios. Optimization may be performed using algorithms such as Adam or AdaFactor with gradient clipping to prevent instability. Training proceeds through mini-batches with scheduled learning rate warmups and decay policies. Model weights may be iteratively updated across multiple epochs, and early stopping criteria may be configured based on validation perplexity or BLEU scores. In some cases, domain-specific fine-tuning may be applied after a general pre-training phase using foundational corpora.

Upon completion of training, the configured and fully trained model is output as the natural language-to-search query machine learning model 1516. The natural language-to-search query machine learning model 1516 may be configured to accept as input an unseen natural language query and generate an output search query syntactically formatted in the target data query language. The natural language-to-search query machine learning model 1516 may generalize across different human languages, metadata query structures, and command token patterns represented in natural language-to-search query training data samples 1510, and handle both non-erroneous and erroneous natural language queries with contextual awareness of token patterns and query components. For example, given the training input "Retrieve all the datasets where MSRP column exist," the generated search query output may be Name:*Column-.name: MSRP. For a multilingual input in French such as "Récupérez toutes les tables créées aprés 2020," the generated query output may be DateCreated: [2020-01-01 TO *]. The natural language-to-search query machine learning model 1516 may learn to translate diverse linguistic expressions into deterministic, syntax-valid search queries by generalizing over the structures encoded in the natural language-to-search query training data samples 1510.

In one implementation, the natural language-to-search query machine learning model 1516 may be instantiated as a fine-tuned subset of a foundational large language model that has been pre-trained on a corpus of general-purpose natural language text and subsequently adapted to the domain-specific task of transforming natural language data asset retrieval requests into executable search queries. The foundational LLM may comprise a transformer-based architecture containing multiple attention heads, positional encoding mechanisms, and encoder-decoder stacks configured to model complex linguistic dependencies and token-level representations across long-form text sequences. The adaptation of the LLM into the natural language-to-search query machine learning model 1516 may include domain-specific fine-tuning operations using the natural language-to-search query training data samples 1510 such that the resulting model weights encode semantic and syntactic mappings aligned with the structure of the target data query language.

Figure 23:
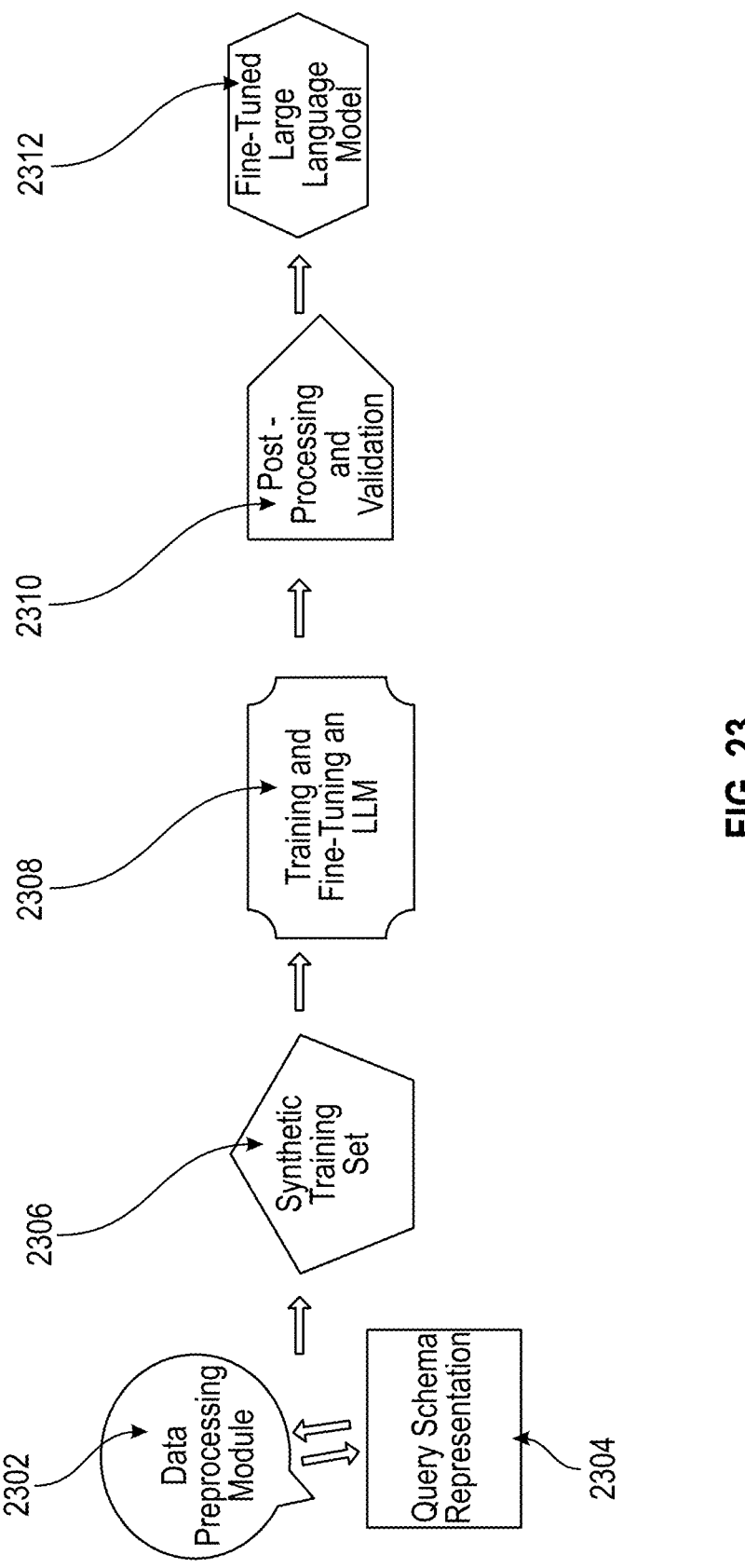
FIG. 23 illustrates an example schematic of generating synthetic training data and training a large language model using the synthetic training data, according to some embodiments of the present technology.

In one non-limiting example shown in FIG. 23, a data preprocessing module 2302 may be configured to receive and transform a query schema representation 2304 to generate synthetic natural language-to-search query training data samples. The output of the data preprocessing module 2302 may include a structured representation of the query schema formatted for compatibility with a downstream synthetic query generation engine. Based on the transformed schema representation, a synthetic training set 2306 may be created comprising pairs of natural language queries and search queries that reflect the structure and vocabulary of the target data domain. These pairs may correspond to natural language-to-search query training data samples 1510, and the synthetic training set 2306 may be augmented with both erroneous and non-erroneous variants of natural language queries to improve model robustness.

A training and fine-tuning module 2308 may load a base LLM and adjust parameters of the base LLM using the synthetic training set 2306. This process may involve supervised fine-tuning using a cross-entropy loss function (or any other suitable loss function) computed between predicted search query tokens and ground truth tokens for each training pair. The learning rate schedule, tokenization strategy, and gradient update mechanism may be configured to optimize convergence stability and generalization accuracy. Multi-head attention layers of the LLM may be reweighted to emphasize structural elements of the query schema such as facet names, parameter values, or conditional operators. A post-processing and validation module 2310 may evaluate the trained model using a separate validation set to measure syntactic correctness, semantic fidelity, and domain adherence of generated search queries. Model checkpoints may be evaluated on metrics including BLEU score, exact match accuracy, and schema-constrained parsing validity. Based on these validation results, a final fine-tuned large language model 2312 may be produced and output as the completed natural language-to-search query machine learning model 1516, specialized for generating structured executable queries from diverse forms of natural language data asset retrieval requests.

In some configurations, the natural language-to-search query machine learning model 1516 may be deployed as a logical module embedded within the decoder or instruction-following layer of the large language model such that the input natural language query is interpreted within the broader LLM context and subsequently passed to the downstream transformer module 1514 responsible for generating the structured search query representation. Alternatively, the natural language-to-search query machine learning model 1516 may operate as a wrapper or adapter layer over the base language model, where prompt engineering, input token prefixing, or instruction tuning may be applied to align the model's behavior with the data retrieval transformation task. The implementation may further include language-specific adapters or routing logic for multilingual operation, enabling the natural language-to-search query machine learning model 1516 to condition outputs based on the linguistic origin of the input query. During inference, the natural language-to-search query machine learning model 1516 may leverage the full contextual encoding and syntactic generalization capabilities of the large language model to generate search query strings that conform to strict execution rules and return valid results when submitted to a target data retrieval engine.

In one or more implementations, any given transformer-based model may be fine-tuned using the techniques described herein, e.g., to achieve translation of natural language inputs to computer-executable search queries. Some non-limiting examples of models that may be adapted in this manner may include TS, mTS, GPT-3, FLAN-TS, and PaLM-2. In each case, the LLM-derived version of the natural language-to-search query machine learning model 1516 may be hosted on the machine learning model training and testing platform 1512, with integrated support for model evaluation, query decoding, beam search control, temperature scaling, and runtime monitoring of semantic fidelity between the input natural language intent and the output query structure.

After Configuring the Natural Language-to-Search Query Machine Learning Model Transforming a Natural Language Input into an Executable Search Query for Retrieving Data Assets In one or more embodiments, method 1400 may include process 1450. Process 1450 may involve deploying the configured natural language-to-search query machine learning model 1516 to enable real-time inference and search query generation. The deployment process, in some embodiments, may include integrating the trained natural language-to-search query machine learning model 1516 to interface with one or more data retrieval engines configured to execute structured search queries according to the search syntax of a target data query language. The deployment may include packaging the natural language-to-search query machine learning model 1516 within a containerized runtime environment or scalable orchestration framework, enabling execution across distributed compute nodes, cloud-based infrastructures, or on-premises systems.

During deployment, configuration parameters, optimized model weights, and specialized tokenization vocabularies derived from the training of the machine learning text-to-text transformer model 1514 using natural language-to-search query training data samples 1510 may be provisioned to ensure consistency between the model's training behavior and its runtime execution. The deployment process may further include exposing an interface that receives a natural language input from one or more downstream applications, preprocesses the natural language input using domain-specific tokenization strategies, and invokes the natural language-to-search query machine learning model 1516 to generate a structured, executable search query that corresponds to the natural language input. Additionally, or alternatively, the deployment may involve integrating monitoring and feedback subsystems that evaluate the quality, accuracy, and latency of the generated search queries, while supporting adaptive updates and fine-tuning workflows to improve the performance of the deployed natural language-to-search query machine learning model 1516 over time.

Receiving a Natural Language Input Specifying a Subject Data Asset Retrieval Request In one or more embodiments, process 1450 may include subprocess 1450A. Subprocess 1450A, in one or more embodiments, may receive a natural language input specifying a subject data asset retrieval request. The subject data asset retrieval request may specify one or more constraints on entities, attributes, temporal properties, or metadata fields associated with a dataset. In one implementation, the natural language input may be provided by a requesting client device, graphical user interface, or application interface. Each natural language input may represent a user-specified intent to retrieve one or more subject data assets and may be expressed in unrestricted natural language. The received natural language inputs may include a variety of linguistic patterns, including complete grammatically correct statements, partial expressions, noisy phrases, or queries containing typographical inconsistencies. In one implementation, the process 1450 may include automatically routing the received natural language input to the natural language-to-search query machine learning model 1516 such that the natural language input may be automatically transformed to a computer-executable search query in response to the natural language input being routed to the natural language-to-search query machine learning model 1516.

In one or more embodiments, the automatic routing of the natural language input to the natural language-to-search query machine learning model may be facilitated through a query routing subsystem configured to intercept incoming retrieval requests at an application programming interface (API) or middleware layer. The query routing subsystem may identify that a received input is expressed in unrestricted natural language and may, in response, direct the input to the natural language-to-search query machine learning model 1516 for translation into a computer-executable search query. In some implementations, the query routing subsystem may include a dispatcher module configured to distinguish between inputs already expressed in a structured query language and those expressed in natural language, ensuring that only unstructured inputs are automatically routed to the natural language-to-search query machine learning model 1516. In other implementations, the query routing subsystem may incorporate schema-driven classifiers, metadata parsers, or linguistic detectors that recognize natural language expressions based on token structure, syntactic patterns, or semantic irregularities. Upon routing, the natural language-to-search query machine learning model 1516 may generate a computer-executable search query that is syntactically and semantically valid according to the target data query language, thereby enabling seamless integration of natural language requests into existing query execution pipelines.

Transforming, Using the Natural Language-to-Search Query Machine Learning Model, the Natural Language Input to a Computer-Executable Search Query Encoded in the Search Syntax of the Target Data Query Language In one or more embodiments, process 1450 may include subprocess 1450B that may include transforming the received natural language input into a structured, computer-executable search query using the natural language-to-search query machine learning model 1516. The transformation process, in some embodiments, may include natural language-to-search query machine learning model 1516 analyzing the linguistic structure, semantics, and intent contained in the natural language input. In one implementation, the natural language-to-search query machine learning model 1516 may leverage trained weights generated based in part on the natural language-to-search query training data samples 1510 to interpret and map user-provided natural language expressions in the natural language input to the data query schema 1502.

The natural language-to-search query machine learning model 1516, in some embodiments, may then use the mapped natural language input to the data query schema 1502 to identify attributes, fields, operators, and conditions required for constructing a syntactically valid search query compatible with the syntax rules of the target data query language. The identified elements may be used to generate a computer-executable search query that follows the encoding constraints of the target data query language, ensuring that the resulting computer-executable search query conforms to permitted structural rules, parameter formats, and operator precedence.

Additionally, or alternatively, the transformation of the natural language input to the computer-executable search query may account for variations in human language by recognizing synonyms, contextual equivalences, and shorthand expressions that may refer to the same underlying data attributes. Further, the natural language-to-search query machine learning model 1516 may handle diverse input patterns, including grammatically correct requests, incomplete queries, and noisy inputs, by leveraging token-level embeddings and contextual attention layers of the machine learning text-to-text transformer model 1514. This may enable the natural language-to-search query machine learning model 1516 to generalize across multilingual inputs and dynamically adapt transformations without requiring predefined templates.

In one or more embodiments, transforming the natural language input into the computer-executable search query may further include detecting at least one search constraint within the natural language input. A search constraint may refer to a logical, semantic, or numerical condition provided by the natural language input that filters the result set to a relevant subset of data assets. For example, if the natural language input states "show me all orders where the order amount is greater than 500," the natural language-to-search query machine learning model 1516 may identify or detect the search constraint "order amount is greater than 500" as the intent.

Once the search constraint is identified, the natural language-to-search query machine learning model 1516 may determine that the search constraint syntactically corresponds to a search facet 1802 included in one of the one or more sets of query components 1506 derived from the extracted data query schema 1502. The search facet 1802 may represent normalized and structured elements of the target data query language, such as column names, field identifiers, symbolic operators, or command tokens, and may directly map to the rules of constructing the computer-executable search query. Continuing from the earlier example, "order amount" may correspond to a numerical-based search facet 1802 (e.g., "Order.Amount") derived from the data query schema 1502, while the symbolic operator "greater than" may map to a predefined symbolic-based search syntax component associated with the same search facet 1802.

Following this determination, the natural language-to-search query machine learning model 1516 may extract a parameter value from the natural language input that semantically aligns with the identified search facet 1802. The parameter value may represent a dynamic operand to be applied to the search facet 1802 when generating the computer-executable search query. In the earlier example, the extracted parameter value may be "500." The natural language-to-search query machine learning model 1516 may use this parameter value alongside the associated search facet 1802 to construct the target query expression, resulting in a computer-executable search query, e.g., "Order. Amount >500".

Figure 22:
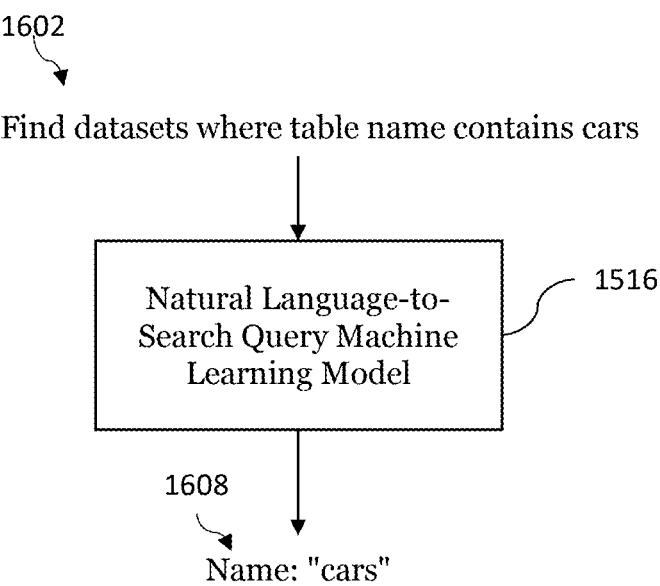
FIGS. 22-22G illustrate examples of converting a natural language input to a computer-executable search query using a natural language-to-search query machine learning model, according to some embodiments of the present technology.

As illustrated in a non-limiting example of FIG. 22, when the natural language input 1602 includes a query such as "Find datasets where table name contains cars," the natural language-to-search query machine learning model 1516 may detect "Name" as the search facet and extract the parameter value "cars." The resulting computer-executable search query 1608 may therefore include the mapped search facet ("Name:") and the parameter value ("cars"). In response to the natural language-to-search query machine learning model 1516 creating the computer-executable search query 1608, process 1450B may further include executing the computer-executable search query 1608 to obtain all data assets of a plurality of distinct data assets that satisfies the search condition specified by the computer-executable search query 1608. In this example, all data assets wherein a table name contains the string "cars" may be retrieved.

Figure 22A:
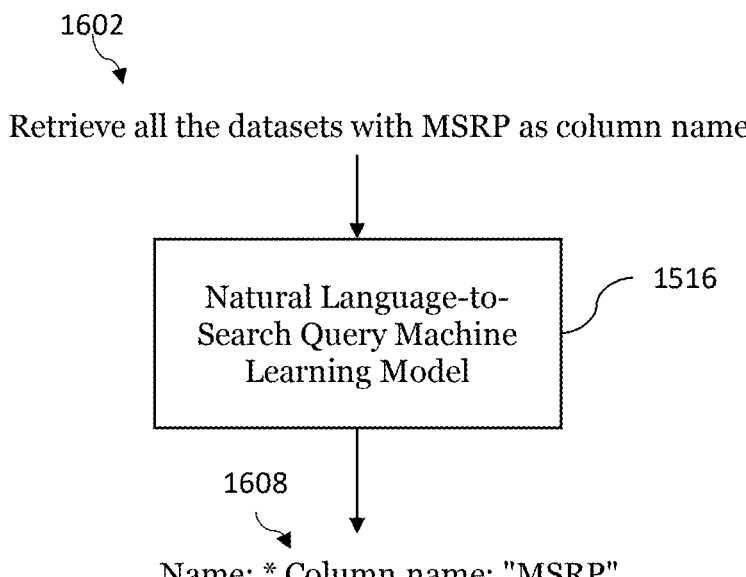

In another non-limiting example illustrated in FIG. 22A, when the natural language input 1602 includes a query such as "Retrieve all the datasets with MSRP as column name," the natural language-to-search query machine learning model 1516 may process the natural language input 1602 by analyzing the semantics of the text contained in the natural language input 1602 and mapping the semantics to a corresponding search facet 1802 from the data query schema 1502. The natural language-to-search query machine learning model 1516 may determine that the relevant search facet 1802 is "Column.name" and extract the parameter value "MSRP." The natural language-to-search query machine learning model 1516, in such an embodiment, may generate the resulting computer-executable search query 1608, which may include the search facet "Column.name:" and the parameter value "MSRP." In response to the natural language-to-search query machine learning model 1516 creating the computer-executable search query 1608, process 1450B may further include executing the computer-executable search query 1608 to obtain all data assets of a plurality of distinct data assets that satisfies the search condition created by the computer-executable search query 1608. In this example, all data assets wherein a column named "MSRP" exists may be retrieved.

In another implementation, process 1450B may involve processing a multi-constraint natural language input 1602 that includes a plurality of distinct constraints spanning multiple data types, for example, between two to ten distinct constraints spanning multiple data types, such as multiple text-based constraints, numerical-based constraints, date-related constraints, symbolic-based constraints or a combination thereof. The natural language-to-search query machine learning model 1516, in some embodiments, may detect that the received natural language input 1602 includes a first search constraint, a second search constraint, and a third search constraint, each corresponding to a different class of query components. Upon detection, the natural language-to-search query machine learning model 1516 may determine that the first search constraint may be syntactically translatable to a text-based search facet included in the first set of query components of the one or more sets of query components 1506, the second search constraint may be syntactically translatable to a date-based search facet included in the third set of query components one or more sets of query components 1506, and the third search constraint may be syntactically translatable to a numeric-based search facet included in the second set of query components of the one or more sets of query components 1506. Each of these search facets 1802 may represent a distinct structural element of the target data query language, allowing the natural language-to-search query machine learning model 1516 to precisely map natural language expressions to corresponding executable syntax rules.

For each identified search facet 1802, the natural language-to-search query machine learning model 1516 may further determine the respective parameter values based on assessing the multi-constraint natural language input 1602. Specifically, the natural language-to-search query machine learning model 1516 may determine a text-based parameter value for the text-based search facet, a date-based parameter value for the date-based search facet, and a numeric-based parameter value for the numeric-based search facet. For example, if the natural language input 1602 is "Find all employees named John hired after Jan. 1, 2020, earning more than 80,000," the natural language-to-search query machine learning model 1516 may map "employees named John" to the text-based search facet "EmployeeName" with a text-based parameter value of "John," "hired after Jan. 1, 2020" to the date-based search facet "HireDate" with a date-based parameter value of ">2020-01-01," and "earning more than 80,000" to the numeric-based search facet "Salary" with a numeric-based parameter value of ">80000."

Once the search facets 1802 and corresponding parameter values are determined, the natural language-to-search query machine learning model 1516 may construct the computer-executable search query such that the computer-executable search query contains the text-based search facet, the text-based parameter value, the date-based search facet, the date-based parameter value, the numeric-based search facet, and the numeric-based parameter value. The construction of the computer-executable search query 1608 may include encoding all three search constraints simultaneously within the search syntax of the target data query language. The resulting computer-executable search query 1608 may therefore enforce (or include) all search constraint conditions together, enabling efficient filtering and retrieval of the relevant data assets from the underlying computer database storing a plurality of datasets. This implementation enables the natural language-to-search query machine learning model 1516 to handle highly complex, multi-dimensional queries by independently resolving multiple constraint types and translating them into structured, syntactically valid executable queries.

Figure 24:
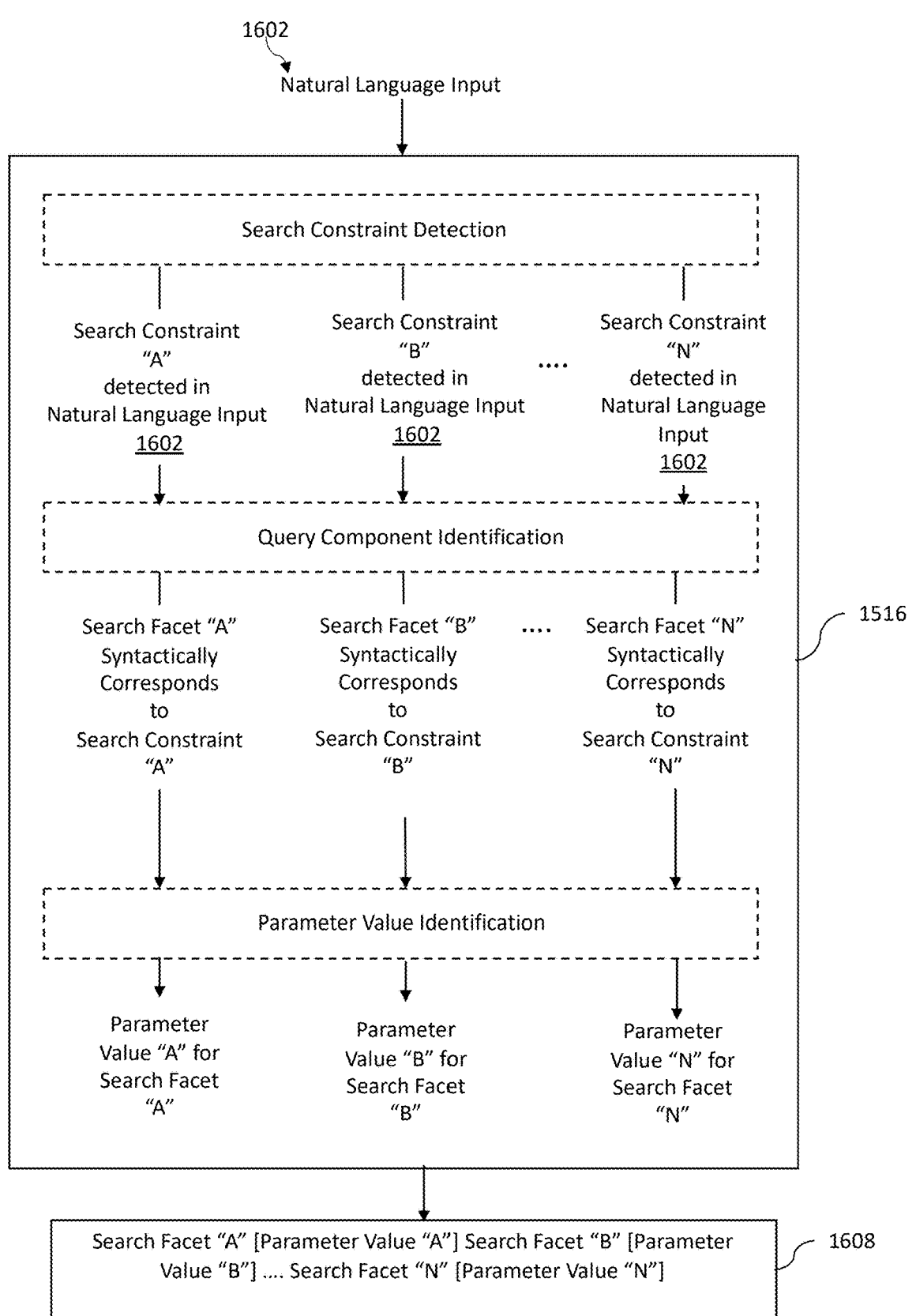
FIG. 24 illustrates an example of translating a natural language input to a computer-executable search query that includes one or more search facets and one or more corresponding search facet values for the one or more search facets, according to some embodiments of the present technology.

As illustrated in a non-limiting example of FIG. 24, the natural language-to-search query machine learning model 1516 may convert a natural language input 1602 into a structured computer-executable search query 1608 through a multi-stage process. In the process, first, the natural language input 1602 may be analyzed to identify a plurality of distinct search constraints that each represent specific retrieval conditions within the natural language input 1602. For example, the natural language-to-search query machine learning model 1516 may detect, within natural language input 1602, a first search constraint "A," a second search constraint "B," and additional search constraints up to a search constraint "N," each of which may correspond to a separate intent expressed in the original natural language input 1602.

Next, for each detected search constraint, the natural language-to-search query machine learning model 1516 may identify a corresponding search facet 1802 based on the syntactic and semantic structure of the constraint. In other words, each search constraint may be mapped or correspond to a predefined search facet that reflects how the underlying database query should represent that constraint. For example, search constraint "A" may be associated with or correspond to search facet "A," search constraint "B" may be associated with or correspond to search facet "B," and search constraint "N" may be associated with or correspond to search facet "N." After translating the search constraints to their respective search facets 1802, the natural language-to-search query machine learning model 1516 may determine the parameter values for each search facet 1802 based on the explicit or implicit values specified in the natural language input 1602. For instance, the parameter value "A" may correspond to search facet "A," the parameter value "B" may correspond to search facet "B," and similarly, parameter value "N" may correspond to search facet "N."

Finally, the natural language-to-search query machine learning model 1516 may construct the structured, computer-executable search query 1608 by concatenating the detected search facets 1802 with their corresponding parameter values in a normalized syntax. For example, the generated query may be represented as: Search Facet "A" [Parameter Value "A" ] Search Facet "B" [Parameter Value "B" ] . . . Search Facet "N" [Parameter Value "N" ]. In one non-limiting example, a natural language input may be created as "Find all datasets named budget created after January 2023 with more than 1,000 rows and not archived." In this example, the phrase "named budget" may correspond to a text-based search syntax component "Name: budget", the phrase "created after January 2023" may correspond to a date-related search syntax component "Created Date: >2023-01-01", the phrase "with more than 1,000 rows" may correspond to a numerical-based search syntax component "RowCount: >1000", and the phrase "not archived" may correspond to a symbolic-based search syntax component "Status: !=archived". Together, these four distinct search constraints may be translated by the natural language-to-search query machine learning model 1516 to form a single computer-executable search query 1608 "Name: budget CreatedDate: >2023-01-01 RowCount: >1000 Status: !=archived." This computer-executable search query 1608 may accurately represent the multi-constraint user request.

In other words, such trained natural language-to-search query machine learning model 1516 may be configured to translate complex, multi-condition natural language queries into structured search commands, enabling precise and efficient retrieval of data assets that match all of the detected constraints.

Figure 22B:
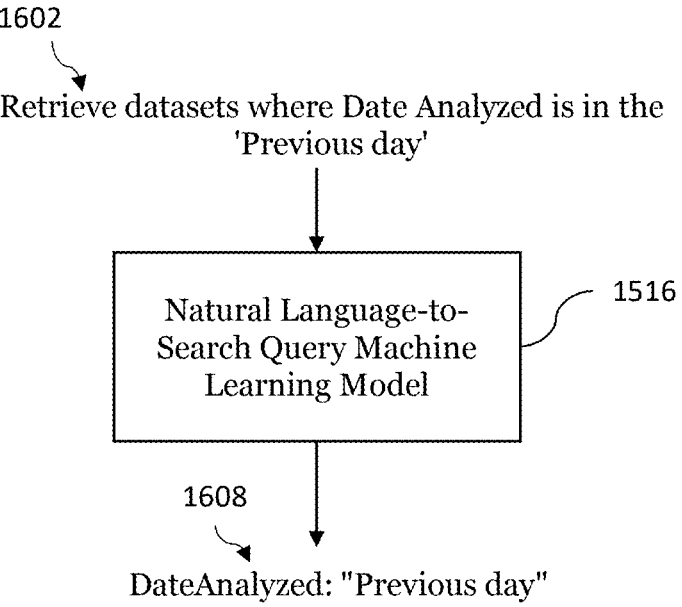
Figure 22C:
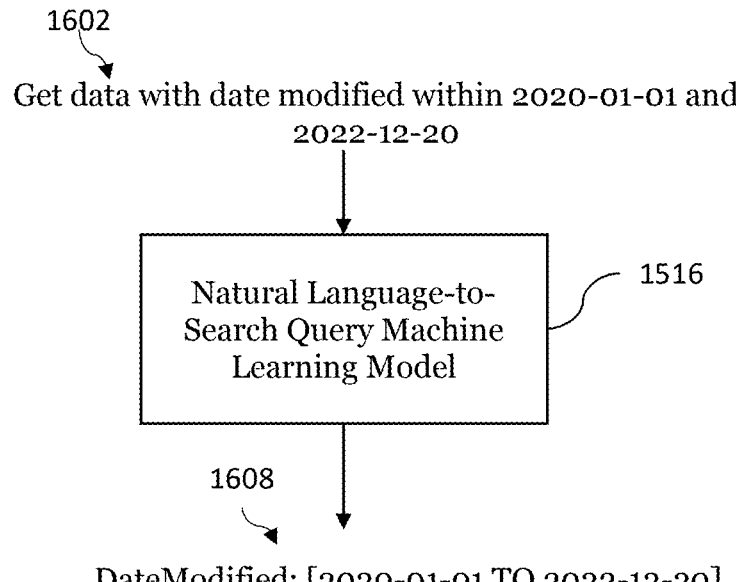
Figure 22D:
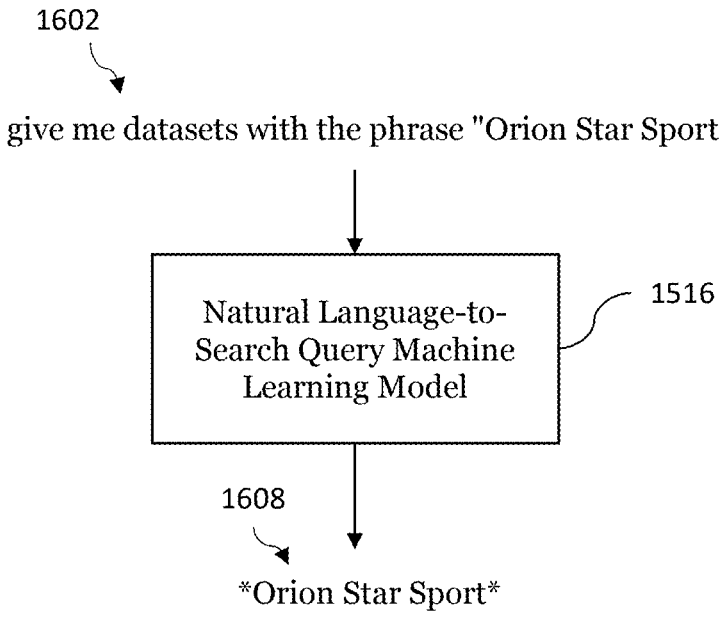
Figure 22E:
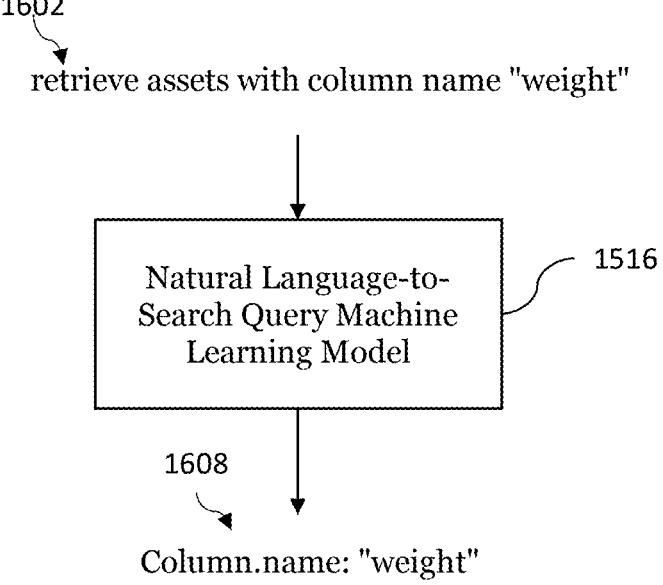
Figure 22F:
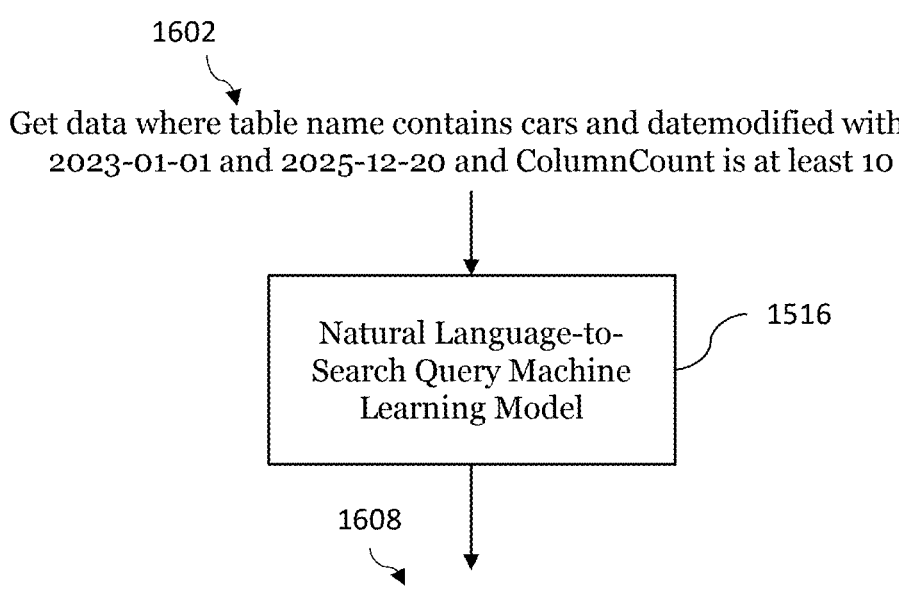

As further illustrated in a non-limiting example of FIG. 22F, the natural language input 1602 may include a compound query such as "Get data where table name contains cars and datemodified within 2023-01-01 and 2025-12-20 and ColumnCount is at least 10." For such a natural language input 1602, the natural language-to-search query machine learning model 1516 may identify three distinct search facets: "Name," "DateModified," and "Column-Count." The natural language-to-search query machine learning model 1516 may further map "cars" as the parameter value for the "Name" facet, interpret the date range "2023-01-01 TO 2025-12-20" for the "DateModified" facet, and extract ">=10" as the parameter value for the "Column-Count" facet. The resulting computer-executable search query 1608 may therefore include the combined mapped facets and parameter values in the form "Name: cars Date-Modified: [2023-01-01 TO 2025-12-20] ColumnCount: >=10." In response to the natural language-to-search query machine learning model 1516 creating the computer-executable search query 1608, process 1450B may further include executing the computer-executable search query 1608 to obtain all data assets of a plurality of distinct data assets that satisfies the search condition specified by the computer-executable search query 1608. In this example, executing the computer-executable search query 1608 may enable retrieval of datasets where the table name contains "cars," the last modified date falls within the specified range, and the total number of columns is at least ten.

In another implementation, the natural language input 1602 may be in unstructured form containing both alphabetic and numeric components. The transformation of such natural language input 1602 into the computer-executable search query 1608 using the natural language-to-search query machine learning model 1516 may involve analyzing the string of unstructured text included in the received natural language input 1602 and detecting a string of alphabetic characters that syntactically corresponds to a query component included in one of the one or more sets of query components 1506. The query component may represent a structural element of the target data query language, such as a metadata attribute, search facet, or function name.

After detecting the relevant query component, the natural language-to-search query machine learning model 1516 may identify a string of numeric characters within the same natural language input 1602 and convert the string of numeric characters into a parameter value that conforms to the syntax format required by the identified query component. In cases where the string of numeric characters as originally provided in the unstructured natural language input 1602 does not conform to the required syntax of the target query language, the natural language-to-search query machine learning model 1516 may automatically reformat the string of numeric characters into a compatible representation. This conversion ensures that the resulting computer-executable search query 1608 adheres to the rules of the target query language while incorporating the appropriate semantic meaning from the user request.

For example, if the natural language input 1602 includes "Find products priced above 5 k," the natural language-to-search query machine learning model 1516 may detect "products priced above" as a mapping to a query component corresponding to the "Price" attribute from one of the sets of query components 1506. The natural language-to-search query machine learning model 1516 may then identify "5 k" as the numeric string, which does not conform to the syntax format required by the target query language. The natural language-to-search query machine learning model 1516 may convert the term "5 k" into the appropriate parameter value "5000" in a format compatible with the query component. The resulting computer-executable search query therefore includes the query component "Price" and the transformed parameter value "5000," allowing the database to retrieve the relevant records.

This implementation enables the natural language-to-search query machine learning model 1516 to handle flexible and informal numeric expressions in unstructured text inputs, accurately mapping them to valid query syntax while maintaining alignment between the user's intended semantics and the strict structural requirements of the target data query language.

Figure 22G:
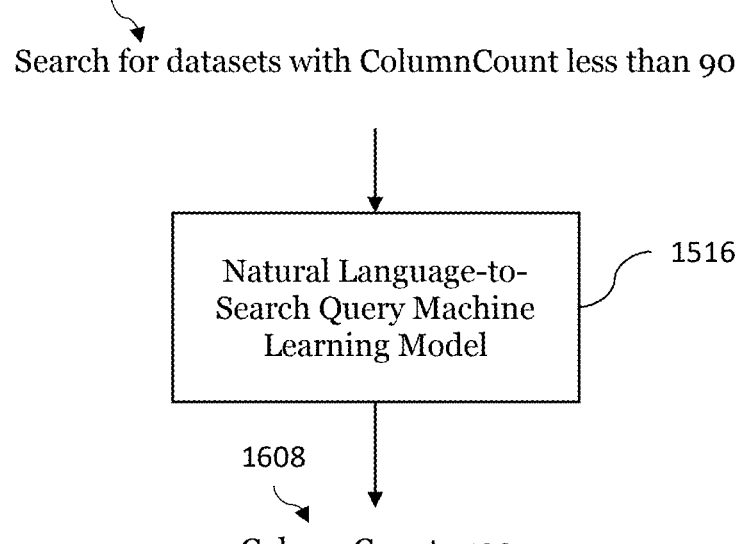

As illustrated in a non-limiting example of FIG. 22G, when the natural language input 1602 includes a query such as "Search for datasets with ColumnCount less than 90," the natural language-to-search query machine learning model 1516 may identify "ColumnCount" as the corresponding search facet from the one or more sets of query components 1506 and extract the parameter value "<90." The resulting computer-executable search query 1608 may therefore include the search facet ("ColumnCount:") and the parameter value ("<90"). In response to the natural language-to-search query machine learning model 1516 creating the computer-executable search query 1608, process 1450B may further include executing the computer-executable search query 1608 to obtain all data assets of a plurality of distinct data assets that satisfies the condition specified by the computer-executable search query 1608. In this example, execution of the computer-executable search query 1608 may enable retrieval of datasets where the number of columns is less than ninety.

In one alternate implementation, the natural language-to-search query machine learning model 1516 may further analyze the string of numeric characters contained in the natural language input 1602 and translate the string of numeric characters into a range of parameter values expressed in a syntax format compatible with the identified query component. When the original string of numeric characters provided in the natural language input does not conform to the syntax required by the query language, the natural language-to-search query machine learning model 1516 may reformat the range of parameter values to align with the system-defined representation. The generated computer-executable search query 1608 may therefore include both the query component and the derived range of parameter values, enabling execution in the syntax of the target data query language.

For example, when a user submits a natural language input 1602 such as "Show transactions between 5 k and 15 k," the natural language-to-search query machine 160 of 175 learning model 1516 may detect "transactions" as mapping to a query component corresponding to a target metadata attribute (e.g., "TransactionAmount") within the sets of query components 1506. The numeric string "5 k and 15 k,"

however, may not be in a format natively supported by the target query language. The natural language-to-search query machine learning model 1516 may interpret the intended parameter value range, e.g., "5 k" into "5000" and "15 k" into "15000," and represent the result in a syntax compliant with the query component (e.g., "TransactionAmount BETWEEN 5000 AND 15000"). By incorporating the compatible range of parameter values alongside the detected query component, the computer-executable search query 1608 precisely captures the intent of the user while maintaining strict adherence to the query syntax rules of the target data query language.

As illustrated in a non-limiting example of FIG. 22C, when the natural language input 1602 includes a query such as "Get data with date modified within 2020-01-01 and 2022-12-20," the natural language-to-search query machine learning model 1516 may detect "DateModified" as the corresponding search facet from the one or more sets of query components 1506 and extract the parameter value range "[2020-01-01 TO 2022-12-20]." The resulting computer-executable search query 1608 may therefore include the corresponding search facet ("DateModified:") and the parameter value range ("[2020-01-01 TO 2022-12-20]"). In response to the natural language-to-search query machine learning model 1516 creating the computer-executable search query 1608, process 1450B may further include executing the computer-executable search query 1608 to obtain all data assets of a plurality of distinct data assets that satisfies the search condition specified by the computer-executable search query 1608. In this example, executing the computer-executable search query 1608 may enable retrieval of datasets with a date modified within the specified time interval.

In another implementation, the natural language-to-search query machine learning model 1516 may transform a natural language input 1602 that corresponds to multiple query components. In this implementation, the natural language-to-search query machine learning model 1516 may process one or more strings of the unstructured text and identify that the natural language input 1602 may correspond to a plurality of query components included within the one or more sets of query components 1506. The natural language-to-search query machine learning model 1516 may then determine a respective parameter value for each identified query component based on a contextual assessment of the entire natural language input. This contextual assessment may include interpreting multiple constraints and relationships expressed across different parts of the natural language input 1602. The resulting computer-executable search query 1608 may therefore incorporate all detected query components and their respective parameter values, enabling the natural language-to-search query machine learning model 1516 to produce compound search instructions that capture more complex retrieval requirements.

For example, when a user provides a natural language input 1602 such as "Show employee records where department equals 'Finance' and remuneration is above 10,000," the natural language-to-search query machine learning model 1516 may identify two distinct query components, i.e., one corresponding to a text-based search facet such as "Department" and another corresponding to a numeric-based search facet such as "Remuneration". The natural language-to-search query machine learning model 1516 may extract respective parameter values ("Finance" and >10000) and encode both components into a unified computer-executable search query 1608. This allows the natural language-to-search query machine learning model 1516 to simultaneously detect, parse, and encode multiple query components and their associated parameter values into a consolidated, syntax-compliant search structure for the target data query language.

In another implementation, the natural language-to-search query machine learning model 1516 may process one or more strings of unstructured text included in the natural language input 1602 to identify that the natural language input syntactically corresponds to a subject query component included in the one or more sets of query components 1506. Once the subject query component is determined, the natural language-to-search query machine learning model 1516 may generate a respective parameter value for the identified query component by evaluating the semantic and syntactic context of the provided unstructured natural language input 1602. The resulting computer-executable search query may therefore incorporate the subject query component along with the generated parameter value, allowing the system to produce a structured and syntax-compliant computer-executable search query aligned with the requirements of the target data query language.

As illustrated in a non-limiting example of FIG. 22B, when the natural language input 1602 includes a query such as "Retrieve datasets where Date Analyzed is in the 'Previous day'," the natural language-to-search query machine learning model 1516 may process the natural language input 1602 to detect the subject query component as "DateAnalyzed" and identify the parameter value "Previous day." The natural language-to-search query machine learning model 1516 may generate a structured computer-executable search query 1608 that includes the search facet "DateAnalyzed:" and the parameter value "Previous day." In response to the natural language-to-search query machine learning model 1516 creating the computer-executable search query 1608, process 1450B may further include executing the computer-executable search query 1608 to obtain all data assets of a plurality of distinct data assets that satisfies the search condition specified by the computer-executable search query 1608. In this example, executing the computer-executable search query 1608 may enable retrieval of data assets where the analyzed date corresponds to the previous day.

In another non-limiting example of FIG. 22D, a natural language input 1602 may include "give me datasets with the text string 'Orion Star Sport'". The natural language-to-search query machine learning model 1516 may interpret the natural language input 1602 and detect that the text string "Orion Star Sport" corresponds to a subject query component defined within the data query schema 1502. Based on this detection, the natural language-to-search query machine learning model 1516 may map the extracted text string directly into a parameter value representation that matches the expected search syntax for the target data query language. In this example, the resulting computer-executable search query 1608 uses the syntax: "Orion Star Sport." This may indicate that the natural language-to-search query machine learning model 1516 has classified the detected text string as a text-based parameter value associated with a subject query component, created the search query in a format compliant with the data query schema 1502, and/or returned the computer-executable search query 1608.

As illustrated in another non-limiting example of FIG. 22E, when the natural language input 1602 includes a query such as "retrieve assets with column name 'weight'," the natural language-to-search query machine learning model 1516 may process the natural language input 1602 to detect the subject query component as "Column.name" and identify the parameter value "weight." The natural language-tosearch query machine learning model 1516 may generate a structured computer-executable search query 1608 that includes the search facet "Column.name:" and the parameter value "weight." In response to the natural language-to-search query machine learning model 1516 creating the computer-executable search query 1608, process 1450B may further include executing the computer-executable search query 1608 to obtain all data assets of a plurality of distinct data assets that satisfies the search condition defined within the computer-executable search query 1608 generated by natural language-to-search query machine learning model 1516. In this example, executing the computer-executable search query 1608 may enable retrieval of data assets that include a column with the name "weight."

In some implementations, when the one or more sets of query components 1506 include symbolic search syntax components, and the natural language input includes one or more alphabetic text strings that textually express a symbolic search operator, the natural language-to-search query machine learning model 1516 may generate the parameter value for the subject query component by converting the textual expression of the symbolic search operator to one or more corresponding symbolic search syntax components.

For example, when a user provides a query such as "Show employees where remuneration is greater than 5000," the alphabetic expression "greater than" may be detected within the unstructured text. The natural language-to-search query machine learning model 1516 may convert the alphabetic expression into the corresponding symbolic operator ">" from the symbolic search syntax components and generate the parameter value (5000) based on the associated context. The resulting computer-executable search query may therefore include the subject query component (e.g., Remuneration), the symbolic search syntax operator (>), and the parameter value (5000) into a structure compatible with the syntax rules of the target query language.

The process 1450B may provide a schema-aware and context-sensitive transformation of natural language inputs 1602 into structured, computer-executable search queries 1608 that strictly conform to the syntax and encoding rules of the target data query language. By leveraging trained weights derived from natural language-to-search query training data samples 1510 and transformer-based contextual embeddings from the machine learning text-to-text transformer model 1514, the natural language-to-search query machine learning model 1516 may dynamically interpret synonyms, shorthand expressions, multilingual inputs, and incomplete or noisy statements without requiring predefined templates. Furthermore, using the process 1450B, the system may handle multi-constraint and multi-modal queries by independently detecting, parsing, and encoding text-based, numeric-based, and date-based search facets, combining them into normalized query structures that enforce operator precedence and logical relationships. These capabilities may collectively enable precise, deterministic, and efficient retrieval of targeted datasets across complex enterprise environments, reducing query failures, improving accuracy, and supporting diverse input variations while maintaining strict structural compliance with the target query language.

Retrieving at Least One Data Asset that Satisfies the Subject Data Asset Retrieval Request in Response to Executing the Computer-Executable Search Query In one or more implementations, method 1400 may include subprocess 1450C. Subprocess 1450C, which may include retrieving at least one data asset that satisfies a subject data asset retrieval request in response to executing a computer-executable search query 1608, may function to perform execution of the structured computer-executable search query 1608 across one or more data repositories to identify and return matching data assets using one or more search facets and corresponding parameter values included in the structured computer-executable search query 1608.

In one embodiment, subprocess 1450C may include automatically routing the natural language input 1602 to the natural language-to-search query machine learning model 1516. The natural language-to-search query machine learning model 1516 may process the natural language input 1602 and generate a corresponding computer-executable search query 1608 that conforms to the syntax of the target data query language. In an implementation, the generated computer-executable search query 1608 may be executed against a target data repository, catalog, or storage system that is accessible to a requesting client device or application interface. The execution of the computer-executable search query 1608 may operate to identify one or more data assets from a plurality of distinct data assets. Each identified data asset may correspond to entities, attributes, temporal properties, or metadata fields that satisfy the data asset retrieval request specified by the natural language input 1602. The retrieval of the one or more data assets may therefore include resolution of the computer-executable search query 1608, wherein the natural language input 1602 may be automatically translated into the computer-executable search query 1608 by the natural language-to-search query machine learning model 1516, and then executed to produce results (e.g., obtain datasets) that satisfy the data asset retrieval request.

The natural language-to-search query machine learning model 1516 may be configured to translate linguistic structures, lexical tokens, and/or semantic intent expressed in the natural language input 1602 to query components extracted from the data query schema 1502. Through training on natural language-to-search query training data samples 1510, which pair synthetically generated human-readable natural language queries with corresponding synthetically generated computer-executable search queries, the natural language-to-search query machine learning model 1516 may learn to identify search constraints in the natural language input 1602, and align the search constraints with text-based, numerical-based, date-related, or symbolic-based search syntax components from a target schema (e.g., the data query schema 1502). As a result, the computer-executable search query 1608 generated by the natural language-to-search query machine learning model 1516 may accurately represent the subject data asset retrieval request specified by the natural language input 1602.

Figure 16:
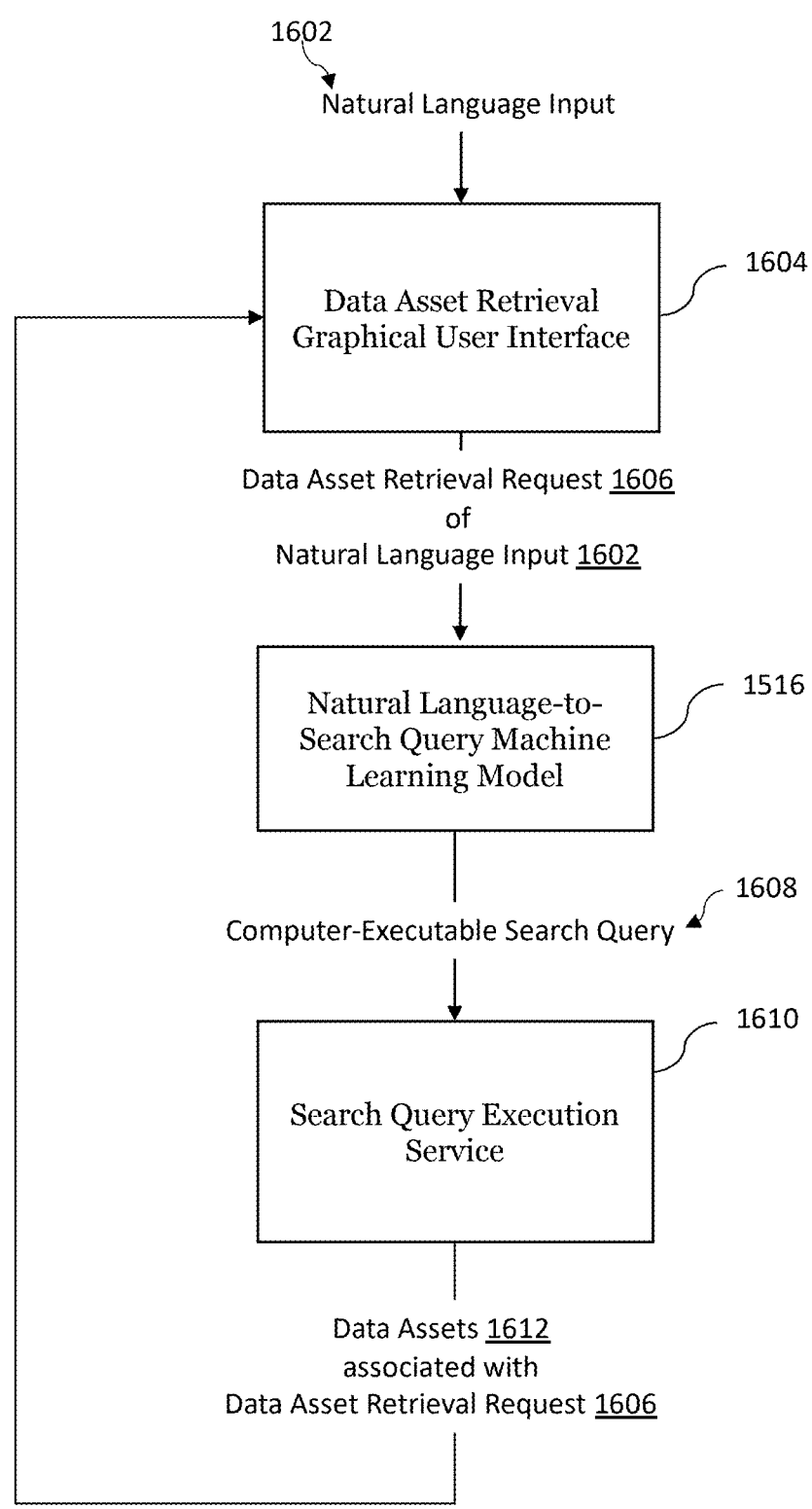
FIG. 16 illustrates an example schematic of executing a computer-executable search query to retrieve data assets that satisfies the computer-executable search query, according to some embodiments of the present technology.

As illustrated in one non-limiting example of FIG. 16, the natural language input 1602 may be received at a data asset retrieval graphical user interface 1604. A graphical user interface, as described herein, may refer to a user interface that enables user interaction through graphical user interface elements. The data asset retrieval graphical user interface 1604 may detect the natural language input 1602 as a data asset retrieval request 1606, which may specify a user intent to identify one or more data assets. The data asset retrieval request 1606 of the natural language input 1602 may then be automatically routed to the natural language-to-search query machine learning model 1516. The natural language-to-search query machine learning model 1516 may assess the linguistic content of the natural language input 1602, detect associated search constraints, and generate the corresponding computer-executable search query 1608. The computer-executable search query 1608 may be in the search syntax of the target query language.

The generated computer-executable search query 1608 may then be provided to a search query execution service 1610. In one or more embodiments, the search query execution service 1610 may be instantiated as a software-implemented service layer that resides within the system architecture for data asset retrieval. The search query execution service 1610 may expose an execution interface for receiving a computer-executable search query 1608 and returning a structured output comprising data assets 1612. The search query execution service 1610 may be distinct from the natural language-to-search query machine learning model 1516, such that the generation of the computer-executable search query 1608 and the execution of the query occur in separate system layers.

In certain implementations, the search query execution service 1610 may be integrated into a backend portion of the data asset retrieval graphical user interface 1604, such that the user interaction layer is logically decoupled from the query execution layer. In other implementations, the search query execution service 1610 may be instantiated as a stateless service process that scales across multiple nodes of a distributed infrastructure. In each case, the search query execution service 1610 may represent the defined execution module within the overall retrieval system that receives a structured query representation and returns the corresponding data assets 1612 to the graphical user interface 1604 for presentation to the requesting client device or application interface.

Figure 20:
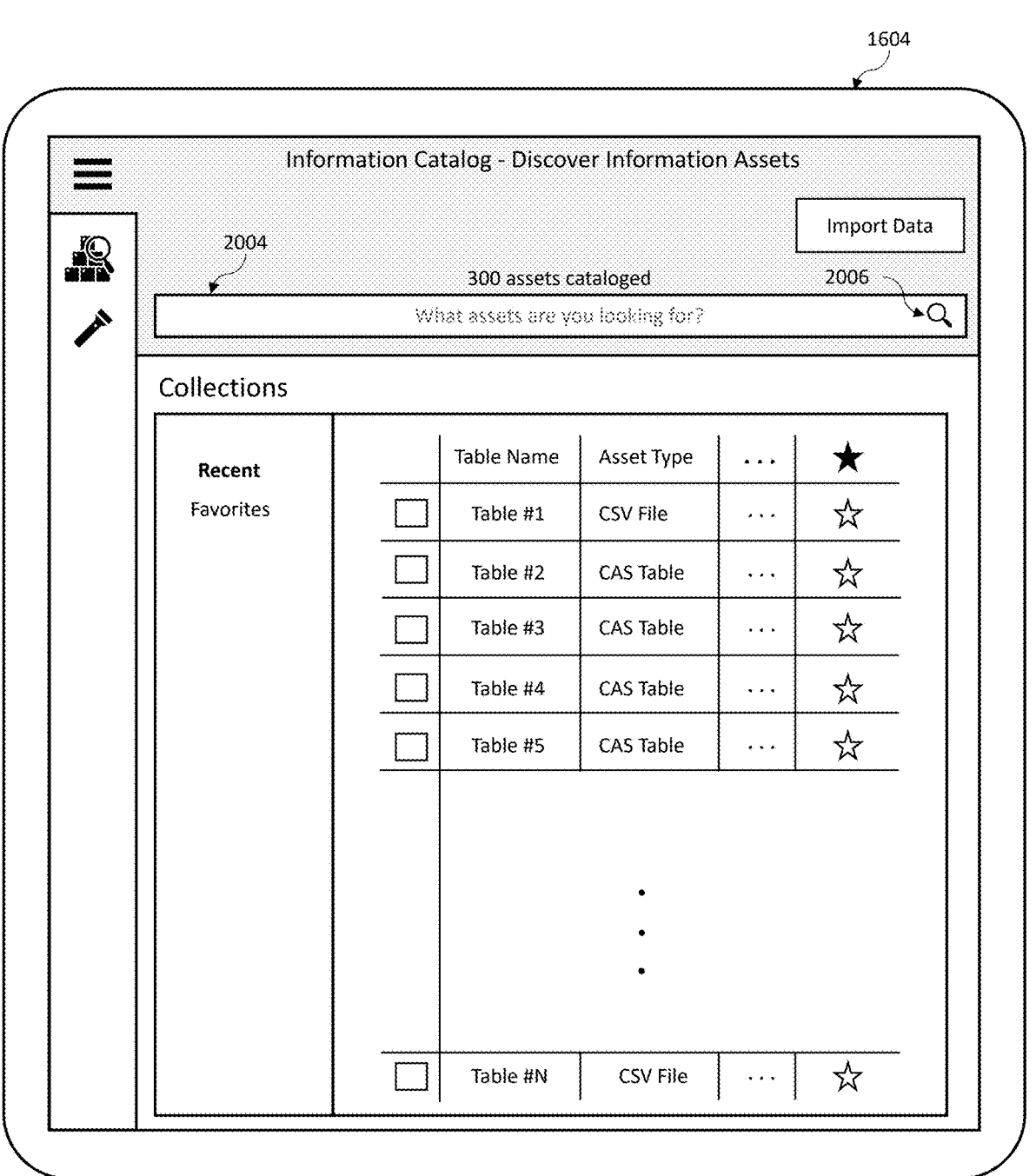
FIGS. 20 and 21 illustrate an example data asset retrieval graphical user interface, according to some embodiments of the present technology.

In one non-limiting example shown in FIG. 20, the data asset retrieval graphical user interface 1604 may include an asset retrieval search bar 2004 that enables a user to provide a natural language input 1602. As shown in the example, the natural language input 1602 may include "show me all CAS tables updated yesterday" or "retrieve all CSV files containing sales data." Upon detecting a user input selecting a search initiation element 2006, the natural language input 1602 may be automatically routed to the natural language-to-search query machine learning model 1516, that may generate the corresponding computer-executable search query 1608, which when executed, produces retrieval results that are displayed by the data asset retrieval graphical user interface 1604, as described in the foregoing.

In one or more implementations, the data asset retrieval graphical user interface 1604 may display the retrieved data assets 1612 in a structured manner. As shown in one non-limiting example of FIG. 20, the data assets 1612 may be organized into a collections view where each entry may correspond to a table or file within the catalog. The data assets 1612 may include names, asset types (e.g., CSV files, CAS tables), and user-selectable interaction elements such as favorites or filters. In some implementations, metadata including cataloged date, ownership details, and status indicators may also be presented, enabling users to efficiently evaluate and interact with the retrieved data assets 1612.

Figure 21:
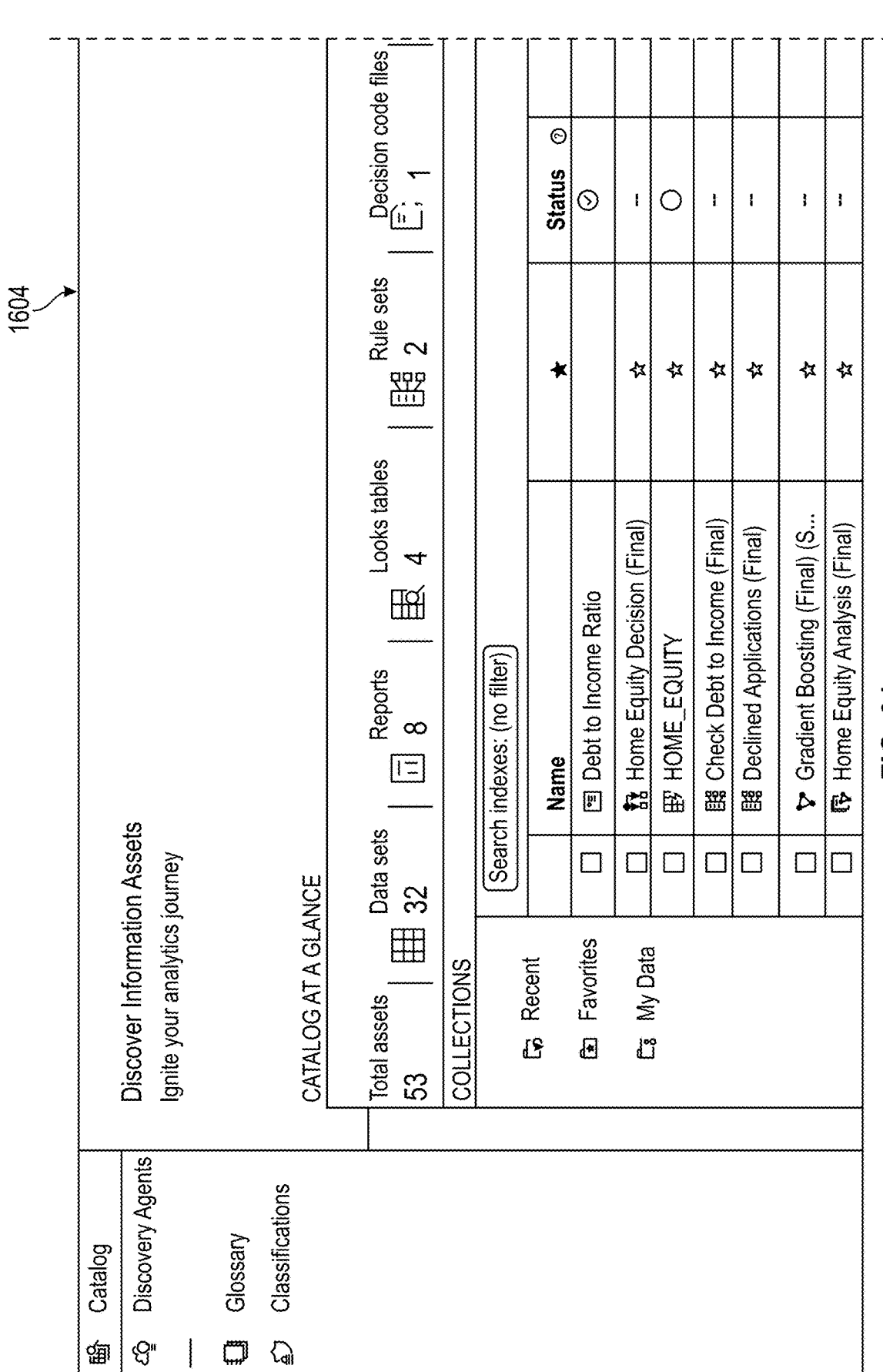
Figure 21:
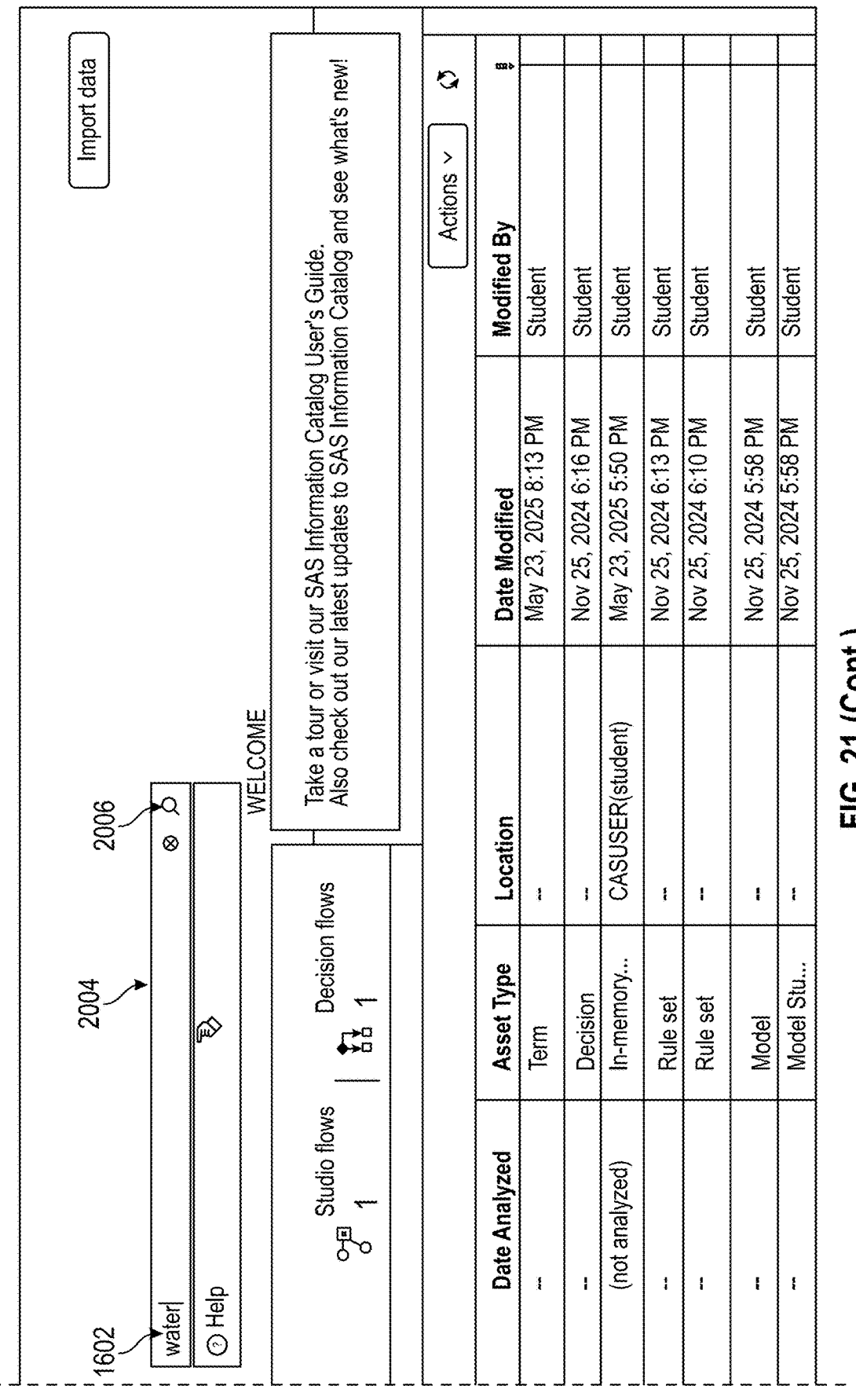

As further illustrated in one non-limiting example of FIG. 21, the data asset retrieval graphical user interface 1604 may be instantiated to receive the natural language input 1602 specifying a subject data asset retrieval request, such as a query "water." In response to the user selecting the search initiation element 2006, the natural language input 1602 may be automatically processed by the natural language-to-search query machine learning model 1516, which generates the corresponding computer-executable search query 1608 in the backend. The computer-executable query 1608 may then be executed to retrieve one or more data assets 1612, and the graphical user interface 1604 may display the data assets 1612. In one or more embodiments, the present application may provide a Generative AI Fine-tuning for Natural Language to Custom Query Translation (NL-CQT) that enables accurate, domain-aware translation of natural language inputs into structured, executable query syntaxes defined by a target query language.

At least one technical advantage of configuring and using the natural language-to-search query machine learning model 1516 according to the one or more embodiments described herein is illustrated in Table 1. Specifically, an evaluation test was conducted to measure the accuracy and structural consistency of generated computer-executable search queries across three distinct approaches: the disclosed method and retrieval-augmented generation (RAG) based methods implemented using Generative Pre-Trained Transformer (GPT) models such as GPT-4.0 and GPT-3.5-turbo. Each distinct row of Table 1 corresponds to a representative natural language query specifying a subject data asset retrieval request, and the table illustrates the corresponding structured outputs produced by each approach.

TABLE 1

| Natural Language Query | Response from disclosed method | Response from RAG on GPT-40 | Response from RAG on GPT-35-turbo |
|---|---|---|---|
| Find datasets where table name contains cars | Name: "cars" | "Name: *cars*" | Table.name: *cars* |
| Retrieve all the datasets with MSRP as column name | Name: * Column.name: "MSRP" | Name: * Column.name: MSRP | Column.name: MSRP |
| Get data with date modified within Jan. 6, 2021 and Dec. 20, 2022 | DateModified: [Jan. 6, 2021 TO Dec. 20, 2022] | DateModified: \"Jan. 6, 2021\" AND DateModified: \"Dec. 20, 2022\" | DateModified: [Jan. 6, 2021 TO Dec. 20, 2022] |
| List reports with Count Step > 8 | StepCount: >8 | Report.countSteps > 8 | Object Type: Report Table.Column.Name: Count Step Op: >Value: 8 |
| Retrieve files where Semantic Type of Column containing the word 'phone' | Column.semantic Type: "*phone*" | Column.semantic Type: *phone* | +SemanticTypes. name: \"*phone*\" ObjectType: File |

The results show that the disclosed method consistently produces schema-aligned search queries that are syntactically valid, concise, and directly executable in the target query language. By contrast, the RAG methods using GPT-4.0 and GPT-3.5-turbo may frequently generate responses containing redundant tokens, inconsistent field mappings, or extraneous descriptors that reduce reliability and increase the likelihood of execution errors. For example, for the query "List reports with Count Step >8," the disclosed method produces the correct search query "StepCount: >8," while GPT-4.0 introduces unnecessary object scoping, and GPT-3.5-turbo may generate verbose and fragmented outputs. Similarly, for the query "Retrieve files where Semantic Type of Column containing the word 'phone'," the disclosed method may accurately represent the search constraint as "Column.semanticType: 'phone'," whereas GPT-based RAG methods add extraneous object type indicators or inconsistent formatting. Collectively, the results in Table 1 demonstrate that the integration of the natural language-to-search query machine learning model 1516 may provide superior accuracy, reduced ambiguity, and improved alignment with schema-defined query components when compared to traditional RAG-based systems. Further, table 2 illustrates a comparative accuracy evaluation between the disclosed method and baseline RAG approaches using GPT-4.0 and GPT-3.5-turbo. As shown, the disclosed method achieves an accuracy of 91.67%, significantly outperforming GPT-4.0 at 66.67% and GPT-3.5-turbo at 41.67%. These results demonstrate that the disclosed method more reliably translates natural language inputs into schema-aligned, executable search queries, thereby reducing errors and improving overall system performance over traditional RAG-based systems.

TABLE 2

| Response from disclosed method | Response from RAG on GPT-40 | Response from RAG on GPT-35-turbo |
|---|---|---|
| 91.67 | 66.67 | 41.67 |

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein in real-time or near real-time, asynchronously (e.g., sequentially), concurrently (e.g., in parallel), or in any other suitable order by and/or using one or more instances of the systems, elements, and/or entities described herein. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the application without departing from the scope of the various described embodiments.

What is claimed is:

1. A computer-program product comprising a non-transitory machine-readable storage medium storing computer instructions that, when executed by one or more processors, perform operations comprising:

obtaining a data query schema that provides instructions for constructing computer-executable search queries according to a search syntax permitted by a target data query language;

extracting, from the data query schema, one or more sets of query components that define the search syntax of the target data query language, wherein the one or more sets of query components include:

a first set of query components comprising text-based search syntax components permitted by the target data query language, a second set of query components comprising numerical-based search syntax components permitted by the target data query language, and a third set of query components comprising date-related search syntax components permitted by the target data query language;

synthetically generating a plurality of natural language-to-search query training data samples based at least in part on the one or more sets of query components, wherein each of the plurality of natural language-to-search query training data samples includes:

a synthetically generated natural language query specifying a data asset retrieval request, and a synthetically generated search query that represents the data asset retrieval request in the search syntax of the target data query language;

configuring a natural language-to-search query machine learning model based on training a machine learning text-to-text transformer model using the plurality of natural language-to-search query training data samples; and after configuring the natural language-to-search query machine learning model: receiving a natural language input specifying a subject data asset retrieval request;

transforming, using the natural language-to-search query machine learning model, the natural language input to a computer-executable search query encoded in the search syntax of the target data query language; and retrieving at least one data asset that satisfies the subject data asset retrieval request in response to executing the computer-executable search query.

2. The computer-program product according to claim 1, wherein synthetically generating the plurality of natural language-to-search query training data samples includes:

synthetically generating a plurality of erroneous natural language-to-search query training data samples, wherein each of the plurality of erroneous natural language-to-search query training data samples includes:

an erroneous natural language query specifying a respective erroneous data asset retrieval request, and a corresponding search query that correctly represents the erroneous natural language query in the search syntax of the target data query language.

3. The computer-program product according to claim 2, wherein the erroneous natural language query of each of the plurality of erroneous natural language-to-search query training data samples includes at least one of:

a grammatical error in the respective erroneous data asset retrieval request, a punctuation error in the respective erroneous data asset retrieval request, a spelling error in the respective erroneous data asset retrieval request, a typographical error in the respective erroneous data asset retrieval request, and a language translation error in the respective erroneous data asset retrieval request.

4. The computer-program product according to claim 1, wherein the plurality of natural language-to-search query training data samples include:

a first plurality of natural language-to-search query training data samples associated with a first distinct human language, wherein each distinct training data sample of the first plurality of natural language-to-search query training data samples includes:

a computer-generated natural language query specifying a data asset retrieval request textually represented in the first distinct human language, and a computer-generated search query that represents the computer-generated natural language query in the search syntax of the target data query language, a second plurality of natural language-to-search query training data samples associated with a second distinct human language, wherein each distinct training data sample of the second plurality of natural language-to-search query training data samples includes:

a machine-generated natural language query specifying a data asset retrieval request textually represented in the second distinct human language, and a machine-generated search query that represents the machine-generated natural language query in the search syntax of the target data query language, and a third plurality of natural language-to-search query training data samples associated with a third distinct human language, wherein each distinct training data sample of the third plurality of natural language-to-search query training data samples includes:

a system-generated natural language query specifying a data asset retrieval request textually represented in the third distinct human language, and a system-generated search query that represents the system-generated natural language query in the search syntax of the target data query language.

5. The computer-program product according to claim 4, wherein the computer instructions, when executed by the one or more processors, perform operations further comprising:

in response to receiving the natural language input specifying the subject data asset retrieval request:

automatically transforming the natural language input to the computer-executable search query using the natural language-to-search query machine learning model when the natural language input is textually expressed in one of the first distinct human language, the second distinct human language, and the third distinct human language.

6. The computer-program product according to claim 1, wherein:

the natural language-to-search query machine learning model is trained to handle natural language expressions expressed in any one of a plurality of distinct human languages, and the natural language input is transformed into the computer-executable search query using the natural language-to-search query machine learning model when the natural language input is expressed in at least one of the plurality of distinct human languages.

7. The computer-program product according to claim 1, wherein the computer instructions, when executed by the one or more processors, perform operations further comprising:

instantiating a data asset retrieval graphical user interface that includes an asset retrieval search bar;

receiving, at the asset retrieval search bar of the data asset retrieval graphical user interface, the natural language input specifying the subject data asset retrieval request;

commencing the execution of the computer-executable search query in response to detecting a user input selecting a search initiation element displayed within the asset retrieval search bar; and displaying, by the data asset retrieval graphical user interface, the at least one data asset that satisfies the subject data asset retrieval request in response to executing the computer-executable search query.

8. The computer-program product according to claim 1, wherein:

transforming the natural language input to the computer-executable search query includes:

detecting, using the natural language-to-search query machine learning model, at least one search constraint included in the natural language input;

determining, using the natural language-to-search query machine learning model, the at least one search constraint syntactically corresponds to a search facet included in one of the one or more sets of query components; and extracting, from the natural language input using the natural language-to-search query machine learning model, a parameter value for the search facet, wherein the computer-executable search query includes the search facet and the parameter value.

9. The computer-program product according to claim 8, wherein:

the search facet corresponds to a query syntax element associated with a target metadata attribute, the parameter value specifies a required value or a range of values for the target metadata attribute, and the at least one data asset is retrieved from a computer database storing a plurality of datasets based on the at least one data asset satisfying a search condition defined by a combination of the search facet and the parameter value.

10. The computer-program product according to claim 1, wherein:

the natural language input specifying the subject data asset retrieval request corresponds to a multi-constraint search request provided in unstructured text, and transforming the natural language input to the computer-executable search query includes:

detecting, by the natural language-to-search query machine learning model, the multi-constraint search request includes a first search constraint, a second search constraint, and a third search constraint;

determining, by the natural language-to-search query machine learning model, (a) the first search constraint of the multi-constraint search request is syntactically translatable to a text-based search facet included in the first set of query components, (b) the second search constraint of the multi-constraint search request is syntactically translatable to a date-based search facet included in the third set of query components, and (c) the third search constraint of the multi-constraint search request is syntactically translatable to a numeric-based search facet included in the second set of query components; and determining, based on the natural language-to-search query machine learning model assessing the multi-constraint search request, (i) a text-based parameter value for the text-based search facet, (ii) a date-based parameter value for the date-based search facet, and (iii) a numeric-based parameter value for the numeric-based search facet.

11. The computer-program product according to claim 10, wherein the computer-executable search query includes:

the text-based search facet, the text-based parameter value, the date-based search facet, the date-based parameter value, the numeric-based search facet, and the numeric-based parameter value.

12. The computer-program product according to claim 1, wherein:

the natural language input specifying the subject data asset retrieval request includes a string of unstructured text, and transforming the natural language input to the computer-executable search query includes:

detecting, by the natural language-to-search query machine learning model, a string of alphabetic characters included in the string of unstructured text syntactically corresponds to a query component included in the one or more sets of query components, and converting, by the natural language-to-search query machine learning model, a string of numeric characters included in the string of unstructured text to a parameter value that is in a syntax format compatible with the query component, wherein:

the string of numeric characters does not conform to the syntax format compatible with the query component, and the computer-executable search query includes the query component and the parameter value.

13. The computer-program product according to claim 1, wherein:

the natural language input specifying the subject data asset retrieval request includes a string of text, and transforming the natural language input to the computer-executable search query includes:

determining, by the natural language-to-search query machine learning model, a set of alphabetic characters included in the string of text syntactically corresponds to a query component included in the one or more sets of query components, and translating, by the natural language-to-search query machine learning model, a set of numeric characters included in the string of text to a range of parameter values that is in a syntax format compatible with the query component, wherein:

the set string of numeric characters does not conform to the syntax format compatible with the query component, and the computer-executable search query includes the query component and the range of parameter values.

14. The computer-program product according to claim 1, wherein:

the natural language input specifying the subject data asset retrieval request includes one or more strings of unstructured text, and transforming the natural language input to the computer-executable search query includes:

determining, by the natural language-to-search query machine learning model, the one or more strings of unstructured text syntactically correspond to a plurality of query components included in the one or more sets of query components, and determining, by the natural language-to-search query machine learning model, a respective parameter value for each query component of the plurality of query components based on the natural language-to-search query machine learning model assessing the one or more strings of unstructured text, wherein:

the computer-executable search query includes the plurality of query components and the respective parameter value determined for each query component of the plurality of query components.

15. The computer-program product according to claim 1, wherein:
the natural language input specifying the subject data asset retrieval request includes one or more strings of unstructured text, and
transforming the natural language input to the computer-executable search query includes:
determining, by the natural language-to-search query machine learning model, the one or more strings of unstructured text syntactically corresponds to a subject query component included in the one or more sets of query components, and
generating, by the natural language-to-search query machine learning model, a respective parameter value for the subject query component based on the natural language-to-search query machine learning model assessing the one or more strings of unstructured text, wherein:
the computer-executable search query includes the subject query component and the respective parameter value generated for the subject query component.

16. The computer-program product according to claim 15, wherein:
the one or more sets of query components further include a fourth set of query components comprising symbolic search syntax components permitted by the target data query language,
the one or more strings of unstructured text of the natural language input specifying the subject data asset retrieval request include one or more alphabetic text strings textually expressing a symbolic search operator, and
the natural language-to-search query machine learning model generates the respective parameter value for the subject query component by converting the symbolic search operator textually expressed in one of the one or more alphabetic text strings to one or more corresponding symbolic search syntax components included in the fourth set of query components.

17. The computer-program product according to claim 1, wherein the computer instructions, when executed by the one or more processors, perform operations further comprising:
in response to receiving the natural language input specifying the subject data asset retrieval request:
automatically routing the natural language input to the natural language-to-search query machine learning model, wherein the natural language input is automatically transformed to the computer-executable search query in response to the natural language input being routed to the natural language-to-search query machine learning model.

18. The computer-program product according to claim 1, wherein synthetically generating the plurality of natural language-to-search query training data samples includes:
iteratively generating a new natural language-to-search query training data sample until a predetermined number of training data samples have been generated, wherein a respective iteration includes:
synthetically generating a new natural language query that includes a new data asset retrieval request using a predefined natural language query generation template; and
synthetically generating a new computer-executable search query that syntactically represents the new natural language query in the search syntax of the target data query language by inserting at least one query component of the one or more sets of query components and an associated parameter value for the at least one query component into a predefined search query generation template.

19. The computer-program product according to claim 1, wherein:
the one or more sets of query components further include a fourth set of query components comprising symbolic search syntax components permitted by the target data query language, and synthetically generating a respective natural language-to-search query training data sample of the plurality of natural language-to-search query training data samples includes:
randomly selecting a numeric value from a predetermined range of numeric values;
randomly selecting a symbolic-based search syntax component from the fourth set of query components;
randomly selecting a numerical-based search syntax component from the second set of query components;
generating a subject search query by inserting the numeric value, the symbolic-based search syntax component, and the numerical-based search syntax component into corresponding slots of a predefined search query generation template;
obtaining, from a predetermined set of symbolic search syntax component variants, a natural language variant that textually represents the symbolic-based search syntax component in alphabetic characters;
obtaining a textual representation of the numerical-based search syntax component that is in a lexical form different from the numerical-based search syntax component randomly selected from the second set of query components;
randomly selecting one or more command tokens from a predetermined set of command tokens;
randomly selecting one or more entity tokens from a predetermined set of entity tokens; and
generating a subject natural language query by inserting the one or more command tokens, the one or more entity tokens, the textual representation of the numerical-based search syntax component, the natural language variant that textually represents the symbolic-based search syntax component in alphabetic characters, and the numeric value into corresponding slots of a predefined natural language query generation template, wherein:
the synthetically generated natural language query of the respective natural language-to-search query training data sample corresponds to the subject natural language query, and the synthetically generated search query of the respective natural language-to-search query training data sample corresponds to the subject search query.

20. The computer-program product according to claim 1, wherein:
the one or more sets of query components further include a fourth set of query components comprising symbolic search syntax components permitted by the target data query language, and synthetically generating a respective natural language-to-search query training data sample of the plurality of natural language-to-search query training data samples includes:
randomly selecting a numeric value from a predetermined range of numeric values;

randomly selecting a symbolic-based search syntax component from the fourth set of query components;

randomly selecting a numerical-based search syntax component from the second set of query components;

generating a subject search query by inserting the numeric value, the symbolic-based search syntax component, and the numerical-based search syntax component into corresponding slots of a predefined search query generation template;

obtaining a textual representation of the numerical-based search syntax component that is in a lexical form different from the numerical-based search syntax component randomly selected from the second set of query components;

randomly selecting one or more command tokens from a predetermined set of command tokens;

randomly selecting one or more entity tokens from a predetermined set of entity tokens; and generating a subject natural language query by inserting the one or more command tokens, the one or more entity tokens, the textual representation of the numerical-based search syntax component, the symbolic-based search syntax component randomly selected from the fourth set of query components, and the numeric value into corresponding slots of a predefined natural language query generation template, wherein:

the synthetically generated natural language query of the respective natural language-to-search query training data sample corresponds to the subject natural language query, and the synthetically generated search query of the respective natural language-to-search query training data sample corresponds to the subject search query.

21. The computer-program product according to claim 1, wherein synthetically generating a respective natural language-to-search query training data sample of the plurality of natural language-to-search query training data samples includes:

randomly selecting a search facet from the one or more sets of query components;

obtaining a textual representation of the search facet that is in a lexical form different from the search facet randomly selected from the one or more sets of query components;

randomly selecting a contextual tag from a predetermined set of contextual tags;

randomly selecting one or more command tokens from a predetermined set of command tokens;

randomly selecting one or more entity tokens from a predetermined set of entity tokens;

generating a subject natural language query by inserting the one or more command tokens, the one or more entity tokens, the textual representation of the search facet, and the contextual tag into corresponding slots of a predefined natural language query generation template; and generating a subject search query by inserting the search facet and the contextual tag into corresponding slots of a predefined search query generation template, wherein:

the synthetically generated natural language query of the respective natural language-to-search query training data sample corresponds to the subject natural language query, and the synthetically generated search query of the respective natural language-to-search query training data sample corresponds to the subject search query.

22. The computer-program product according to claim 1, wherein synthetically generating a respective natural language-to-search query training data sample of the plurality of natural language-to-search query training data samples includes:

randomly selecting a search facet included in the one or more sets of query components;

obtaining a textual representation of the search facet that is in a lexical form different from the search facet randomly selected from the one or more sets of query components;

randomly selecting a term from a predetermined set of terms;

randomly selecting one or more command tokens from a predetermined set of command tokens;

randomly selecting one or more entity tokens from a predetermined set of entity tokens;

generating a subject natural language query by inserting the one or more command tokens, the one or more entity tokens, the textual representation of the search facet, and the term into corresponding slots of a predefined natural language query generation template; and generating a subject search query by inserting the search facet and the term into corresponding slots of a predefined search query generation template, wherein:

the synthetically generated natural language query of the respective natural language-to-search query training data sample corresponds to the subject natural language query, and the synthetically generated search query of the respective natural language-to-search query training data sample corresponds to the subject search query.

23. A computer-implemented method comprising:

obtaining a data query schema that provides instructions for constructing computer-executable search queries according to a search syntax permitted by a target data query language;

extracting, from the data query schema, one or more sets of query components that define the search syntax of the target data query language, wherein the one or more sets of query components include:

a first set of query components comprising text-based search syntax components permitted by the target data query language, a second set of query components comprising numerical-based search syntax components permitted by the target data query language, and a third set of query components comprising date-related search syntax components permitted by the target data query language;

synthetically generating a plurality of natural language-to-search query training data samples based at least in part on the one or more sets of query components, wherein each of the plurality of natural language-to-search query training data samples includes:

a synthetically generated natural language query specifying a data asset retrieval request, and a synthetically generated search query that represents the data asset retrieval request in the search syntax of the target data query language;

configuring a natural language-to-search query machine learning model based on training a machine learning text-to-text transformer model using the plurality of natural language-to-search query training data samples; and after configuring the natural language-to-search query machine learning model: receiving a natural language input specifying a subject data asset retrieval request; transforming, using the natural language-to-search query machine learning model, the natural language input to a computer-executable search query encoded in the search syntax of the target data query language; and retrieving at least one data asset that satisfies the subject data asset retrieval request in response to executing the computer-executable search query.

24. The computer-implemented method according to claim 23, wherein:

the natural language input specifying the subject data asset retrieval request includes one or more strings of unstructured text, and transforming the natural language input to the computer-executable search query includes:

determining, by the natural language-to-search query machine learning model, the one or more strings of unstructured text syntactically corresponds to a subject query component included in the one or more sets of query components, and generating, by the natural language-to-search query machine learning model, a respective parameter value for the subject query component based on the natural language-to-search query machine learning model assessing the one or more strings of unstructured text, wherein:

the computer-executable search query includes the subject query component and the respective parameter value generated for the subject query component.

25. The computer-implemented method according to claim 24, wherein:

the one or more sets of query components further include a fourth set of query components comprising symbolic search syntax components permitted by the target data query language, the one or more strings of unstructured text of the natural language input specifying the subject data asset retrieval request include one or more alphabetic text strings textually expressing a symbolic search operator, and the natural language-to-search query machine learning model generates the respective parameter value for the subject query component by converting the one or more alphabetic text strings to one or more corresponding symbolic search syntax components included in the fourth set of query components.

26. The computer-implemented method according to claim 23, wherein synthetically generating the plurality of natural language-to-search query training data samples includes:

synthetically generating a plurality of erroneous natural language-to-search query training data samples, wherein each of the plurality of erroneous natural language-to-search query training data samples includes:

an erroneous natural language query specifying a respective erroneous data asset retrieval request, and a corresponding search query that correctly represents the erroneous natural language query in the search syntax of the target data query language.

27. The computer-implemented method according to claim 26, wherein the erroneous natural language query of each of the plurality of erroneous natural language-to-search query training data samples includes:

a grammatical error in the respective erroneous data asset retrieval request, a punctuation error in the respective erroneous data asset retrieval request, a spelling error in the respective erroneous data asset retrieval request, a typographical error in the respective erroneous data asset retrieval request, and a language translation error in the respective erroneous data asset retrieval request.

28. The computer-implemented method according to claim 23, wherein:

the at least one data asset includes one or more datasets.

29. A computer-implemented system comprising:

one or more processors;

a memory;

a computer-readable medium operably coupled to the one or more processors, the computer-readable medium having computer-readable instructions stored thereon that, when executed by the one or more processors, cause a computing device to perform operations comprising:

obtaining a data query schema that provides instructions for constructing computer-executable search queries according to a search syntax permitted by a target data query language;

extracting, from the data query schema, one or more sets of query components that define the search syntax of the target data query language, wherein the one or more sets of query components include:

a first set of query components comprising text-based search syntax components permitted by the target data query language, a second set of query components comprising numerical-based search syntax components permitted by the target data query language, and a third set of query components comprising date-related search syntax components permitted by the target data query language;

synthetically generating a plurality of natural language-to-search query training data samples based at least in part on the one or more sets of query components, wherein each of the plurality of natural language-to-search query training data samples includes:

a synthetically generated natural language query specifying a data asset retrieval request, and a synthetically generated search query that represents the data asset retrieval request in the search syntax of the target data query language;

configuring a natural language-to-search query machine learning model based on training a machine learning text-to-text transformer model using the plurality of natural language-to-search query training data samples; and after configuring the natural language-to-search query machine learning model:

receiving a natural language input specifying a subject data asset retrieval request;

transforming, using the natural language-to-search query machine learning model, the natural language input to a computer-executable search query encoded in the search syntax of the target data query language; and retrieving at least one data asset that satisfies the subject data asset retrieval request in response to executing the computer-executable search query.

30. The computer-implemented system according to claim 29, wherein:

the at least one data asset includes one or more datasets.

* * * * *